United States Patent
Kanazawa et al.

(10) Patent No.: US 12,522,609 B2
(45) Date of Patent: Jan. 13, 2026

(54) COMPOUND AND LABELED BIOLOGICAL SUBSTANCE USING THE SAME

(71) Applicant: FUJIFILM Corporation, Tokyo (JP)

(72) Inventors: Yoshinori Kanazawa, Kanagawa (JP); Ryo Fujiwara, Kanagawa (JP); Kazuoki Komiyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 480 days.

(21) Appl. No.: 18/069,982

(22) Filed: Dec. 21, 2022

(65) Prior Publication Data

US 2023/0159547 A1 May 25, 2023

Related U.S. Application Data

(63) Continuation of application No. PCT/JP2021/028180, filed on Jul. 29, 2021.

(30) Foreign Application Priority Data

Jul. 30, 2020 (JP) ................. 2020-129754

(51) Int. Cl.
C07D 487/14 (2006.01)

(52) U.S. Cl.
CPC .................. C07D 487/14 (2013.01)

(58) Field of Classification Search
None
See application file for complete search history.

(56) References Cited

U.S. PATENT DOCUMENTS

| | | | |
|---|---|---|---|
| 5,571,388 | A | 11/1996 | Patonay et al. |
| 5,800,995 | A | 9/1998 | Patonay et al. |
| 6,403,807 | B1 | 6/2002 | Singh et al. |
| 9,097,667 | B2 | 8/2015 | Mao et al. |
| 9,791,450 | B2 | 10/2017 | Mao et al. |
| 10,000,467 | B2 | 6/2018 | Hermanson et al. |
| 10,696,653 | B2 | 6/2020 | Hermanson et al. |
| 2007/0098638 | A1 | 5/2007 | Achilefu et al. |
| 2009/0305410 | A1 | 12/2009 | Mao et al. |
| 2012/0183954 | A1 | 7/2012 | Diwu et al. |
| 2013/0230466 | A1 | 9/2013 | Hermanson et al. |
| 2014/0072515 | A9 | 3/2014 | Hermanson et al. |
| 2015/0073154 | A1 | 3/2015 | Davis |
| 2018/0156810 | A1 | 6/2018 | Mao et al. |
| 2023/0219932 | A1 | 7/2023 | Kanazawa et al. |

FOREIGN PATENT DOCUMENTS

| | | |
|---|---|---|
| CN | 101946171 | 1/2011 |
| CN | 104395306 | 3/2015 |
| EP | 0670374 | 9/1995 |
| JP | H0847400 | 2/1996 |
| JP | 2011506673 | 3/2011 |
| JP | 2013539015 | 10/2013 |
| WO | 0102374 | 1/2001 |
| WO | 2005000218 | 1/2005 |
| WO | 2006047452 | 5/2006 |
| WO | 2012012595 | 1/2012 |
| WO | 2015038579 | 3/2015 |
| WO | 2021215514 | 10/2021 |

OTHER PUBLICATIONS

"Notice of Reasons for Refusal of Japan Counterpart Application", issued on Sep. 19, 2023, with English translation thereof, p. 1-p. 6.
"Search Report of Europe Counterpart Application", issued on Jul. 26, 2024, pp. 1-10.
Ewa Wolinska et al., "Near-Infrared Bis(indolium heptamethine cyanine) Dyes with a Spacer Derived from Oligo (ethylene glycol)", Journal of Heterocyclic Chemistry, Sep. 2009, pp. 1-6.
"International Search Report (Form PCT/ISA/210) of PCT/JP2021/028180," mailed on Oct. 19, 2021, with English translation thereof, pp. 1-7.
"Written Opinion of the International Searching Authority (Form PCT/ISA/237) of PCT/JP2021/028180," mailed on Oct. 19, 2021, with English translation thereof, pp. 1-6.
"Office Action of China Counterpart Application", issued on Feb. 27, 2025, with English translation thereof, pp. 1-14.

*Primary Examiner* — Jake M Vu
*Assistant Examiner* — Samantha L Mejias
(74) *Attorney, Agent, or Firm* — JCIPRNET

(57) ABSTRACT

There are provided a compound of Formula (1) and a labeled biological substance having the compound.

General Formula (1)

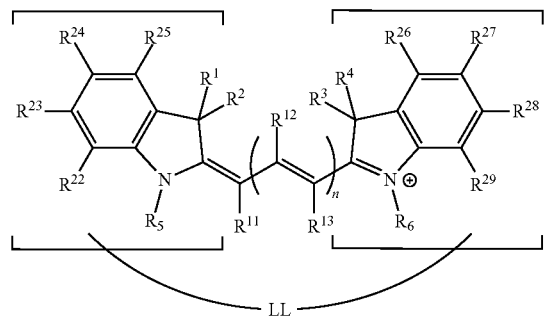

$R^1$ to $R^6$, $R^{11}$ to $R^{13}$, and $R^{22}$ to $R^{29}$ represent specific groups, and n is an integer of 1 to 3.
One selected from $R^1$, $R^2$, $R^5$, $R^{22}$ to $R^{25}$ and one selected from $R^3$, $R^4$, $R^6$, and $R^{26}$ to $R^{29}$ are bonded through a linking group LL.
The linking group LL represents a linking group having 1 to 100 atoms, which does not have any one of an aromatic hydrocarbon ring, a sulfo group, or a phosphono group.
$R^1, \ldots, R^6, R^{22}, \ldots,$ or $R^{29}$ includes a structure represented by $-(CH_2-CH_2-O)_m-$, where m is 1 to 50.
The above-described compound is a neutral compound and contains at least one substituent capable of being bonded to a carboxy group or a biological substance.

9 Claims, No Drawings

COMPOUND AND LABELED BIOLOGICAL SUBSTANCE USING THE SAME

CROSS-REFERENCE TO RELATED APPLICATIONS

This application is a Continuation of PCT International Application No. PCT/JP2021/028180 filed on Jul. 29, 2021, which claims priority under 35 U.S.C. § 119 (a) to Japanese Patent Application No. 2020-129754 filed in Japan on Jul. 30, 2020. Each of the above applications is hereby expressly incorporated by reference, in its entirety, into the present application.

BACKGROUND OF THE INVENTION

1. Field of the Invention

The present invention relates to a compound and a labeled biological substance using the compound.

2. Description of the Related Art

In order to observe in vivo changes in response to various stimuli (diseases, environmental changes, and the like), fluorescently labeled biological substances obtained by labeling a biological molecule (an antibody or the like) having a binding property to a target substance to be detected, with a fluorescent compound (a dye), are often used.

For example, also in Western blotting (hereinafter, also abbreviated as WB) that detects a specific protein from a protein mixture, a fluorescence method in which the presence or absence or the abundance of the specific protein is detected using a fluorescently labeled antibody having a binding property to this protein.

In addition, in bioimaging technology for analyzing the dynamics and functions of biological molecules, cells, tissues, and the like in a living body, in vivo fluorescence imaging in which a specific portion of a living body visualized by fluorescence labeling is observed is used as one of the techniques for the living body observation.

A cyanine dye is known as a fluorescent dye that is used for fluorescence labeling. However, in a case where a cyanine dye is used for fluorescence labeling, interactions such as self-association between the dyes after labeling easily occur, and the fluorescence quantum yield tends to decrease.

As a technique for dealing with this problem, for example, WO2005/000218A, WO2006/047452A, and WO2012/012595A describe a macrocyclic cyanine dye in which a large-membered ring structure is introduced into the compound. According to the above-described WO2005/000218A, it is said that a macrocyclic cyanine compound in which heterocyclic rings located at both terminals of a polymethine chain are linked to each other improves the stability against decomposition by an exopeptidase in a use application as an imaging agent that is used in a clinical site, whereby aggregation is suppressed and it is easy to be excreted from the liver. According to the above-described WO2006/047452A, it is said that in the macrocyclic cyanine compound in which, among the heterocyclic rings located at both terminals of the polymethine chain, a ring-constituting $sp^3$ carbon atom of one heterocyclic ring and a ring-constituting nitrogen atom of the other heterocyclic ring are linked to each other, and thus self-association is suppressed, fluorescence intensity is increased, and stability is also improved. Further, according to WO2012/012595A, it is said that in a macrocyclic cyanine compound linked by a water-soluble group cross-linking group having at least one of a sulfonate (sulfonic acid or a salt thereof) group or a phosphonate (phosphonic acid or a salt thereof) group quantum yield is improved, self-association is suppressed due to the improvement of water solubility, and the brightness (fluorescence intensity) is improved.

SUMMARY OF THE INVENTION

A dye that is used for fluorescence labeling is required to exhibit an excellent fluorescence intensity in various states such as a solution, a membrane, or a dot blot. However, as a result of further studies on the fluorescence intensity, the inventors of the present invention found that in the fluorescence labeling using the cyanine dyes specifically disclosed in WO2005/000218A, WO2006/047452A, and WO2012/012595A, a sufficient level of fluorescence intensity cannot be obtained in any state of a solution, a membrane, or a dot blot.

An object of the present invention is to provide a compound that makes it possible to obtain a labeled biological substance exhibiting an excellent fluorescence intensity in any state of a solution, a membrane, or a dot blot. In addition, another object of the present invention is to provide a labeled biological substance obtained by bonding the compound to a biological substance.

That is, the above objects of the present invention have been achieved by the following means.

[1] A compound represented by General Formula (1),

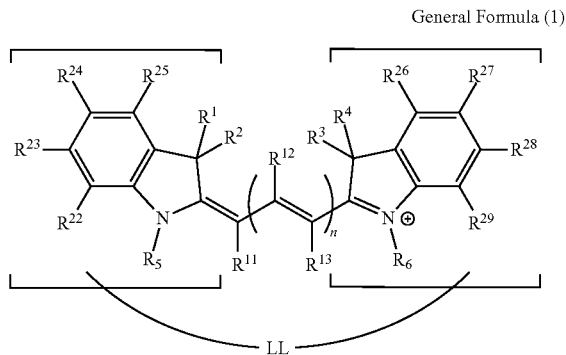

General Formula (1)

in the formula, $R^1$ to $R^6$ represent an alkyl group which may have a substituent or $-(CH_2-CH_2-O)_m-R^{21}$, where m is 1 to 50, and $R^{21}$ represents an alkyl group which may have a substituent, $R^{11}$ to $R^{13}$ represent a hydrogen atom, an alkyl group, an aryl group, a heteroaryl group, an alkoxy group, an aryloxy group, an alkylthio group, an arylthio group, an amino group, or a halogen atom, where adjacent groups may be bonded to each other to form a 5-membered or 6-membered ring.

$R^{22}$ to $R^{29}$ represent a hydrogen atom, an alkyl group, an alkoxy group, an aryl group, a sulfo group, a sulfonamide group, an alkoxycarbonyl group, an acyloxy group, a carbamoyl group, an acylamino group, a nitro group, or a halogen atom, where adjacent groups may be bonded to each other to form a fused ring, n is an integer of 1 to 3, provided that one selected from $R^1$, $R^2$, $R^5$, and $R^{22}$ to $R^{25}$ and one selected from $R^3$, $R^4$, $R^6$, and $R^{26}$ to $R^{29}$ are bonded through a linking group LL, the linking group LL represents a divalent linking group having 1 to 100 atoms, provided that the linking group LL does not have any group selected from an aromatic hydrocarbon ring, a sulfo group, and a phosphono group, at least one of $R^1, \ldots, R^6, R^{22}, \ldots,$ or $R^{29}$ contains a structure represented by $-(CH_2-CH_2-O)_m-$, where m has the same meaning as m described above, and the compound represented by General Formula (1) is a neutral compound and contains at least one substituent capable of being bonded to a carboxy group or a biological substance.

[2] The compound according to [1], in which the compound is represented by any one of General Formulae (1-1) to (1-3),

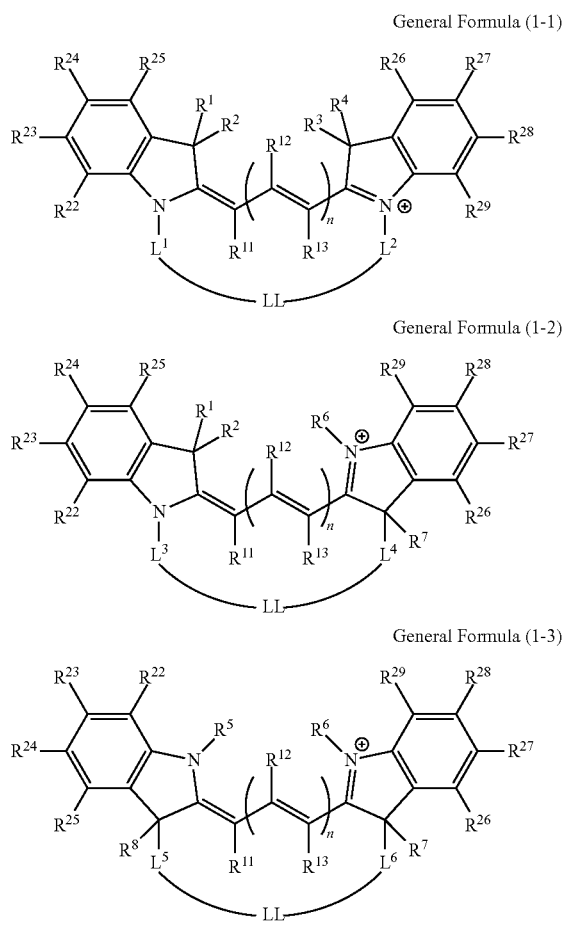

General Formula (1-1)

General Formula (1-2)

General Formula (1-3)

in the formulae, $L^1$ to $L^6$ represent an alkylene group or $-(CH_2-CH_2-O)_m$-alkylene-*,

* represents a bonding position to the linking group LL,
$R^7$ and $R^8$ represent an alkyl group which may have a substituent or $-(CH_2-CH_2-O)_m-R^{21}$, and $R^1$ to $R^6$, $R^{11}$ to $R^{13}$, $R^{21}$ to $R^{29}$, LL, m, and n respectively have the same meanings as $R^1$ to $R^6$, $R^{11}$ to $R^{13}$, $R^{21}$ to $R^{29}$, LL, m, and n described above.

[3] The compound according to [2], in which $L^1$ to $L^6$ described above each includes a structure represented by $-(CH_2-CH_2-O)_m-$, where m is 1 to 50.

[4] The compound according to any one of [1] to [3], in which the linking group LL is a divalent linking group having a substituent capable of being bonded to a carboxy group or a biological substance.

[5] The compound according to any one of [1] to [4], in which both two heterocyclic rings in the general formula satisfy the following condition I, (Condition I)

at least one substituent on an $sp^3$ carbon atom, which is a ring-constituting atom of the heterocyclic ring, and a substituent on a ring-constituting nitrogen atom of the heterocyclic ring include a structure represented by $-(CH_2-CH_2-O)_m-$, where m is 1 to 50.

[6] The compound according to any one of [1] to [5], in which in the linking group LL, a linking portion to $R^1$ to $R^6$, $R^{22}$ to $R^{29}$, or $L^1$ to $L^6$ is an —O— group, an —S— group, an —$NR^{50}$— group, a —COO— group, or a —$CONR^{50}$— group, provided that $R^{50}$ is a hydrogen atom or an alkyl group.

[7] The compound according to any one of [1] to [6], in which at least one of $R^{11}$, $R^{12}$, or $R^{13}$ is an aryloxy group.

[8] A labeled biological substance that is obtained by bonding the compound according to any one of [1] to [7] to a biological substance.

[9] The labeled biological substance according to [8], in which the biological substance is any one of a protein, an amino acid, a nucleic acid, a sugar chain, or a phospholipid.

The compound according to the aspect of the present invention makes it possible to obtain a labeled biological substance exhibiting an excellent fluorescence intensity in any state of a solution, a membrane, or a dot blot. In addition, the labeled biological substance according to the aspect of the present invention exhibits an excellent fluorescence intensity.

DESCRIPTION OF THE PREFERRED EMBODIMENTS

In the present invention, in a case where there is a plurality of substituents or linking groups represented by a specific symbol or Formula (hereinafter, referred to as a substituents or the like), or in a case where a plurality of substituents or the like are regulated at the same time, the substituents or the like may be the same or different from each other, unless otherwise specified. The same applies to the regulation of the number of substituents or the like. Further, in a case where a plurality of substituents or the like come close to each other (particularly in a case where they are adjacent to each other), they may be linked to each other to form a ring, unless otherwise specified. Further, unless otherwise specified, rings such as an alicyclic ring, an aromatic ring, and a heterocyclic ring may be fused to form a fused ring.

In the present specification, in a case where the E type and the Z type of the double bond are present in the molecule, any one of the E type or the Z type, or a mixture thereof may be used unless otherwise specified. In addition, in a case where a compound has diastereomers and enantiomers, any one of the diastereomers or the enantiomers may be used, or a mixture thereof may be used unless otherwise specified.

In the present invention, the representation of a compound or substituent is meant to include not only the compound itself but also a salt thereof, and an ion thereof. For example, the carboxy group, the sulfo group, and the phosphono group ($-P(=O)(OH)_2$) may have an ionic structure by a hydrogen atom being dissociated therefrom, or they may have a salt structure. That is, in the present invention, the "carboxy group" is meant to include an ion or salt of a carboxylic acid, the "sulfo group" is meant to include an ion or salt of a sulfonic acid, and the "phosphono group" is meant to include an ion or salt of a phosphonic acid. The monovalent or polyvalent cation in forming the salt structure is not particularly limited. Examples thereof include an inorganic cation and an organic cation, and specific examples thereof include alkali metal cations such as $Na^+$, $Li^+$, and $K^+$, alkaline earth metal cations such as $Mg^{2+}$, $Ca^{2+}$, and $Ba^{2+}$, and organic ammonium cations such as a trialkylammonium cation and a tetraalkylammonium cation.

In a case of a salt structure, the kind of the salt may be one kind, two or more kinds thereof may be mixed, a salt-type group and a group having a free acid structure may be mixed in a compound, and a compound having a salt structure and a compound having a free acid structure compound may be mixed.

Any compound according to the embodiment of the present invention is a neutral compound. In the present invention, the fact that the compound is neutral means that the compound is electrically neutral. Specifically, the charge of the compound as a whole is adjusted to be 0 by a group having a charge or by a counterion in the compound. For example, in the compound represented by General Formula (1), the formal charge of the nitrogen atom to which $R^6$ is bonded is +1, and a dissociable group such as a sulfo group in the compound has an ionic structure such as a sulfonate ion in a manner to be paired with this formal charge, and thus the compound according to the embodiment of the present invention is a compound having a charge of 0 as a whole of the compound.

In each general formula defined in the present invention, the positive charge possessed by the compound is specified and indicated, for convenience, as a structure of a specific nitrogen atom. However, since the compound according to the embodiment of the present invention has a conjugated system, another atom other than the nitrogen atom actually may be capable of being positively charged, and thus any compound capable of adopting a structure represented by each general formula as one of the chemical structures is included in the compound represented by each general formula. This also applies to the negative charge.

In addition, it is meant to include those in which a part of the structure is changed within the scope that does not impair the effect of the present invention. Furthermore, it is meant that a compound, which is not specified to be substituted or unsubstituted, may have any substituent within the scope that does not impair the effect of the present invention. The same applies to a substituent (for example, a group represented by "alkyl group", "methyl group", "methyl") and a linking group (for example, a group represented by "alkylene group", "methylene group", "methylene"). Among such substituents, a preferred substituent in the present invention is a substituent selected from a substituent group T described later.

In the present invention, in a case where the number of carbon atoms of a certain group is specified, this number of carbon atoms means the number of carbon atoms of the entire group thereof unless otherwise specified in the present invention or the present specification. That is, in a case where this group has a form of further having a substituent, it means the total number of carbon atoms, to which the number of carbon atoms of this substituent is included.

In addition, in the present invention, the numerical range represented by using "to" means a range including the numerical values before and after "to" as the lower limit value and the upper limit value, respectively.

The compound according to an embodiment of the present invention is represented by General Formula (1). Although the details of the reason why the compound according to the embodiment of the present invention makes it possible to obtain a labeled biological substance exhibiting an excellent fluorescence intensity in any state of a solution, a membrane, or a dot blot are not clear, they can be conceived as follows.

As represented by General Formula (1), the compound according to the embodiment of the present invention has a polymethine chain having an indoline ring and an indolenine ring at both terminals, respectively, and furthermore, an indoline ring-constituting nitrogen atom to which $R^5$ is bonded has a tertiary amine structure and an indolenine ring-constituting nitrogen atom to which $R^6$ is bonded has a quaternary ammonium structure, which causes absorption due to charge movement through the polymethine skeleton.

In the present invention, the polymethine chain means a methine chain bonded by a conjugated double bond, which is a methine chain in which the number of carbon atoms constituting the methine chain is 2n+3. The hydrogen atom of methine may be a substituent which can be adopted by $R^{11}$ to $R^{13}$; however, it is not included in the number of carbon atoms constituting the methine chain. As described above, the compound according to the embodiment of the present invention is classified into a compound referred to as a polymethine dye (broadly, a cyanine dye).

In the compound according to the embodiment of the present invention, the above-described structure is included, and furthermore, at least one of the substituents $R^1, \ldots, R^6$, $R^{22}, \ldots,$ or $R^{29}$ contained in the indoline ring and the indolenine ring contains an ethyleneoxy group having a repetition number of 1 to 50, and one selected from the substituents $R^1$, $R^2$, $R^3$, and $R^{22}$ to $R^{25}$ contained in the indoline ring and one selected from the substituents $R^3$, $R^4$, $R^6$, and $R^{26}$ to $R^{29}$ contained in the indolenine ring are bonded through a specific linking group LL that does not contain any group selected from an aromatic hydrocarbon ring, a sulfo group, or a phosphono group, whereby a large-membered ring is formed.

That is, it is conceived that since an ethyleneoxy group having an excluded volume effect and having a repetition number of 1 to 50 is included and an aromatic hydrocarbon ring having a high hydrophobicity is not contained in the linking group LL, the interaction between compounds is suppressed, and it is possible to suppress the decrease in the fluorescence intensity due to self-association of the compounds. In addition, it is conceived that since an ethyleneoxy group having an excluded volume effect and having a repetition number of 1 to 50 is included and any group of a sulfo group or phosphono group having a high hydrophilicity is not contained in the linking group LL, the decrease in the binding property to a biological substance (examples thereof include an antibody, the same applies hereinafter), and the decrease in the activity of a biological substance (examples thereof include an antibody, the same applies hereinafter) due to a charge contained in the sulfo group or the phosphono group, whereby a labeled biological substance to be obtained can exhibit an excellent fluorescence intensity. That is, in a labeled biological substance that is obtained from the compound according to the embodiment of the present invention, although the linking group LL is conceived to contribute to the suppression of self-association of the compound, it is conceived that in a case where the linking group LL has a sulfo group or a phosphono group, the charge balance of the surface of the biological substance is affected, the activity of a labeled biological substance (a labeled antibody or the like) to be obtained is decreased, and the fluorescence intensity in the target detection is decreased. In particular, in a case where the linking group LL has a substituent capable of being bonded to a carboxy group or a biological substance, the sulfo group and the phosphono group are present in the vicinity of the substituent that binds to the biological substance, and thus the binding property to a biological substance is conceived to be further reduced due to the charge repulsion.

On the other hand, even in a case where a large-membered ring structure in which heterocyclic rings located at both terminals of the polymethine chain are linked to each other is formed as in the compounds specifically described in WO2005/000218A or WO2006/047452A, it is conceived that the water solubility of the compound is inferior and the fluorescence intensity is decreased by the association in a case where the heterocyclic ring (including the fused ring) does not contain an ethyleneoxy group having a repetition number of 1 to 50. Furthermore, in a case of having at least any one of a sulfo group or a phosphono group in the linking group that forms the large-membered ring structure as in the compound described in WO2012/012595A, it is conceived that the binding property to a biological substance is decreased or the activity of a biological substance is decreased, and thus a labeled biological substance to be obtained is unable to exhibit an excellent fluorescence intensity.

Depending on the length of the methine chain having a repetition number of 2n+3, the compounds according to the embodiment of the present invention respectively have an excitation absorption wavelength in the vicinity of 585 nm in a case of n=1, in the vicinity of 685 nm in a case of n=2, and in the vicinity of 785 nm in a case of n=3. As a result, these compounds represented by General Formula (1) can be used as compounds having an excellent fluorescence intensity in the fluorescence labeling using excitation light sources respectively having wave lengths in the vicinity of 600 nm, 700 nm, and 800 nm.

In multicolor WB, a plurality of emission colors are detected in the range from the visible range to the near infrared range. As a result, it is necessary to select wavelengths so that the absorption and emission waveforms of a plurality of dyes have a suitable wavelength relationship so that crosstalk does not occur due to mutual interference in a case where the dyes are excited to emit light. Ideally, it should be adjusted so that only one dye emits light at one excitation light and the other dyes do not emit light. From this point of view, two kinds of excitation light sources having wavelengths separated to some extent, for example, in the vicinity of 700 nm and in the vicinity of 800 nm, are used for light emission in the near infrared range of the multicolor WB.

As compared with the detection by visible light excitation, the fluorescence detection by near-infrared light excitation can suppress the autofluorescence of the membrane, that is, the background fluorescence, and thus it is easy to increase the signal to noise ratio (the S/N ratio) and it is possible to detect a target protein with high sensitivity. As a result, in recent years, there has been an increasing need for fluorescence detection WB using light emission in the near infrared range in the analytical research on the trace amount of proteins.

However, in the near infrared range, the fluorescence quantum yield of the fluorescent dye is generally low, and thus it is difficult to obtain a high signal amount. Among the compounds according to the embodiment of the present invention, the compound in which n=2 or 3 can be used as a compound that exhibits an excellent fluorescence intensity even in the multicolor WB having the above-described two kinds of excitation light sources in the vicinity of 700 nm and in the vicinity of 800 nm, and in particular, it can exhibit an excellent fluorescence intensity even with respect to a request for observing and detecting proteins with higher sensitivity, as compared with the fluorescence labeling using cyanine dyes in the related art including the cyanine dyes described in WO2005/000218A, WO2006/047452A, and WO2012/012595A.

Hereinafter, the compound according to the embodiment of the present invention, which is represented by General Formula (1), will be described in detail.

<Compound Represented by General Formula (1)>

The compound according to the embodiment of the present invention, which is represented by General Formula (1), is as follows.

General Formula (1)

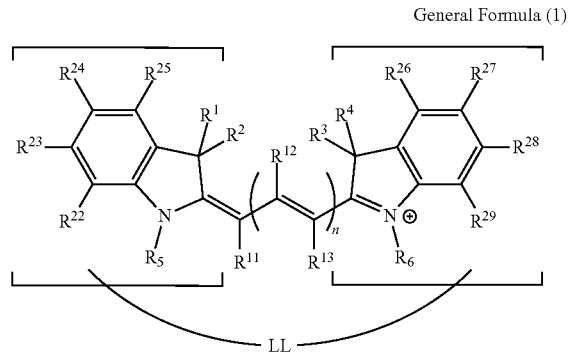

In the formula, $R^1$ to $R^6$ represent an alkyl group which may have a substituent or $-(CH_2-CH_2-O)_m-R^{21}$. Here, m is 1 to 50, and $R^{21}$ represents an alkyl group which may have a substituent.

$R^{11}$ to $R^{13}$ represent a hydrogen atom, an alkyl group, an aryl group, a heteroaryl group, an alkoxy group, an aryloxy group, an alkylthio group, an arylthio group, an amino group, or a halogen atom, where adjacent groups may be bonded to each other to form a 5-membered or 6-membered ring.

$R^{22}$ to $R^{29}$ represent a hydrogen atom, an alkyl group, an alkoxy group, an aryl group, a sulfo group, a sulfonamide group, an alkoxycarbonyl group, an acyloxy group, a carbamoyl group, an acylamino group, a nitro group, or a halogen atom, where adjacent groups may be bonded to each other to form a fused ring, n is an integer of 1 to 3.

However, one selected from $R^1$, $R^2$, $R^5$, and $R^{22}$ to $R^{25}$ and one selected from $R^3$, $R^4$, $R^6$, and $R^{26}$ to $R^{29}$ are bonded through a linking group LL. This is indicated by the notation in which the two structures enclosed in [ ] are linked by the linking group LL in the chemical structural formula.

The linking group LL represents a divalent linking group having 1 to 100 atoms. However, the linking group LL does not have any group selected from an aromatic hydrocarbon ring, a sulfo group, and a phosphono group.

At least one of $R^1, \ldots, R^6, R^{22}, \ldots,$ or $R^{29}$ contains a structure represented by $-(CH_2-CH_2-O)_m-$, where m has the same meaning as m described above.

The compound represented by General Formula (1) is a neutral compound and contains at least one substituent capable of being bonded to a carboxy group or a biological substance.

Hereinafter, the substituent and the like in General Formula (1) will be described in detail.

(1) $R^1$ to $R^6$ $R^1$ to $R^6$ represents an alkyl group which may have a substituent or $-(CH_2-CH_2-O)_m-R^{21}$ The alkyl group which can be adopted as $R^1$ to $R^6$ has the same meaning as an alkyl group in the substituent group T described later.

The unsubstituted alkyl group preferably has 1 to 6 carbon atoms, more preferably 1 to 4 carbon atoms, and still more preferably 1 or 2 carbon atoms.

The alkyl group moiety of the alkyl group having a substituent preferably has 1 to 10 carbon atoms, more preferably 1 to 8 carbon atoms, still more preferably 2 to 6 carbon atoms, and particularly preferably 2 to 5 carbon atoms. In addition, the number of atoms constituting the longest chain of the alkyl group having a substituent is preferably 3 to 35, more preferably 3 to 25, still more preferably 3 to 15, and particularly preferably 3 to 11.

In a case where the alkyl group which can be adopted as $R^1$ to $R^6$ is bonded to the linking group LL, an alkylene group obtained by removing one hydrogen atom or one substituent from an alkyl group which may have a substituent is bonded to the linking group LL. However, all the atoms constituting the shortest molecular chain that links the heterocyclic ring and the linking group LL to each other are $sp^3$ carbon atoms.

As the number of carbon atoms of the alkylene group moiety of the alkylene group in a case of being bonded to the linking group LL, the description for the above-described number of carbon atoms of the alkyl group moiety of the alkyl group in a case of having a substituent can be preferably applied. In addition, the number of atoms constituting the bond connecting the indoline ring or the indolenine ring to the linking group LL, in the alkylene group moiety of the alkylene group in a case of being bonded to the linking group LL, is preferably 1 to 10, preferably 1 to 8, still more preferably 2 to 6, and particularly preferably 3 to 5.

In the present invention, the "number of carbon atoms of the alkyl group moiety of the alkyl group having a substituent" means the number of carbon atoms excluding the substituent moiety contained in the alkyl group.

In the present invention, the "number of atoms constituting the longest chain of the alkyl group having a substituent" means the number of atoms including the substituent moiety (that is, the number of atoms obtained by subtracting the number of atoms of the molecular chain that does not constitute the longest chain, from the number of total atoms). It is noted that in a case where a substituent having a dissociative hydrogen atom such as a sulfo group or a carboxy group constitutes the longest chain, the calculation is carried out including the hydrogen atom regardless of the presence or absence of dissociation. In addition, the number of atoms in the substituent moiety capable of being bonded to a biological substance described later is not included.

In the present invention, "the number of atoms constituting the bond connecting the indoline ring or the indolenine ring to the linking group LL, in the alkylene group moiety of the alkylene group in a case of being bonded to the linking group LL" means the number of atoms including the substituent moiety (that is, the number of atoms obtained by subtracting the numbers of atoms of the molecular chain and the branched chain, which do not constitute a chain connecting the indoline ring or the indolenine ring to the linking group LL from the total number of atoms constituting $R^1$ to $R^6$).

Examples of the substituent which may be contained in the alkyl group which can be adopted as $R^1$ to $R^6$ include an alkoxy group, a carboxy group, an alkoxycarbonyl group, an acyloxy group, a carbamoyl group, an acylamino group, a sulfo group, a phosphono group, and $-(CH_2-CH_2-O)_m-R^{21}$, as well as a group consisting of a combination of these substituents. In addition, examples thereof include a substituent capable of being bonded to a biological substance described later. It is noted that the alkyl group moiety in the alkoxy group, the carboxy group, the alkoxycarbonyl group, the acyloxy group, the carbamoyl group, the acylamino group, the sulfo group, and the phosphono group, as well as the group consisting of a combination of these substituents may have a substituent capable of being bonded to a biological substance described later.

The alkyl group having a substituent which can be adopted as $R^1$ to $R^6$ is not particularly limited as long as it is an alkyl group having the above-described substituent. However, it is preferably an alkyl group having, at the terminal, a substituent capable of being bonded to a carboxy group or a biological substance. In this case, the alkyl group may be directly substituted with a substituent capable of being bonded to a carboxy group or a biological substance, and it may be substituted with a group consisting of a combination of an alkoxy group and a carboxy group or substituent capable of being bonded to a biological substance.

It is noted that in a case where $R^1$ to $R^6$ are bonded to the linking group LL, it is preferable that $R^1$ to $R^6$ are an alkyl group that does not have any one of a sulfo group or a phosphono group as a substituent.

$(-(CH_2-CH_2-O)_m-R^{21})$

In $-(CH_2-CH_2-O)_m-R^{21}$ which can be adopted as $R^1$ to $R^6$, m is 1 to 50, and $R^{21}$ represents an alkyl group which may have a substituent.

m means the average repetition number (simply, also referred to as the repetition number). From the viewpoint of obtaining a more excellent fluorescence intensity while suppressing the decrease in the binding property to an antibody by a proper excluded volume effect, m is preferably 1 to 24, more preferably 1 to 12, still more preferably 1 to 10, and particularly preferably 1 to 6, among which 1 to 4 is preferable.

The average repetition number can be calculated from the average integrated value obtained by subjecting a compound to 1H-NMR measurement. The average repetition number defined in the present invention means a number obtained by rounding off the first decimal place of the average repetition number calculated according to the above method.

As the alkyl group which may have a substituent, as $R^{21}$, the description for the alkyl group which may have a substituent, which can be adopted as $R^1$ to $R^6$, can be applied.

In a case where $-(CH_2-CH_2-O)_m-R^{21}$, which can be adopted as $R^1$ to $R^6$, is bonded to the linking group LL, $-(CH_2-CH_2-O)_m$-alkylene obtained by removing one hydrogen atom or one substituent from $R^{21}$ of the $-(CH_2-CH_2-O)_m-R^{21}$ is bonded to the linking group LL, where $R^{21}$ is an alkyl group which may have a substituent. However, in the $-(CH_2-CH_2-O)_m$-alkylene constituting the shortest molecular chain that links the heterocyclic ring and the linking group LL to each other, all the atoms constituting the alkylene moiety are $sp^3$ carbon atoms.

The number of carbon atoms in the alkylene group moiety of the $-(CH_2-CH_2-O)_m$-alkylene in a case of being bonded to the linking group LL is preferably 1 to 10, more preferably 1 to 8, still more preferably 2 to 6, and particularly preferably 2 to 4. In addition, the number of atoms constituting a bond that connects $-(CH_2-CH_2-O)_m-$ to the linking group LL, in the alkylene group moiety of the —(CH$_2$—CH$_2$—O)$_m$-alkylene in a case of being bonded to the linking group LL, is preferably 1 to 10, more preferably 1 to 8, still more preferably 2 to 6, and particularly preferably 2 to 4.

In the present invention, "the number of atoms constituting a bond that connects —(CH$_2$—CH$_2$—O)$_m$— to the linking group LL, in the alkylene group moiety of the —(CH$_2$—CH$_2$—O)$_m$-alkylene in a case of being bonded to the linking group LL," means the number of atoms including the substituent moiety (that is, the number of atoms obtained by subtracting the numbers of atoms of the molecular chain and the branched chain, which do not constitute a chain connecting —(CH$_2$—CH$_2$—O)$_m$— to the linking group LL from the total number of atoms).

The —(CH$_2$—CH$_2$—O)$_m$—R$^{21}$ which can be adopted as R$^1$ to R$^6$ and —(CH$_2$—CH$_2$—O)$_m$—R$^{21}$ which can be adopted as a substituent by an alkyl group as R$^1$ to R$^6$ are preferably an alkyl group of —(CH$_2$—CH$_2$—O)$_m$-unsubstituted.

It is preferable that at least one of R$^1$, . . . , or R$^6$ includes a structure represented by —(CH$_2$—CH$_2$—O)$_m$—, and from the viewpoint of further improving the fluorescence intensity in the states of the solution, the membrane, and the dot blot, it is more preferable that both of the two heterocyclic rings in General Formula (1) satisfy Condition I.

(Condition I)

At least one substituent on an sp$^3$ carbon atom, which is a ring-constituting atom of the heterocyclic ring, and a substituent on a ring-constituting nitrogen atom of the heterocyclic ring include a structure represented by —(CH$_2$—CH$_2$—O)$_m$—, where m is 1 to 50.

That is, "both of the two heterocyclic rings in General Formula (1) satisfy Condition I" means that at least one of R$^1$ or R$^2$, at least one of R$^3$ or R$^4$, R$^5$, and R$^6$ have a structure represented by —(CH$_2$—CH$_2$—O)$_m$—, where m=1 to 50.

The structure represented by —(CH$_2$—CH$_2$—O)$_m$— is preferably directly bonded, as —(CH$_2$—CH$_2$—O)$_m$—R$^{21}$, to a heterocyclic ring directly bonded to the methine chain.

The m in —(CH$_2$—CH$_2$—O)$_m$— described above has the same meaning as the m in —(CH$_2$—CH$_2$—O)$_m$—R$^{21}$ described above.

Since the substituents of R$^1$ to R$^6$ protrude in a direction perpendicular to the cyanine dye skeleton (plane), it is presumed that in a case of including a structure represented by —(CH$_2$—CH$_2$—O)$_m$— as this substituent, the fused ring portion is difficult to undergo the π-π interaction (the effect of suppressing the association is strengthened), and thus the decrease in the fluorescence intensity due to the association can be suppressed.

(2) R$^{11}$ to R$^{13}$

R$^{11}$ to R$^{13}$ represent a hydrogen atom, an alkyl group, an aryl group, a heteroaryl group, an alkoxy group, an aryloxy group, an alkylthio group, an arylthio group, an amino group, or a halogen atom. Adjacent groups may be bonded to each other to form a 5-membered or 6-membered ring.

The alkyl group, the aryl group, the heteroaryl group, the alkoxy group, the aryloxy group, the alkylthio group, the arylthio group, the amino group, and the halogen atom, which can be adopted as R$^{11}$ to R$^{13}$, respectively have the same meanings as the alkyl group, the aryl group, the heteroaryl group, the alkoxy group, the aryloxy group, the alkylthio group, the arylthio group, the amino group, and the halogen atom in the substituent group T described later, and the same applies to the preferred range thereof.

The alkyl group, the aryl group, the heteroaryl group, the alkoxy group, the aryloxy group, the alkylthio group, the arylthio group, and the amino group, which can be adopted as R$^{11}$ to R$^{13}$, may be unsubstituted or may have a substituent.

Examples of the substituent which may be contained in the alkyl group, the aryl group, the heteroaryl group, the alkoxy group, the aryloxy group, the alkylthio group, the arylthio group, and the amino group, as R$^{11}$ to R$^{13}$, include the substituents in the substituent group T described later, and for example, an alkoxy group or a sulfo group is preferable. In addition, the —(CH$_2$—CH$_2$—O)$_m$—R$^{21}$ described above is also preferably included. Further, the group may be a group consisting of a combination of these substituents, examples of which include —O—(CH$_2$—CH$_2$—O)$_m$—R$^{21}$.

Among R$^{11}$ to R$^{13}$, the 5-membered or 6-membered ring formed by bonding adjacent groups to each other may be either aromatic or aliphatic, and it is preferably aliphatic. In addition, it is preferable to form a 6-membered ring. The number of the above-described 5-membered or 6-membered rings in the compound is not particularly limited; however, it is preferably 1 or 2 and more preferably 1.

In a case of taking a case of n=3 as an example, preferred examples of the structure having a ring formed by bonding adjacent groups among R$^{11}$ to R$^{13}$ include the following structures. It is noted that in the following examples, R$^{11}$ to R$^{13}$ that do not form a ring structure are a hydrogen atom, and the ring structure is described as a structure that does not have a substituent, which is not limited thereto. It is noted that, hereinafter, the structure beyond the wavy line will be omitted.

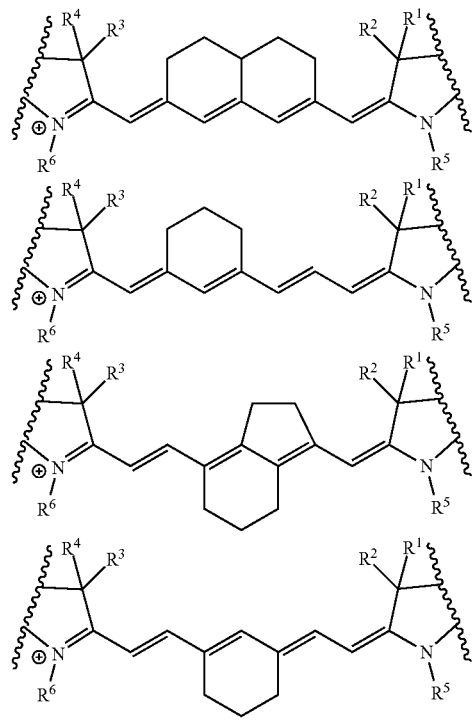

R$^{11}$ and R$^{13}$ possessed by the carbon atom bonded to the indolenine ring are preferably a hydrogen atom.

R$^{12}$ and R$^{13}$ other than those described above are preferably a hydrogen atom, an alkyl group, an aryloxy group, or an arylthio group, and they are more preferably a hydrogen atom, an alkyl group, or an aryloxy group.

It is preferable that $R^{11}$, $R^{12}$, or $R^{13}$ is an aryloxy group, and it is more preferable that at least one of $R^{12}$ or $R^{13}$ other than the $R^{13}$ possessed by the carbon atom bonded to the above-described indolenine ring is an aryloxy group.

Among $R^{11}$ to $R^{13}$, adjacent groups in $R^{12}$ and $R^{13}$ other than $R^{11}$ and $R^{13}$ possessed by the carbon atom bonded to the indolenine ring (that is, adjacent groups of $R^{13}$ and $R^{12}$ other than $R^{13}$ possessed by the carbon atom bonded to the indolenine ring) are preferably bonded to each other to form a 5- or 6-membered ring and more preferably to form a 6-membered ring. In addition, it is preferable that the 5- or 6-membered ring is formed at the central portion of the bond connecting the indoline ring and the indolenine ring. The ring formed in the central portion of the bond connecting the indoline ring and the indolenine ring means a ring containing carbon atoms as ring-constituting atoms so that the numbers of bonded atoms from the indoline ring and the indolenine ring are the same.

(3) $R^{22}$ to $R^{29}$ $R^{22}$ to $R^{29}$ represent a hydrogen atom, an alkyl group, an alkoxy group, an aryl group, a sulfo group, a sulfonamide group, an alkoxycarbonyl group, an acyloxy group, a carbamoyl group, an acylamino group, a nitro group, or a halogen atom, where adjacent groups may be bonded to each other to form a fused ring, In a case where $R^{22}$ to $R^{29}$ are bonded to the linking group LL, an alkylene group, an alkyleneoxy group, an arylene group, an alkylenesulfonamide group, a cycloalkylenesulfonamide group, an alkyleneoxycarbonyl group, an alkylenecarbonyloxy group, an alkylenecarbamoyl group, a cycloalkylenecarbamoyl group, or an alkylenecarbonylamino group, which may have a substituent and is obtained by removing one hydrogen atom from an alkyl group, an alkoxy group, an aryl group, a sulfonamide group, an alkoxycarbonyl group, an acyloxy group, a carbamoyl group, or an acylamino group, which may have a substituent and can be adopted as $R^{22}$ to $R^{29}$, is bonded to the linking group LL. However, all the atoms constituting the shortest molecular chain that links the benzene ring to which $R^{22}$ to $R^{29}$ are bonded and the linking group LL to each other are composed of a group obtained by removing one hydrogen atom from an alkyl group, an alkoxy group, an aryl group, a sulfonamide group, an alkoxycarbonyl group, an acyloxy group, a carbamoyl group, or an acylamino group, which is unsubstituted and can be adopted as $R^{22}$ to $R^{29}$, and the bonded atom to the linking group LL, which constitutes $R^{22}$ to $R^{29}$, is an $sp^3$ carbon atom.

The alkyl group, the alkoxy group, the aryl group, the sulfo group, the sulfonamide group, the alkoxycarbonyl group, the acyloxy group, the carbamoyl group, the acylamino group, the nitro group, and the halogen atom, which can be adopted as $R^{22}$ to $R^{29}$ respectively have the same meanings as the alkyl group, the alkoxy group, the aryl group, the sulfo group, the sulfonamide group, the alkoxycarbonyl group, the acyloxy group, the carbamoyl group, the acylamino group, the nitro group, and the halogen atom, which are those in the substituent group T described later. In addition, these groups may have a substituent, examples of which include a substituent in the substituent group T described below and $-(CH_2-CH_2-O)_m-R^{21}$ described above.

However, in a case where $R^{22}$ to $R^{29}$ are bonded to the linking group LL, it is preferable that $R^{22}$ to $R^{29}$ do not have an aromatic hydrocarbon ring and do not have any one of a sulfo group or a phosphono group as a substituent from the viewpoint that more excellent fluorescence intensity can be obtained. The description of "do not have an aromatic hydrocarbon ring" means that a mono- to hexavalent aromatic hydrocarbon group such as an aryl group or an arylene group is not contained. For example, an alkylene-carbamoyl group and an alkylene group are included.

The fused ring formed by bonding adjacent groups among $R^{22}$ to $R^{29}$ to each other is not particularly limited. However, examples thereof include a naphthalene ring. From the viewpoint of suppressing association, it is preferable that adjacent groups among $R^{22}$ to $R^{29}$ are not bonded to each other and do not form a fused ring.

From the viewpoint of improving water solubility and suppressing association, it is preferable that at least one of $R^{22}$, ..., or $R^{25}$ and at least one of $R^{26}$, ..., or $R^{29}$ have a hydrophilic group, and it is more preferable that at least one hydrophilic group is contained per number of rings to which $R^{22}$ to $R^{25}$ is bonded and rings to which $R^{26}$ to $R^{29}$ is bonded. For example, in a case where adjacent groups among $R^{22}$ to $R^{25}$ and $R^{26}$ to $R^{29}$ are bonded to each other to form a naphthalene ring as a fused ring, the number of rings to which $R^{22}$ to $R^{25}$ are bonded is two, and the number of rings to which $R^{26}$ to $R^{29}$ are bonded to each other is two, which means that it is more preferable that at least two of $R^{22}$ to $R^{25}$ and at least two of $R^{26}$ to $R^{29}$ have a hydrophilic group. The upper limit value thereof is not particularly limited as long as it is allowed in terms of structure, and it can be appropriately adjusted in accordance with the number of hydrophilic groups in the compound as a whole, which will be described later.

The hydrophilic group is not particularly limited as long as the hydrophilicity can be imparted to the compound. However, examples thereof include an alkoxy group having a substituent, a carboxy group, a sulfo group, and a phosphono group, where a sulfo group is preferable.

$R^{22}$ to $R^{29}$ are preferably a hydrogen atom, an alkyl group, a sulfo group, a sulfonamide group, an alkoxycarbonyl group, an acyloxy group, a carbamoyl group, an acylamino group, a nitro group, or a halogen atom.

In a case where $R^{22}$ to $R^{29}$ are bonded to the linking group LL, $R^{22}$ to $R^{29}$ are more preferably an alkyl group, an alkoxycarbonyl group, an acyloxy group, a carbamoyl group, or an acylamino group, and it is still more preferably an alkyl group, a carbamoyl group, or an acylamino group.

In a case where $R^{22}$ to $R^{29}$ are not bonded to the linking group LL, they are preferably a hydrogen atom, a sulfo group, a nitro group, or a halogen atom, and they are more preferably a hydrogen atom, a sulfo group, or a halogen atom.

(4) Linking Group LL

One selected from $R^1$, $R^2$, $R^5$, and $R^{22}$ to $R^{25}$ and one selected from $R^3$, $R^4$, $R^6$, and $R^{26}$ to $R^{29}$ are bonded through the linking group LL.

The linking group U represents a divalent linking group having 1 to 100 atoms. However, the linking group LL does not have any group selected from an aromatic hydrocarbon ring, a sulfo group, and a phosphono group. The binding through the linking group LL suppresses the rotation of the indoline ring and the indolenine ring, thereby improving the fluorescence intensity. On the other hand, in a case where the linking group LL has any group selected from an aromatic hydrocarbon ring, a sulfo group, and a phosphono group, it is conceived that association promotion occurs due to the hydrophobicity of the aromatic hydrocarbon ring, or the charge repulsion exhibited by the sulfo group or the phosphono group causes a decrease in the binding property to a biological substance or a decrease in the activity of a biological substance, whereby the fluorescence intensity decreases. The description of "do not have an aromatic hydrocarbon ring" means that any mono- to hexavalent aromatic hydrocarbon group such as an aryl group or an arylene group is not contained.

In the present invention, the "number of atoms of the linking group LL" is the number of linking atoms that constitutes the shortest molecular chain that links one selected from $R^1$, $R^2$, $R^5$, and $R^{22}$ to $R^{25}$ and one selected from $R^3$, $R^4$, $R^6$, and $R^{26}$ to $R^{29}$, to each other. That is, it means the number of atoms obtained by subtracting the number of atoms of the molecular chain and the branched chain (including —H, and =O), which do not constitute a chain that connects one selected from $R^1$, $R^2$, $R^5$, and $R^{22}$ to $R^{25}$ to one selected from $R^3$, $R^4$, $R^6$, and $R^{26}$ to $R^{29}$, from the total number of atoms that constitutes the linking group LL. For example, in a case where the linking group LL is —CONH—CH$_2$CH(CH$_3$)—NHCO—, the number of atoms of the linking group LL is 6.

It is noted that the linking group LL is determined so that the bonded atom to $R^1$, . . . , $R^6$, $R^{22}$, . . . , or $R^{29}$, which constitutes the linking group LL, is an atom other than the sp$^3$ carbon atom. Further, based on the above-described description in the case where $R^1$ to $R^6$ are bonded to the linking group L and the description in the case where $R^{22}$ to $R^{29}$ are bonded to the linking group L, a group to be bonded to the linking group LL, which corresponds to $R^1$, . . . , $R^6$, $R^{22}$, . . . , or $R^{29}$, and the linking group LL are determined.

The linking group LL preferably has 5 to 70 atoms, more preferably 5 to 50 atoms, still more preferably 5 to 30 atoms, and particularly preferably 5 to 20 atoms.

The linking group U is preferably a divalent linking group formed by bonding one or two more groups selected from an alkylene group, —O—, —S—, —NR$^{50}$—, —COO—, —CONR$^{50}$—, and —(CH$_2$—CH$_2$—O)$_p$—. R$^{50}$ represents a hydrogen atom or an alkyl group.

The number of carbon atoms in the alkylene moiety of the alkylene group which can be adopted as the linking group LL is preferably 1 to 10, more preferably 1 to 8, still more preferably 1 to 7, particularly preferably 1 to 6, and most preferably 1 to 5.

In the present invention, "the number of carbon atoms in the alkylene moiety of the alkylene group" means the number of carbon atoms excluding the substituent moiety contained in the alkylene group.

As the alkyl group which can be adopted as R$^{50}$, the description for the alkyl group as R$^1$ to R$^6$ can be preferably applied.

R$^{50}$ is preferably a hydrogen atom.

p means an average repetition number (simply, also referred to as a repetition number), and it is preferably 1 to 50, more preferably 1 to 30, still more preferably 1 to 24, and particularly preferably 1 to 20, among which 1 to 12 is preferable, and 1 to 4 is most preferable.

The method and definition of measuring the average repetition number respectively have the same meanings as the above-described average repetition number in —(CH$_2$—CH$_2$—O)$_m$—.

The number of the above-described alkylene group, —O—, —S—, —NR$^{50}$—, —COO—, —CONR$^{50}$—, and —(CH$_2$—CH$_2$—O)$_p$—, which constitute the linking group LL, is preferably 3 to 11, more preferably 3 to 9, still more preferably 3 to 7, particularly preferably 3 to 5, and most preferably 3.

The linking group LL is more preferably composed of a group selected from an alkylene group, —CONR$^{50}$—, and —(CH$_2$—CH$_2$—O)$_p$—, and it is still more preferably composed of a group selected from an alkylene group and —CONR$^{50}$—.

In the linking group LL, the linking portion to one selected from $R^1$, $R^2$, $R^5$, and $R^{22}$ to $R^{25}$, and the linking portion to one selected from $R^3$, $R^4$, $R^6$, and $R^{26}$ to $R^{29}$ are preferably —O—, —S—, —NR$^{50}$—, —COO—, or —CONR$^{50}$—. That is, the linking group LL is preferably bonded to one selected from $R^1$, $R^2$, $R^5$, and $R^{22}$ to $R^{25}$ and one selected from $R^3$, $R^4$, $R^6$, and $R^{26}$ to $R^{29}$ through —O—, —S—, —NR$^{50}$—, —COO—, or —CONR$^{50}$—, which constitutes the linking group LL. The linking portion of the linking group LL is preferably —O— or —CONR$^{50}$— and more preferably —CONR$^{50}$—.

It is noted that In the compound represented by any one of General Formulae (1-1) to (1-3), the linking portion of the linking group LL to $L^1$ to $L^6$ is preferably —O—, —S—, —NR$^{50}$—, —COO—, or —CONR$^{50}$. That is, the linking group LL is preferably bonded to $L^1$ to $L^6$ through —O—, —S—, —NR$^{50}$—, —COO—, or —CONR$^{50}$—, which constitutes the linking group LL. The linking portion of the linking group LL is preferably —O— or —CONR$^{50}$— and more preferably —CONR$^{50}$—.

The linking group LL is preferably a divalent linking group having a substituent capable of being bonded to a carboxy group or a biological substance. Examples of the site in the linking group LL, where the substituent capable of being bonded to a carboxy group or a biological substance is located, include an alkylene group and an alkyl group as R$^{50}$, where an alkylene group is preferable.

In the linking group LL, the substituent capable of being bonded to a carboxy group or a biological substance may be directly bonded to the alkylene group or the alkyl group as R$^{50}$, or it may be bonded through a linking group ZZZ.

Examples of the linking group ZZZ include an alkylene group, —O—, —S—, —NR$^{60}$—, —COO—, —CONR$^{60}$—, and —(CH$_2$—CH$_2$—O)$_p$—, as well as a group consisting of a combination of these substituents. The number of substituents to be combined is, for example, preferably 2 to 7, more preferably 2 to 5, and still more preferably 2 or 3.

As the number of carbon atoms in the alkylene moiety of the alkylene group which can be adopted as the linking group ZZZ, the description for the above-described number of carbon atoms of the alkylene group moiety of the alkylene group which can be adopted as the linking group LL can be preferably applied.

The linking group ZZZ is preferably composed of a group selected from an alkylene group, —CONR$^{60}$—, and —(CH$_2$—CH$_2$—O)$_p$—, more preferably a group represented by —CONR$^{60}$— alkylene or —CONR$^{60}$—(CH$_2$—CH$_2$—O)$_p$-alkylene, and still more preferably a group represented by —CONR$^{60}$—(CH$_2$—CH$_2$—O)$_p$-alkylene.

Here, R$^{60}$ is a hydrogen atom or an alkyl group, and it is preferably a hydrogen atom. As the alkyl group which can be adopted as R$^{60}$, the description for the alkyl group in R$^{50}$ can be preferably applied. However, it is not allowed that the alkyl group which can be adopted as R$^{60}$ has a substituent capable of being bonded to a carboxy group or a biological substance.

p has the same meaning as p.

(5) n n is an integer of 1 to 3, where it is preferably an integer of 2 or 3.

The compound represented by General Formula (1) contains at least one substituent capable of being bonded to a carboxy group or a biological substance.

The compound represented by General Formula (1) can be bonded to a biological substance with the above-described substituent capable of being bonded to a carboxy group or a biological substance, whereby a targeted labeled biological substance can be obtained. It is noted that as a substituent capable of being bonded to a biological substance, a carboxy group can be easily derived by a conventional method.

In the present invention, the "substituent capable of being bonded to a biological substance" includes a substituent capable of being bonded to a biological substance, which is derived from a carboxy group.

In the compound represented by General Formula (1), a position having a substituent capable of being bonded to a carboxy group or a biological substance is not particularly limited. However, it is preferable that at least one substituent is contained at any position of $R^1$ to $R^6$ or the linking group LL, and it is more preferable that at least one substituent is contained in the linking group LL.

It suffices that the number of groups having a substituent capable of being bonded to a carboxy group or a biological substance in the compound represented by General Formula (1) is at least 1 or more in total, and it is preferably 1 to 3, more preferably 1 or 2, and still more preferably 1, from the viewpoint of the quantification of the target substance to be detected.

In the compound represented by General Formula (1), at least one of $R^1, \ldots, R^6, R^{22}, \ldots,$ or $R^{29}$ contains a structure represented by —(CH$_2$—CH$_2$—O)$_m$—. m has the same meaning as m described above. It is conceived that this makes it possible for the compound according to the embodiment of the present invention to have a proper hydrophilicity and a proper excluded volume effect, whereby a labeled biological substance to be obtained can exhibit an excellent fluorescence intensity.

In addition, from the viewpoint of imparting sufficient hydrophilicity as the compound, the compound represented by General Formula (1) preferably has two or more hydrophilic groups, preferably has 2 to 8 hydrophilic groups, still more preferably has 2 to 6 hydrophilic groups, and particularly preferably has 3 to 6 hydrophilic groups, as the compound as a whole.

Regarding the hydrophilic group, the description for the hydrophilic group which can be adopted by $R^{22}$ to $R^{29}$ described above can be applied.

The position of the hydrophilic group is not particularly limited unless specified otherwise, and examples of the group having the hydrophilic group preferably include $R^{11}$ to $R^{13}$ and $R^{22}$ to $R^{29}$. However, the linking group LL does not include a sulfo group or a phosphono group.

It is noted that in a case where the compound represented by General Formula (1) has the hydrophilic group as the above-described substituent capable of being bonded to a carboxy group or a biological substance, it is practical and preferable that the above-described substituent capable of being bonded to a carboxy group or a biological substance has one or more hydrophilic groups. Specific examples thereof include a carboxy group.

<Compound Represented by any One of General Formulae (1-1) to (1-3)>

The compound represented by General Formula (1) according to the embodiment of the present invention is preferably represented by any of the following General Formulae (1-1) to (1-3).

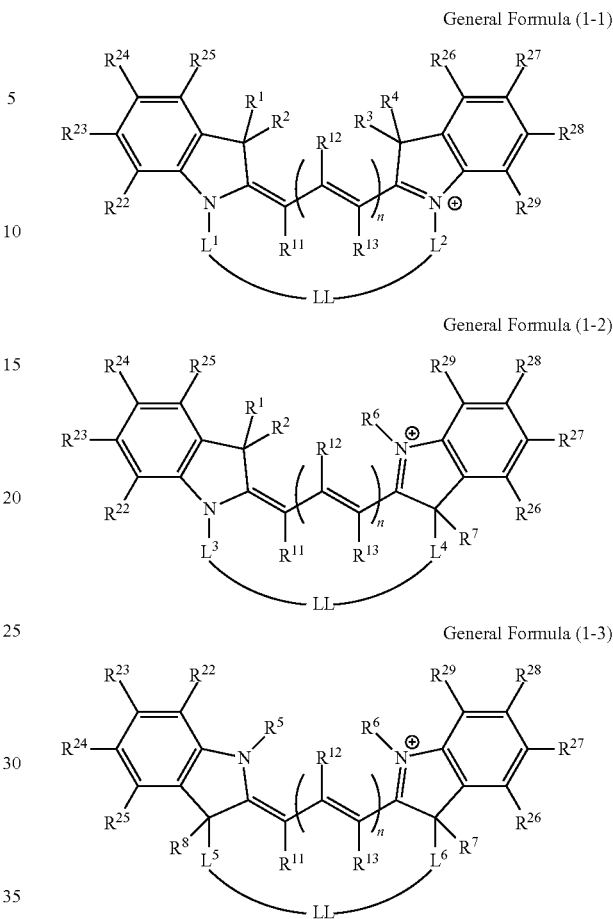

General Formula (1-1)

General Formula (1-2)

General Formula (1-3)

In the formulae, $L^1$ to $L^6$ represent an alkylene group or —(CH$_2$—CH$_2$—O)$_m$-alkylene-*. * represents a bonding position to the linking group LL.

$R^7$ and $R^8$ have the same meanings as $R^1$ to $R^4$ in General Formula (1) and represent an alkyl group which may have a substituent or —(CH$_2$—CH$_2$—O)$_m$—$R^{21}$.

$R^1$ to $R^6$, $R^{11}$ to $R^{13}$, $R^{21}$ to $R^{29}$, LL, m, and n respectively have the same meanings as $R^1$ to $R^6$, $R^{11}$ to $R^{13}$, $R^{21}$ to $R^{29}$, LL, m, and n in General Formula (1). However, $R^1$ to $R^6$ and $R^{21}$ to $R^{29}$ are not bonded to the linking group LL.

In the compound, at least one of $R^1, \ldots, R^8, R^{22}, \ldots, R^{29}, L^1, \ldots,$ or $L^6$ includes a structure represented by —(CH$_2$—CH$_2$—O)$_m$. m has the same meaning as m described above.

Similar to the compound represented by General Formula (1), the compound represented by any one of General Formulae (1-1) to (1-3) is a neutral compound and contains at least one substituent capable of being bonded to a carboxy group or a biological substance.

The alkylene group which can be adopted as $L^1$ to $L^3$ corresponds to an alkylene group obtained by removing one hydrogen atom or one substituent from an alkyl group which may have a substituent and can be adopted as $R^5$ and $R^6$ described above, the description of which can be preferably applied. The alkylene group which can be used as $L^4$ to Le corresponds to an alkylene group obtained by removing one hydrogen atom or one substituent from an alkyl group which may have a substituent and can be used as $R^1$ to $R^4$, the description of which can be preferably applied.

The —(CH$_2$—CH$_2$—O)$_m$-alkylene-* which can be adopted as L$^1$ to L$^3$ corresponds to —(CH$_2$—CH$_2$—O)$_m$-alkylene obtained by removing one hydrogen atom or one substituent from R$^{21}$ of —(CH$_2$—CH$_2$—O)$_m$—R$^{21}$, where R$^{21}$ is an alkyl group which may have a substituent and can be adopted as R$^5$ and R$^6$ described above, the description of which can be preferably applied.

The —(CH$_2$—CH$_2$—O)$_m$-alkylene-* which can be adopted as L$^4$ to L$^6$ corresponds to —(CH$_2$—CH$_2$—O)$_m$-alkylene obtained by removing one hydrogen atom or one substituent from R$^{21}$ of —(CH$_2$—CH$_2$—O)$_m$—R$^{21}$ which can be adopted as R$^1$ to R$^4$, where R$^{21}$ is an alkyl group which may have a substituent, the description of which can be preferably applied.

From the viewpoint of further improving the fluorescence intensity, each of L$^1$ to L$^6$ contained in the compound preferably includes a structure represented by —(CH$_2$—CH$_2$—O)$_m$—. m has the same meaning as m described above.

From the viewpoint of further improving the fluorescence intensity in the states of the solution, the membrane, and the dot blot, it is more preferable that both of the two heterocyclic rings in each formula of General Formulae (1-1) to (1-3) satisfy Condition I.

(Condition I)

At least one substituent on an sp$^3$ carbon atom, which is a ring-constituting atom of the heterocyclic ring, and a substituent on a ring-constituting nitrogen atom of the heterocyclic ring include a structure represented by —(CH$_2$—CH$_2$—O)$_m$—.

That is, "both of the two heterocyclic rings in each formula of General Formulae (1-1) to (1-3) satisfy Condition I" means that in General Formula (1-1), at least one of R$^1$ or R$^2$, at least one of R$^3$ or R$^4$, L$^1$, and L$^2$ have a structure represented by —(CH$_2$—CH$_2$—O)$_m$—. In General Formula (1-2), it means that at least one of R$^1$ or R$^2$, at least one of L$^4$ or R$^7$, R$^6$, and L$^3$ includes a structure represented by —(CH$_2$—CH$_2$—O)$_m$—. In General Formula (1-3), it means that at least one of R$^7$ or L$^6$, at least one of R$^8$ or L$^5$, R$^5$, and R$^6$ includes a structure represented by —(CH$_2$—CH$_2$—O)$_m$—.

Among the compounds represented by any one of General Formulae (1 to 1) to (1-3), the compound represented by General Formula (1-1) is preferable from the viewpoint of obtaining more excellent fluorescence intensity. This is conceived to be because the compound represented by General Formula (1-1) easily maintains the flatness of the compound, and heat deactivation due to structural strain is suppressed to a minimum.

From the viewpoint of obtaining more excellent fluorescence intensity, the upper limit of the number of linking atoms constituting the shortest molecular chain that constitutes a linking chain formed from L$^1$ and L$^2$, L$^3$ and L$^4$, or L$^5$ and L$^6$, and the linking group LL (that is, a linking chain represented by -L$^1$-LL-L$^2$-, -L$^3$-LL-L$^4$-, or -L$^5$-LL-L$^6$-) is preferably 37 or less, more preferably 31 or less, and still more preferably 25 or less.

In the present invention, from the viewpoint of obtaining a more excellent fluorescence intensity, the preferred compound is the compound represented by General Formula (1-1), in which at least one of R$^{11}$, R$^{12}$, or R$^{13}$ is an aryloxy group, the two heterocyclic rings in Formula (1-1) satisfy Condition I described above, and at least one of R$^1$ or R$^2$, at least one of R$^3$ or R$^4$, L$^1$, and L$^2$ contains an ethyleneoxy group having a repetition number of 1 to 50, it is more preferable the repetition number of all ethyleneoxy groups contained in R$^1$ to R$^4$ is 1 to 6 (preferably 1 to 4), and it is still more preferable that the upper limit of the number of linking atoms constituting the shortest molecular chain that constitutes a linking chain (that is, a linking chain represented by -L$^1$-LL-L$^2$-) formed from L$^1$ and L$^2$ and the linking group LL is equal to or less than the above-described preferred range.

Specific examples of the compound according to the embodiment of the present invention, which is represented by General Formula (1), will be shown; however, the present invention is not limited to these compounds. In the following specific examples, the sulfo group may adopt a salt structure in which a hydrogen atom is dissociated. In the following specific examples, EO$_m$ represents a structure shown below, and Me represents a methyl group. However, EO$_m$ is bonded to the ring-constituting atom of the indoline ring or the indolenine ring, or the nitrogen atom or the oxygen atom on the carbon atom side.

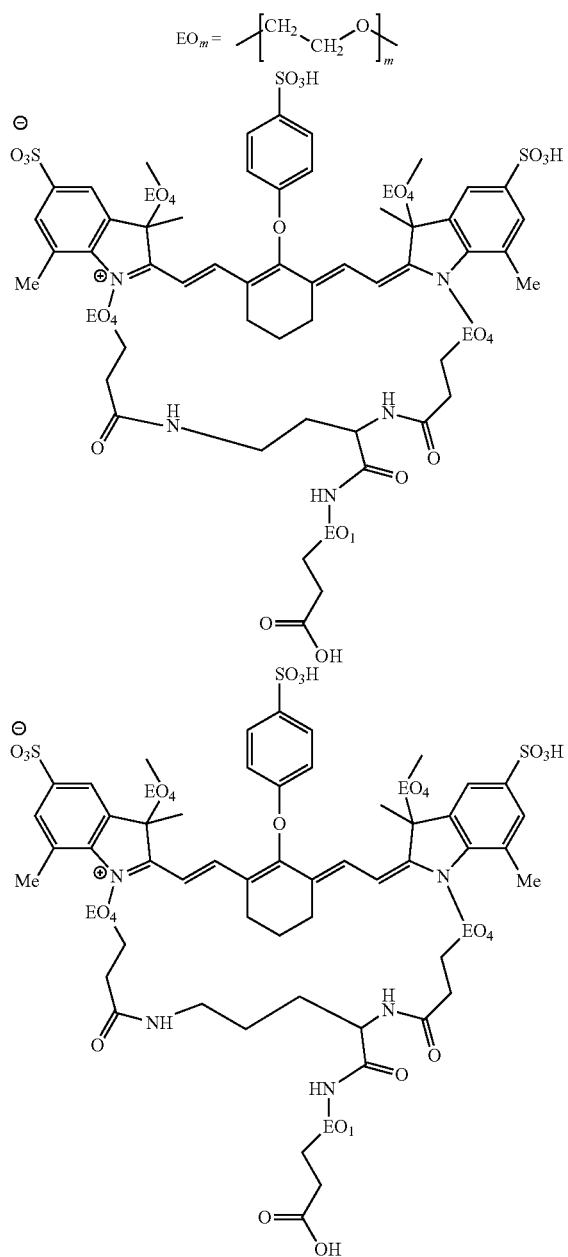

21
-continued
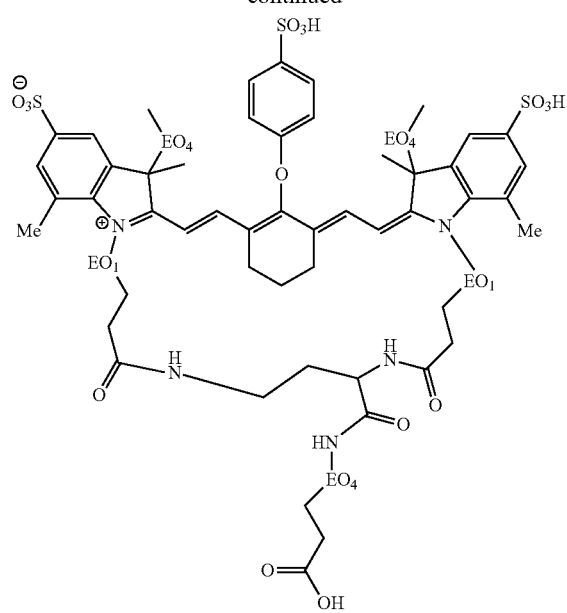
22
-continued
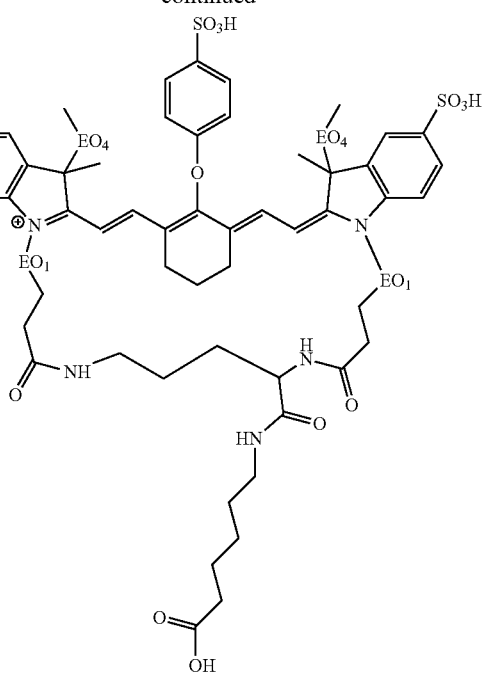
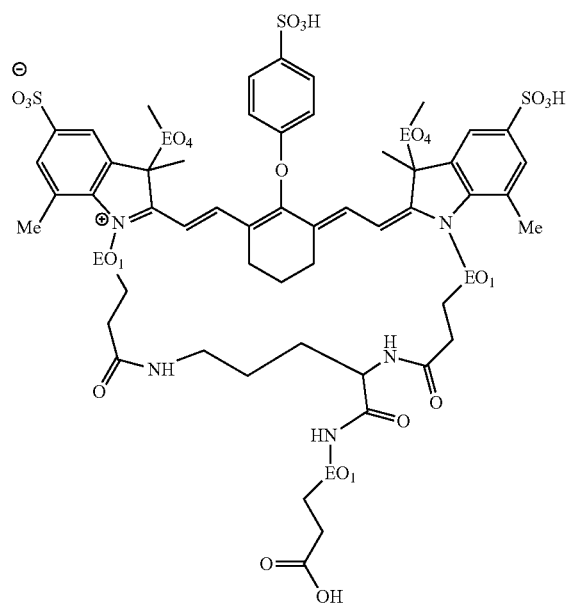
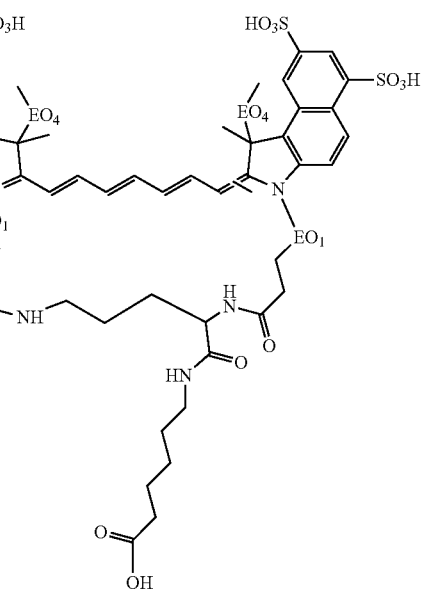

23
-continued
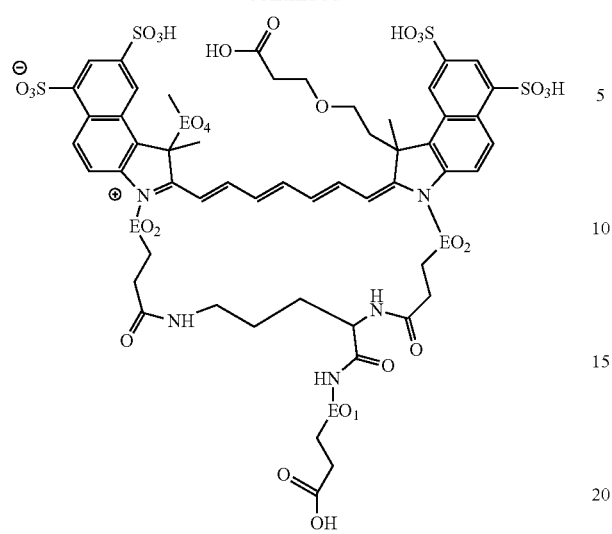
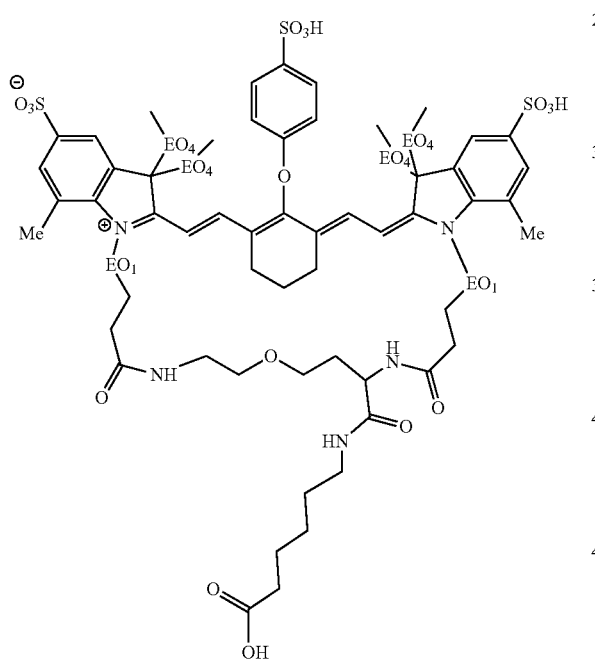
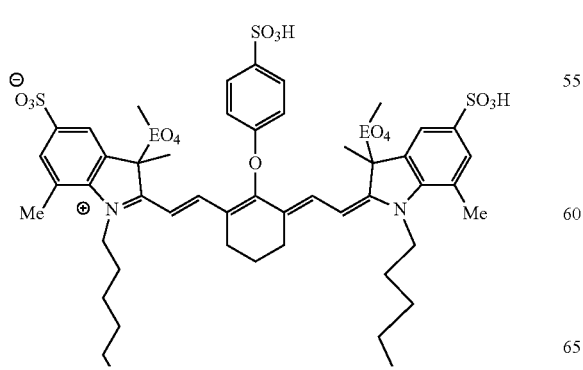
24
-continued
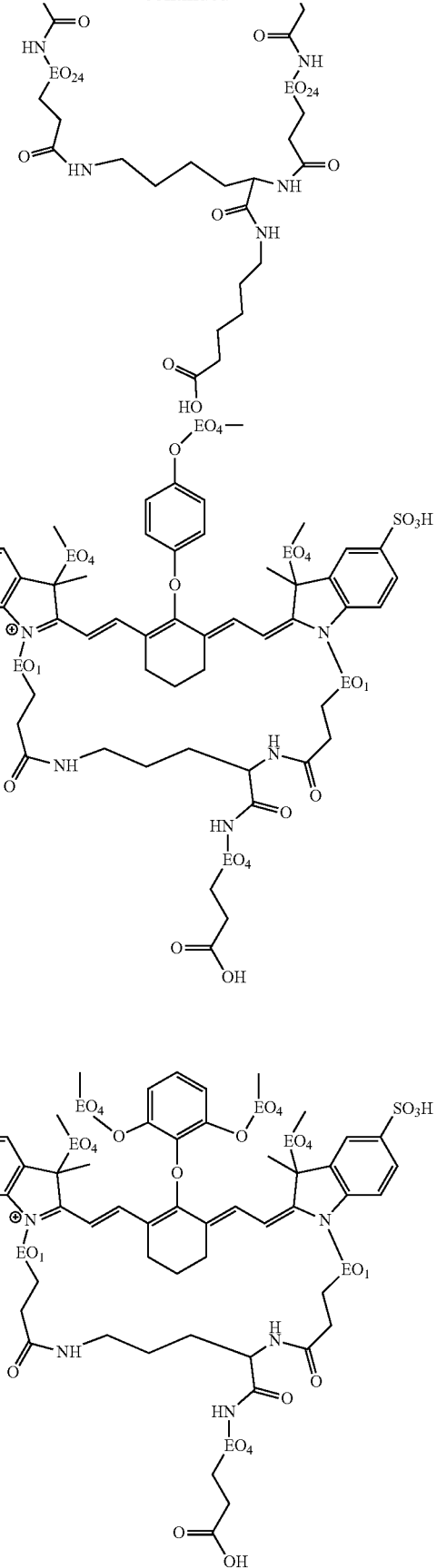

25
-continued
26
-continued
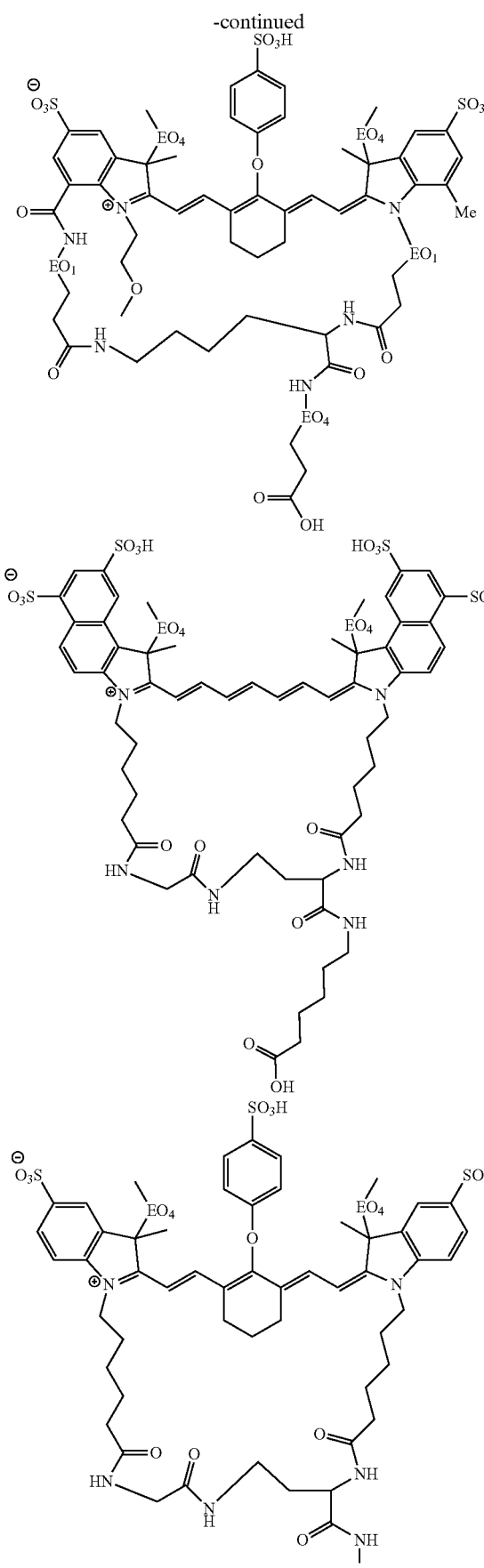
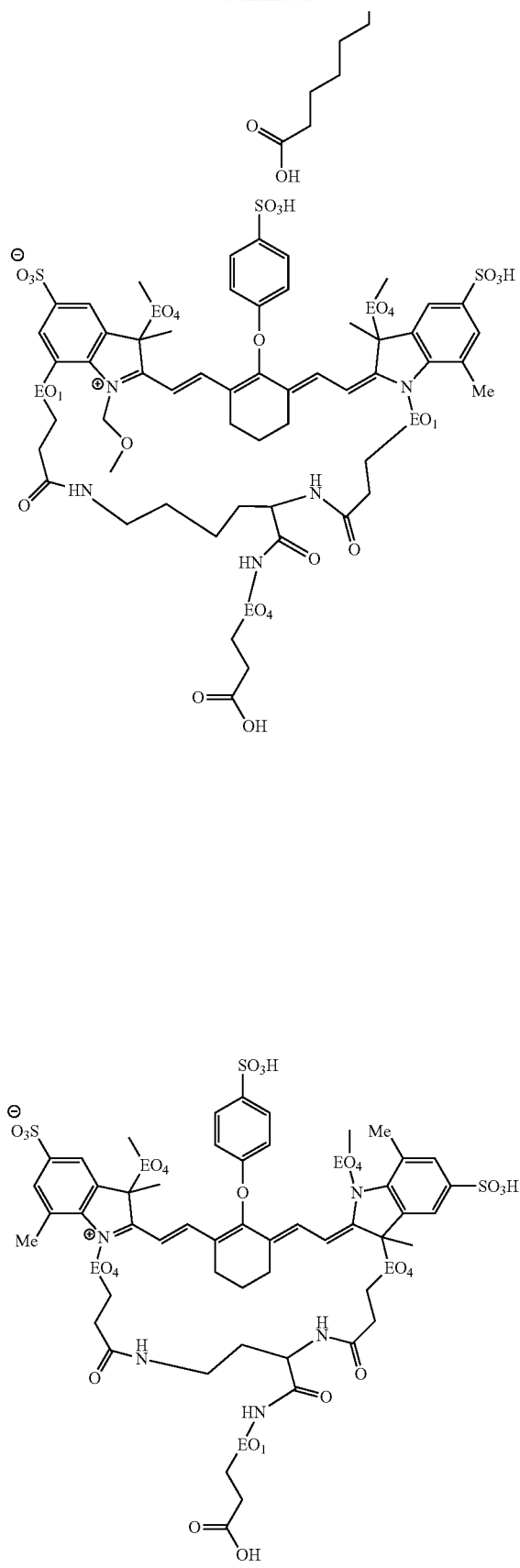

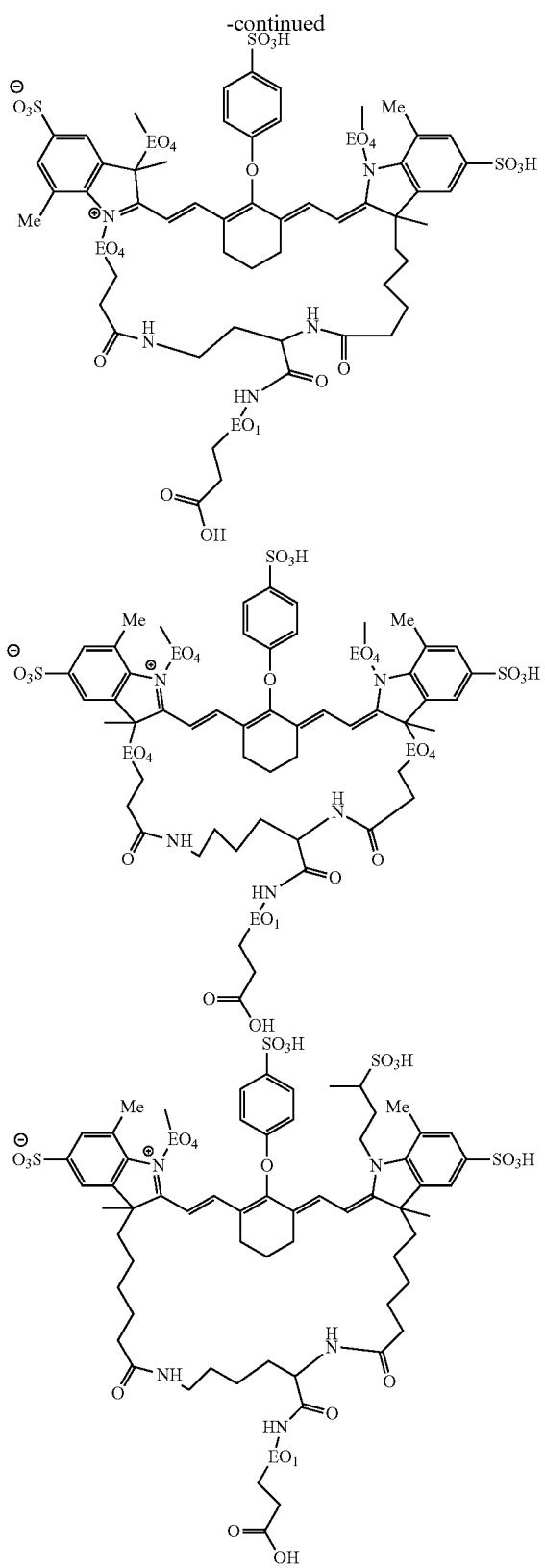

The compound according to the embodiment of the present invention, which is represented by Formula (1), can be bonded to a biological substance such as a protein, a peptide, an amino acid, a nucleic acid, a sugar chain, or a lipid, with at least one substituent capable of being bonded to a biological substance, where the substituent is contained in the compound, and it can be used as a labeled biological substance.

The substituent capable of being bonded to a biological substance can be used without particular limitation as long as it is a group for acting (including adhering) or bonding to a biological substance, and examples thereof include the substituents described in WO2002/026891A. Among them, preferred examples thereof include an N-hydroxysuccinimide ester (NHS) structure, a succinimide structure, a maleimide structure, an azido group, an acetylene group, a peptide structure (a polyamino acid structure), a long-chain alkyl group (preferably having 12 to 30 carbon atoms), and a quaternary ammonium group.

Among the compounds according to the embodiment of the present invention, which are represented by General Formula (1), specific examples of the compound having at least one substituent capable of being bonded to a biological substance include exemplary compounds in the labeled biological substance described later. Further, specific examples thereof also include a form of an exemplary compound of the compound according to the embodiment of the present invention represented by General Formula (1), in which a substituent capable of being bonded to a biological substance is contained and which is shown as an exemplary compound of the labeled biological substance described later. It is noted that the present invention is not limited to these compounds. For example, in the specific examples thereof, a group having a dissociative hydrogen atom such as a specific hydrophilic group Pi may adopt a salt structure by a hydrogen atom being dissociated therefrom.

The compound according to the embodiment of the present invention, which is represented by General Formula (1), can be synthesized by a known method except that the compound structure is the structure regulated by General Formula (1). For example, the methods disclosed in WO2005/000218A, WO2006/047452A, WO2012/012595A, and the like can be mentioned.

A compound having a substituent capable of being bonded to a biological substance can be synthesized by a known method except that the compound structure is the structure regulated by General Formula (1). For example, Bioconjugate Techniques (Third Edition, written by Greg T. Hermanson) can be referred to.

<<Labeled Biological Substance>>

The labeled biological substance according to the embodiment of the present invention is a substance in which the compound according to the embodiment of the present invention, which is represented by General Formula (1), is bonded to a biological substance. Since the compound according to the embodiment of the present invention, which is represented by General Formula (1), has fluorescence and exhibits an absorption wavelength peak suitable for color development in the near infrared range and an excellent fluorescence intensity, it can be preferably used for a labeled biological substance. The bond between the compound represented by General Formula (1) and a biological substance may have a form in which the compound represented by General Formula (1) and the biological substance are directly bonded or a form in which they are linked through a linking group.

Preferred examples of the biological substance include a protein, a peptide, an amino acid, a nucleic acid, a sugar chain, and a lipid. Preferred examples of the protein include an antibody, and preferred examples of the lipid include a phospholipid, a fatty acid, sterol, where a phospholipid is more preferable.

Among the above biological substances, the clinically useful substance is not particularly limited, but examples thereof include immunoglobulins such as immunoglobulin (Ig) G, IgM, IgE, IgA, and IgD; plasma proteins such as complement, C-reactive protein (CRP), ferritin, $\alpha_1$ microglobulin, $\beta_2$ microglobulin, and antibodies thereof; tumor markers such as α-fetoprotein, carcinoembryonic antigen (CEA), prostate acid phosphatase (PAP), carbohydrate antigen (CA) 19-9, and CA-125, and antibodies thereof; hormones such as luteinizing hormone (LH), follicle-stimulating hormone (FSH), human ciliated gonadotropin (hCG), estrogen, and insulin, and antibodies thereof; and viral infection-related substances of viruses such HIV and ATL, hepatitis B virus (HBV)-related antigens (HBs, HBe, and HBc), human immunodeficiency virus (HIV), adult T-cell leukemia (ATL), and antibodies thereof.

The examples thereof further include bacteria such as *Corynebacterium diphtheriae, Clostridium botulinum, mycoplasma,* and *Treponema pallidum*, and antibodies thereof; protozoa such as *Toxoplasma, Trichomonas, Leishmania, Trypanosoma*, and malaria parasites, and antibodies thereof; embryonic stem (ES) cells such as ELM3, HM1, KH2, v6.5, v17.2, v26.2 (derived from mice, 129, 129/SV, C57BL/6, and BALB/c), and antibodies thereof; antiepileptic drugs such as phenytoin and phenobarbital; cardiovascular drugs such as quinidine and digoxin; anti-asthma drugs such as theophylline; drugs such as antibiotics such as chloramphenicol and gentamicin, and antibodies thereof; and enzymes, extracellular toxins (for example, styrelidine O), and the like, and antibodies thereof. In addition, antibody fragments such as Fab'2, Fab, and Fv can also be used.

Examples of the specific form in which the compound according to the embodiment of the present invention, which is represented by General Formula (1), (hereinafter, also abbreviated as the compound (1) and the biological substance interact with each other to be bonded include the forms described below, i) non-covalent bond (for example, hydrogen bond, ionic bond including chelate formation) or covalent bond between a peptide in the compound (1) and a peptide in the biological substance, ii) van der Waals force between a long-chain alkyl group in the compound (1) and a lipid bilayer, a lipid, or the like in the biological substance, iii) an amide bond formed by reacting an N-hydroxysuccinimide ester (NHS ester) in the compound (1) with an amino group in the biological substance, iv) a thioether bond formed by reacting a maleimide group in the compound (1) with a sulfanyl group (—SH) in the biological substance, and v) a formation of a triazole ring, which is formed by the Click reaction between an azido group in the compound (1) and an acetylene group in the biological substance, or the Click reaction between an acetylene group in the compound (1) and an azido group in the biological substance.

In addition to the forms i) to v) described above, the bonding can be formed, for example, in the form described in Lucas C. D. de Rezende and Flavio da Silva Emery. A Review of the Synthetic Strategies for the Development of BODIPY Dyes for Conjugation with Proteins, Orbital: The Electronic Journal of Chemistry, 2013, Vol 5, No. 1, p. 62-83. Further, the method described in the same document can be appropriately referred to for the preparation of the labeled biological substance according to the embodiment of the present invention.

Among the compounds according to the embodiment of the present invention, which are represented by General Formula (1), specific examples of the labeled biological substance according to the embodiment of the present invention, which is obtained from a compound having a substituent capable of being bonded to a biological substance and a biological substance that is bonded to the compound by an interaction, are shown below. However, the present invention is not limited to these labeled biological substances and the like. In the following specific examples, a group having a dissociative hydrogen atom such as a sulfo group may adopt a salt structure by a hydrogen atom being dissociated therefrom. $EO_1$ and $EO_4$ respectively have the same meaning as $EO_1$ and $EO_4$ in the specific examples of the compound represented by General Formula (1) described above.

| Compound example | Product (bonding mode) |
|---|---|
| 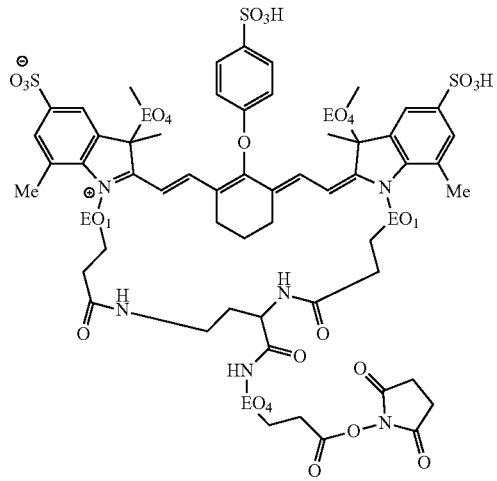 | 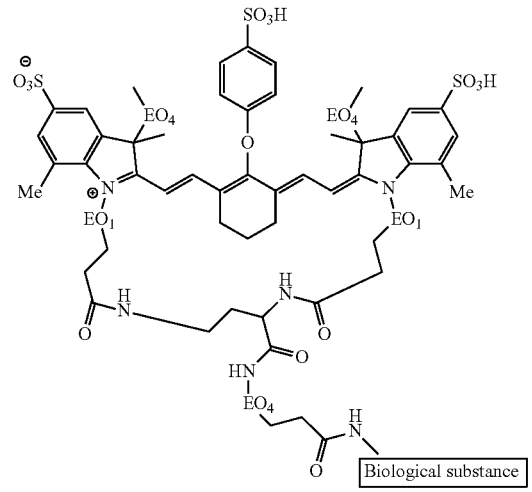 |
| NHS ester structure | Bonding through amino group of biological substance |

| Compound example | Product (bonding mode) |
|---|---|
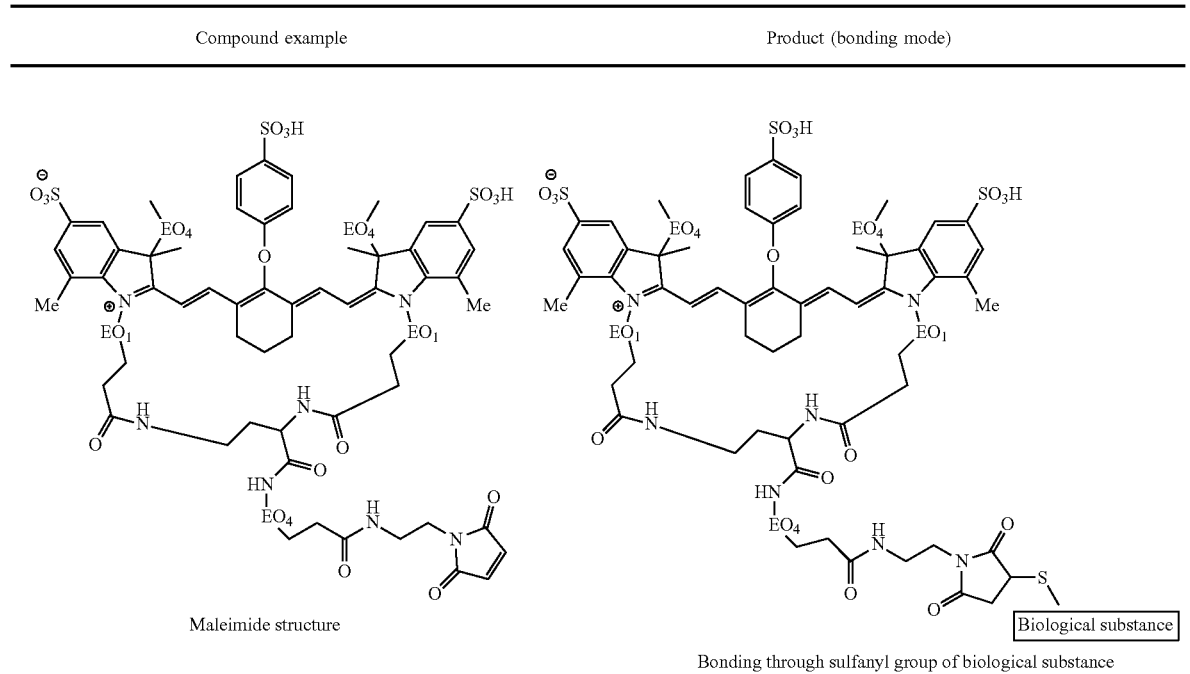
Maleimide structure
Bonding through sulfanyl group of biological substance
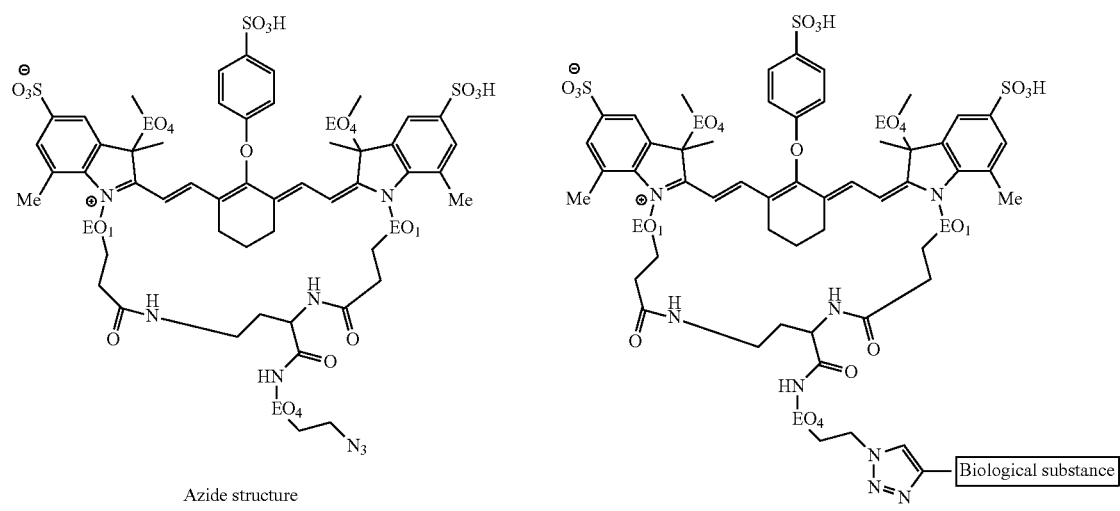
Azide structure
Click reaction through acetylene group of biological substance -continued

| Compound example | Product (bonding mode) |
|---|---|
| Acetylene structure | Click reaction through azide group of biological substance |
| Peptide structure (polyamino acid structure) | Bonding through peptide of biological substance |
| Long-chain alkyl structure | Van der Waals force through lipid bilayer, phospholipid, or the like of biological substance |

<Reagent Containing Labeled Biological Substance>

In the reagent containing the labeled biological substance according to the embodiment of the present invention, the form of the labeled biological substance according to the embodiment of the present invention, for example, a solution form dissolved in an aqueous medium such as physiological saline and a phosphate buffer solution, and a solid form such as a fine particle powder or a lyophilized powder, is not particularly limited and can be appropriately selected depending on the purpose of use.

For example, in a case where the labeled biological substance according to the embodiment of the present invention is used as a fluorescence labeling reagent, it can be used as a reagent containing the labeled biological substance having any one of the forms described above.

<Use Application of Labeled Biological Substance>

The labeled biological substance according to the embodiment of the present invention, obtained from the compound according to the embodiment of the present invention, which is represented by General Formula (1), can exhibit an excellent fluorescence intensity and stably detect fluorescence emitted from the labeled biological substance excited by light irradiation. As a result, the labeled biological substance according to the embodiment of the present invention can be applied to various techniques using the fluorescence labeling, and it can be suitably used, for example, as a fluorescence labeling reagent in a multicolor WB or dot blotting or as a reagent for in vivo fluorescence imaging.

The fluorescence detection carried out using the labeled biological substance according to the embodiment of the present invention usually includes the following processes (i) to (iii) or (iv) to (vii). The fluorescence detection including the processes (i) to (iii) corresponds to the direct method using a primary antibody fluorescently labeled with the compound according to the embodiment of the present invention, and the fluorescence detection including the processes (iv) to (vii) corresponds to the indirect method using a secondary antibody fluorescently labeled with the compound according to the embodiment of the present invention.

(i) The process of preparing each of the following (a) and (b)

(a) A sample containing a targeted biological substance (hereinafter, also referred to as a "target biological substance")

(b) A labeled biological substance according to the embodiment of the present invention (hereinafter, also referred to as a "labeled biological substance A according to the embodiment of the present invention") obtained by bonding the biological substance (hereinafter, also referred to as a "primary biological substance") capable of binding to the target biological substance in the above (a) to the compound according to the embodiment of the present invention (ii) The process of preparing a conjugate (hereinafter, also referred to as a "fluorescently labeled conjugate A") in which the target biological substance in the above (a) is bonded to the primary biological substance in the labeled biological substance A according to the embodiment of the present invention in the above (b)

(iii) The process of irradiating the fluorescently labeled conjugate A with light having the range of the wavelength which is absorbed by the labeled biological substance A according to the embodiment of the present invention, and detecting the fluorescence emitted by the labeled biological substance A according to the embodiment of the present invention (iv) The process of preparing each of the following (c) to (e)

(c) A sample containing a target biological substance (d) A biological substance capable of binding to the target biological substance in the above (c) (hereinafter, also referred to as a "primary biological substance")

(e) A labeled biological substance according to the embodiment of the present invention (hereinafter, also referred to as a "labeled biological substance B according to the embodiment of the present invention") obtained by bonding the biological substance (hereinafter, also referred to as a "secondary biological substance") capable of binding to the primary biological substance in the above (d) to the compound according to the embodiment of the present invention (hereinafter, also referred to as a "labeled biological substance B according to the embodiment of the present invention")

(v) The process of preparing a conjugate (hereinafter, also referred to as a "conjugate b") in which the target biological substance in the above (c) is bonded to the primary biological substance of the above (d)

(vi) The process of preparing a conjugate (hereinafter, also referred to as a "fluorescently labeled conjugate B2") in which the primary biological substance in the conjugate (b) is bonded to the secondary biological substance in the labeled biological substance B according to the embodiment of the present invention (vii) The process of irradiating the fluorescently labeled conjugate B2 with light having the range of the wavelength which is absorbed by the labeled biological substance B according to the embodiment of the present invention, and detecting the fluorescence emitted by the labeled biological substance B according to the embodiment of the present invention Examples of the biological substance (the primary biological substance) capable of binding to the target biological substance and the biological substance (the secondary biological substance) capable of binding to the primary biological substance include the biological substances in the labeled biological substance according to the embodiment of the present invention. The above biological substance can be appropriately selected in accordance with the target biological substance (a biological substance in the test object) or the primary biological substance, and a biological substance capable of specifically binding to the biological substance in the test object or to the primary biological substance can be selected.

Examples of the protein among the target biological substances include a protein, which is a so-called disease marker. The disease marker is not particularly limited, and examples thereof include α-fetoprotein (AFP), protein induced by vitamin K absence or antagonist II (PIVKA-II), breast carcinoma-associated antigen (BCA) 225, basic fetoprotein (BFP), carbohydrate antigen (CA) 15-3, CA19-9, CA72-4, CA125, CA130, CA602, CA54/61 (CA546), carcinoembryonic antigen (CEA), DUPAN-2, elastase 1, immunosuppressive acidic protein (IAP), NCC-ST-439, γ-seminoprotein (γ-Sm), prostate specific antigen (PSA), prostatic acid phosphatase (PAP), nerve specific enolase (NSE), Iba1, amyloid β, tau, flotillin, squamous cell carcinoma associated antigen (SCC antigen), sialyl LeX-i antigen (SLX), SPan-1, tissue polypeptide antigen (TPA), sialyl Tn antigen (STN), cytokeratin (CYFRA) pepsinogen (PG), C-reactive protein (CRP), serum amyloid A protein (SAA), myoglobin, creatine kinase (CK), troponin T, and ventricular muscle myosin light chain I.

The target biological substance may be a bacterium. Examples of the bacterium include a bacterium to be subjected to a cellular and microbiological test, which is not particularly limited. Specific examples thereof include *Escherichia coli, Salmonella, Legionella*, and bacteria causing problems in public health.

The target biological substance may be a virus. Although the virus is not particularly limited, examples of the virus antigen include hepatitis virus antigens such as hepatitis C and B virus antigens, p24 protein antigen of HIV virus, and pp65 protein antigen of cytomegalovirus (CMV), and E6 and E7 proteins of human papillomavirus (HPV).

In the above (i) or (iv), the sample containing the target biological substance is not particularly limited and can be prepared according to a conventional method.

In addition, the labeled biological substance according to the embodiment of the present invention is not particularly limited and can be prepared by bonding a biological substance capable of binding to a target biological substance to the compound according to the embodiment of the present invention, according to a conventional method. The form of the bond and the reaction to form the bond are as described above in the labeled biological substance according to the embodiment of the present invention.

In the above (v), the target biological substance may be directly bonded to the primary biological substance or may be bonded through another biological substance which is different from the target biological substance and the primary biological substance. Further, in the above (vi), the primary biological substance in the conjugate b may be directly bonded to the secondary biological substance in the labeled biological substance B according to the embodiment of the present invention or may be bonded through another biological substance which is different from the primary biological substance and the secondary biological substance.

The labeled biological substance according to the embodiment of the present invention can be used as a fluorescently labeled antibody in both the direct method and the indirect method but is preferably used as a fluorescently labeled antibody in the indirect method.

In the above (ii) or (v) and the (vi), the binding of the labeled biological substance or the like according to the embodiment of the present invention to the target biological substance is not particularly limited and can be carried out according to a conventional method.

In the above (iii) or (vii), the wavelength for exciting the labeled biological substance according to the embodiment of the present invention is not particularly limited as long as the wavelength is an emission wavelength (excitation wavelength) capable of exciting the labeled biological substance according to the embodiment of the present invention.

Since the labeled biological substance using a compound in which n is 1 among the compounds (1) according to the embodiment of the present invention has an absorption maximum wavelength in the vicinity of 585 nm (560 to 620 nm), the range of the wavelength of light to be emitted is preferably 530 to 650 nm and more preferably 550 to 630 nm. The labeled biological substance using this compound can be suitably used as a labeled biological substance that exhibits an excellent fluorescence intensity with respect to a light source for excitation wavelength in the vicinity of 600 nm in the visible range.

Since the labeled biological substance using a compound in which n is 2 among the compounds (1) according to the embodiment of the present invention has an absorption maximum wavelength in the vicinity of 685 nm (660 to 720 nm), the range of the wavelength of light to be emitted is preferably 630 to 750 nm and more preferably 650 to 730 nm. The labeled biological substance using this compound can be suitably used as a labeled biological substance that exhibits an excellent fluorescence intensity with respect to a light source for excitation wavelength in the vicinity of 700 nm in the near infrared range of the multicolor WB.

Since the labeled biological substance using a compound in which n is 3 among the compounds (1) according to the embodiment of the present invention has an absorption maximum wavelength in the vicinity of 785 nm (760 to 820 nm), the range of the wavelength of light to be emitted is preferably 730 to 850 nm and more preferably 750 to 830 nm. The labeled biological substance using this compound can be suitably used as a labeled biological substance that exhibits an excellent fluorescence intensity with respect to a light source for excitation wavelength in the vicinity of 800 nm in the near infrared range of the multicolor WB.

The fluorescence excitation light source used in the present invention is not particularly limited as long as it emits an emission wavelength (excitation wavelength) capable of exciting the labeled biological substance according to the embodiment of the present invention, and for example, various laser light sources can be used. In addition, various optical filters can be used to obtain a preferred excitation wavelength or detect only fluorescence.

Other matters in the above (i) to (vii) are not particularly limited, and conditions of a method, a reagent, a device, and the like, which are generally used in the fluorescence detection using fluorescence labeling, can be appropriately selected.

Further, regarding the processes other than the above (i) to (vii) as well, conditions of a method, a reagent, a device, and the like, which are generally used, can be appropriately selected in accordance with various methods using fluorescence labeling.

For example, in the multicolor WB using the labeled biological substance according to the embodiment of the present invention, it is possible to detect a target biological substance with excellent fluorescence intensity by preparing a blotted membrane according to a method generally used for a target biological substance (protein separation by electrophoresis, blotting to a membrane, and blocking of a membrane) and using the labeled biological substance according to the embodiment of the present invention as a labeled antibody (preferably, as a secondary antibody). In the dot blotting using the labeled biological substance according to the embodiment of the present invention, as in the case of the multicolor WB, it is possible to detect a target biological substance with excellent fluorescence intensity by preparing a blotted nitrocellulose membrane, a blotted PVDF (polyvinylidene fluoride) membrane, or the like according to a method generally used for a target biological substance and using the labeled biological substance according to the embodiment of the present invention as a labeled antibody (preferably, as a secondary antibody).

—Substituent Group T—

In the present invention, the preferred substituents include those selected from the following substituent group T.

In addition, in the present invention, in a case where it is simply described as a substituent, the substituent refers to the substituent group T, and in a case where an individual group, for example, an alkyl group is only described, a corresponding group in the substituent group T is preferably applied.

Further, in the present specification, in a case where an alkyl group is described separately from a cyclic (cyclo) alkyl group, the alkyl group is used to include a linear alkyl group and a branched alkyl group. On the other hand, in a case where an alkyl group is not described separately from a cyclic alkyl group, and unless otherwise specified, the alkyl group is used to include a linear alkyl group, a branched alkyl group, and a cycloalkyl group. This also applies to groups (alkoxy group, alkylthio group, alkenyloxy group, and the like) containing a group capable of having a cyclic structure (alkyl group, alkenyl group, alkynyl group, and the like) and compounds containing a group capable of having a cyclic structure. In a case where a group is capable of forming a cyclic skeleton, the lower limit of the number of atoms of the group forming the cyclic skeleton is 3 or more and preferably 5 or more, regardless of the lower limit of the number of atoms specifically described below for the group that can adopt this structure, In the following description for the substituent group T, a group having a linear or branched structure and a group having a cyclic structure, such as an alkyl group and a cycloalkyl group, are sometimes described separately for clarity.

The groups included in the substituent group T include the following groups.

An alkyl group (preferably having 1 to 30 carbon atoms, more preferably 1 to 20 carbon atoms, still more preferably 1 to 12 carbon atoms, still more preferably 1 to 8 carbon atoms, still more preferably 1 to 6 carbon atoms, and particularly preferably 1 to 3 carbon atoms), an alkenyl group (preferably having 2 to 30 carbon atoms, more preferably 2 to 20 carbon atoms, still more preferably 2 to 12 carbon atoms, still more preferably 2 to 6 carbon atoms, and even still more preferably 2 to 4 carbon atoms), an alkynyl group (preferably having 2 to 30 carbon atoms, still more preferably 2 to 20 carbon atoms, still more preferably 2 to 12 carbon atoms, still more preferably 2 to 6 carbon atoms, and even still more preferably 2 to 4 carbon atoms), a cycloalkyl group (preferably having 3 to 20 carbon atoms), a cycloalkenyl group (preferably having 5 to 20 carbon atoms), an aryl group (which may be a monocyclic group or may be a fused ring group (preferably a fused group in which 2 to 6 rings are fused); in a case of a fused ring group, the aryl group consists of a 5-membered to 7-membered ring; and the aryl group preferably has 6 to 40 carbon atoms, more preferably 6 to 30 carbon atoms, still more preferably 6 to 26 carbon atoms, and particularly preferably 6 to 10 carbon atoms), a heterocyclic group (which has, as a ring-constituting atom, at least one nitrogen atom, an oxygen atom, a sulfur atom, a phosphorus atom, a silicon atom, or selenium atom, may be a monocyclic ring, or may be a fused ring group (preferably a fused group in which 2 to 6 rings are fused); in a case of a monocyclic group, the monocyclic ring is preferably a 5-membered to 7-membered ring and more preferably a 5-membered or 6-membered ring; the heterocyclic group preferably has 2 to 40 carbon atoms and more preferably 2 to 20 carbon atoms; and the heterocyclic group includes an aromatic heterocyclic group (a heteroaryl group) and an aliphatic heterocyclic group (an aliphatic heterocyclic group), an alkoxy group (preferably having 1 to 20 carbon atoms, and more preferably having 1 to 12 carbon atoms), an alkenyloxy group (preferably having 2 to 20 carbon atoms, and more preferably having 2 to 12 carbon atoms), and an alkynyloxy group (preferably having 2 to 20 carbon atoms, and more preferably having 2 to 12 carbon atoms), a cycloalkyloxy group (preferably having 3 to 20 carbon atoms), an aryloxy group (preferably having 6 to 40 carbon atoms, more preferably having 6 to 26 carbon atoms, and still more preferably having 6 to 14 carbon atoms), a heterocyclic oxy group (preferably having 2 to 20 carbon atoms), a polyalkyleneoxy group (preferably having 2 to 40 carbon atoms and more preferably 2 to 20 carbon atoms), an alkoxycarbonyl group (preferably having 2 to 20 carbon atoms), a cycloalkoxycarbonyl group (preferably having 4 to 20 carbon atoms), an aryloxycarbonyl group (preferably having 6 to 20 carbon atoms), an amino group (preferably having 0 to 20 carbon atoms; the amino group includes an unsubstituted amino group ($-NH_2$), a (mono- or di-) alkylamino group, a (mono- or di-) alkenylamino group, a (mono- or di-) alkynylamino group, a (mono- or di-) cycloalkylamino group, a (mono- or di-) cycloalkenylamino group, a (mono- or di-) arylamino group, or a (mono- or di-) heterocyclic amino group, where each of the above groups substituting an unsubstituted amino group has the same definition as the corresponding group in the substituent group T), a sulfamoyl group (preferably having 0 to 20 carbon atoms; the sulfamoyl group is preferably an alkyl, cycloalkyl, or aryl sulfamoyl group), an acyl group (preferably having 1 to 20 carbon atoms, and more preferably having 2 to 15 carbon atoms), an acyloxy group (preferably having 1 to 20 carbon atoms), a carbamoyl group (preferably having 1 to 20 carbon atoms; the carbamoyl group is preferably an alkyl, cycloalkyl, or aryl carbamoyl group), an acylamino group (preferably having 1 to 20 carbon atoms), a sulfonamide group (preferably having 0 to 20 carbon atoms and preferably an alkyl, cycloalkyl, or aryl sulfonamide group), an alkylthio group (preferably having 1 to 20 carbon atoms and more preferably 1 to 12 carbon atoms), a cycloalkylthio group (preferably having 3 to 20 carbon atoms), an arylthio group (preferably having 6 to 40 carbon atoms, more preferably 6 to 26 carbon atoms, and still more preferably 6 to 14 carbon atoms), a heterocyclic thio group (preferably having 2 to 20 carbon atoms), an alkyl, cycloalkyl, or aryl sulfonyl group (preferably having 1 to 20 carbon atoms), a silyl group (preferably having 1 to 30 carbon atoms and more preferably 1 to 20 carbon atoms, and preferably substituted with an alkyl, aryl, alkoxy, or aryloxy), a silyloxy group (preferably having 1 to 20 carbon atoms and preferably substituted with an alkyl, aryl, alkoxy, or aryloxy), a hydroxy group, a cyano group, a nitro group, a halogen atom (for example, a fluorine atom, a chlorine atom, a bromine atom or an iodine atom), an oxygen atom (specifically replacing $>CH_2$ which constitutes a ring with $>C=O$), a carboxy group ($-CO_2H$), a phosphono group [$-PO(OH)_2$], a phosphonooxy group [$-O-PO(OH)_2$], a sulfo group ($-SO_3H$), a boric acid group [$-B(OH)_2$], an onio group (an ammonio group including a cyclic ammonio group, which contains a sulfonio group or a phosphonio group, and preferably has 0 to 30 carbon atoms and more preferably 1 to 20 carbon atoms), a sulfanyl group ($-SH$), an amino acid residue, and a polyamino acid residue.

Further, examples thereof include the above-described alkyl group, alkenyl group, alkynyl group, cycloalkyl group, cycloalkenyl group, aryl group, heterocyclic group, alkoxy group, alkenyloxy group, alkynyloxy group, cycloalkyloxy group, aryloxy group, heterocyclic oxy group, alkoxycarbonyl group, cycloalkoxycarbonyl group, aryloxycarbonyl group, amino group, sulfamoyl group, acyl group, acyloxy group, carbamoyl group, acylamino group, sulfonamide group, alkylthio group, cycloalkylthio group, arylthio group, heterocyclic thio group, and an alkyl, cycloalkyl, and aryl sulfonyl group, which have, as a substituent, a carboxy group, a phosphono group, a sulfo group, an onio group, an amino acid residue, a polyamino acid residue, or a $-(CH_2-CH_2-O)_m$-alkyl group (m have the same meanings as m in $R^1$ to $R^6$).

The substituent selected from the substituent group T is more preferably an alkyl group, an alkenyl group, a cycloalkyl group, an aryl group, a heterocyclic group, an alkoxy group, a cycloalkoxy group, an aryloxy group, an alkoxycarbonyl group, a cycloalkoxycarbonyl group, an amino group, an acylamino group, a cyano group or a halogen atom, and particularly preferably an alkyl group, an alkenyl group, an aryl group, a heterocyclic group, an alkoxy group, an alkoxycarbonyl group, an amino group, an acylamino group, or a cyano group.

The substituent selected from the substituent group T also includes a group obtained by combining a plurality of the above groups, unless otherwise specified. For example, in a case where a compound, a substituent, or the like contains an alkyl group, an alkenyl group, or the like, the alkyl group, the alkenyl group, or the like may be substituted or unsubstituted. In addition, in a case where a compound, a substituent, or the like contains an aryl group, a heterocyclic ring group, or the like, the aryl group, the heterocyclic ring group, or the like may be a monocyclic ring or a fused ring moiety, and may be substituted or unsubstituted.

EXAMPLES

Hereinafter, the present invention will be described in more detail based on Examples, but the present invention is not limited thereto. It is noted that room temperature means 25° C.

Compounds (1) to (7) and comparative compounds (1) and (6), used in Examples, are shown below.

It is noted that in the compounds of Examples, the sulfo group may include a salt structure (for example, a potassium salt, a sodium salt, a triethylamine (TEA) salt, or an N,N-diisopropylethylamine (DIPEA) salt), even unless otherwise specified. $EO_1$ and $EO_4$ respectively have the same meanings as $EO_1$ and $EO_4$ in the specific examples of the compound represented by General Formula (1) described above. m means an average repetition number. All of the compounds were synthesized using a compound in which the first decimal place of the average repetition number was 0 as a raw material.

Compound (1)

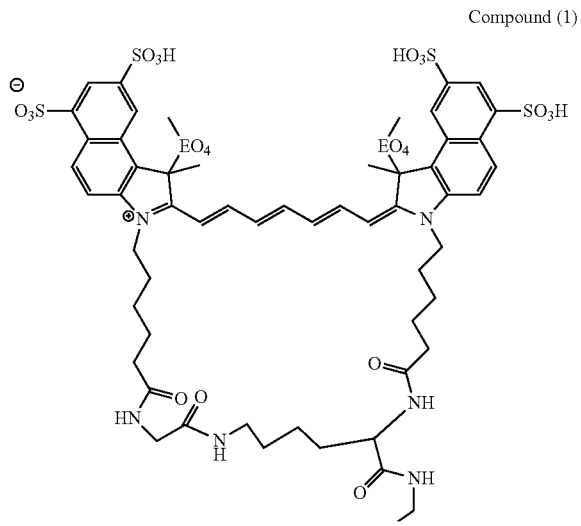

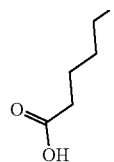

Compound (2)

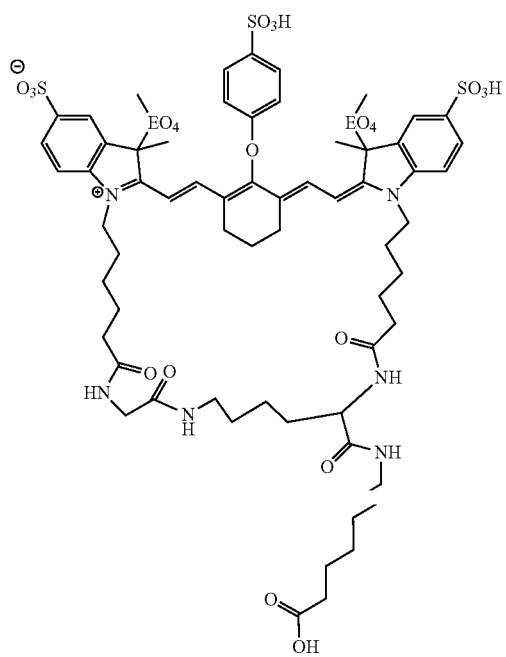

Compound (3)

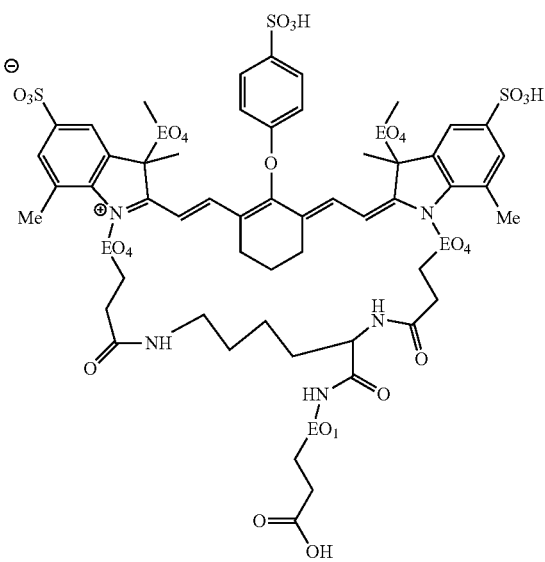

Compound (4)
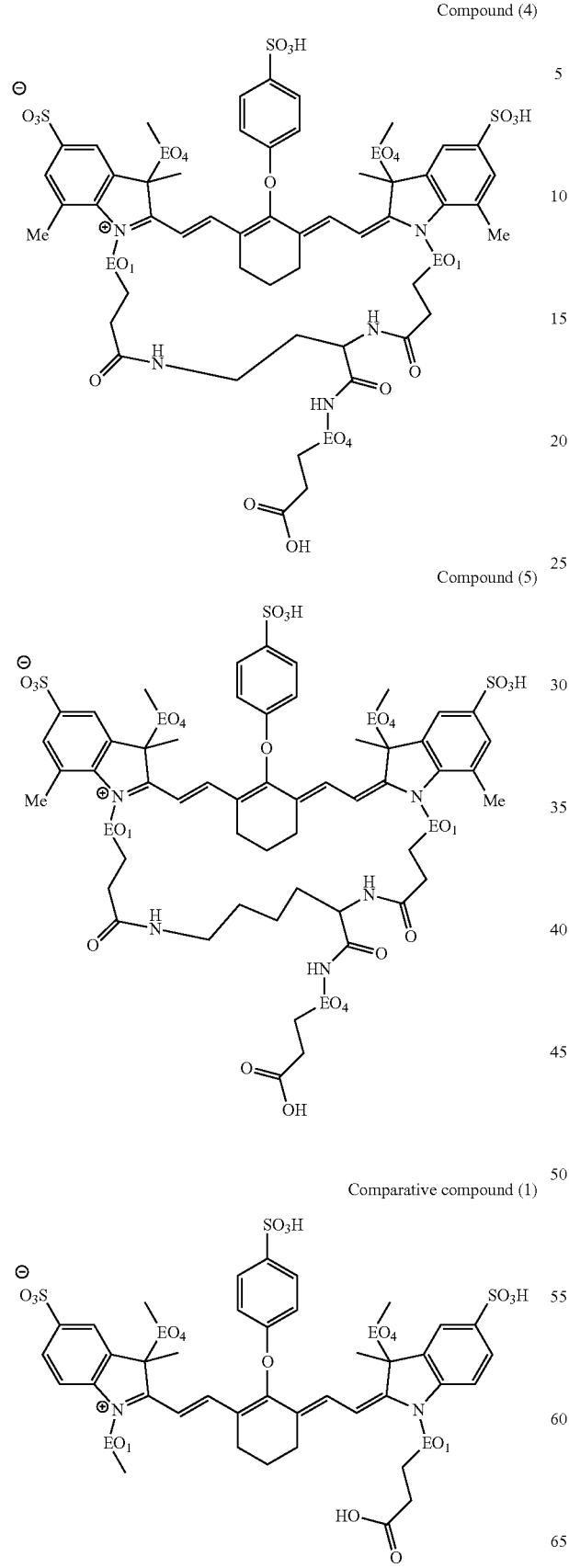
Compound (5)
Comparative compound (1)
Comparative compound (2)
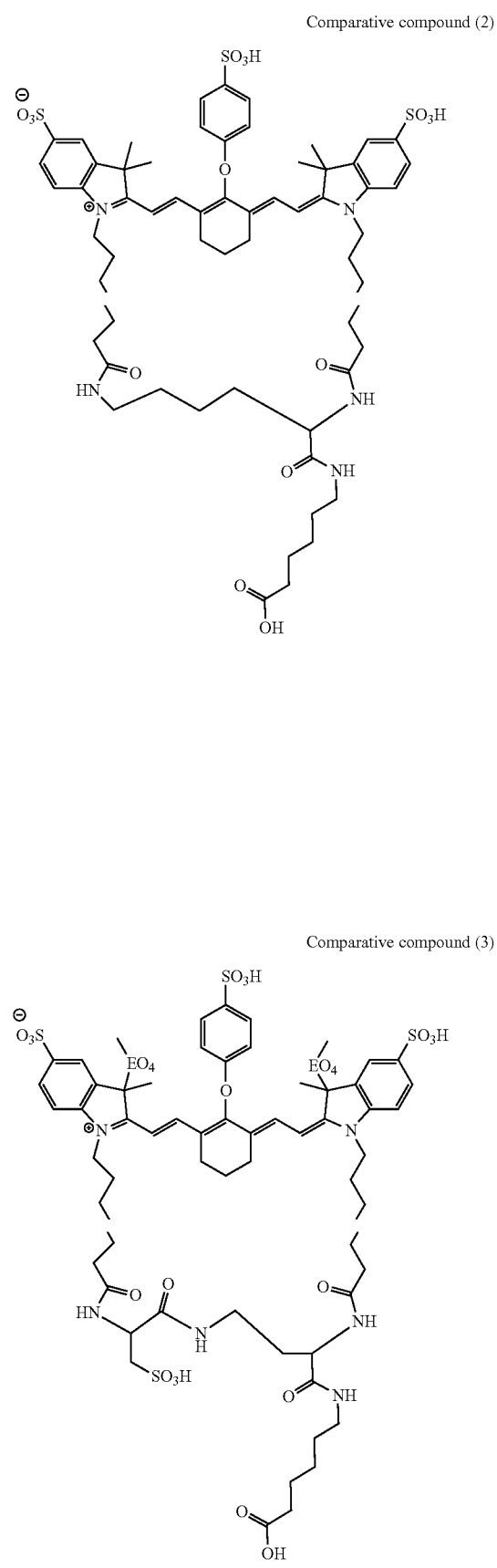
Comparative compound (3)

Comparative compound (4)
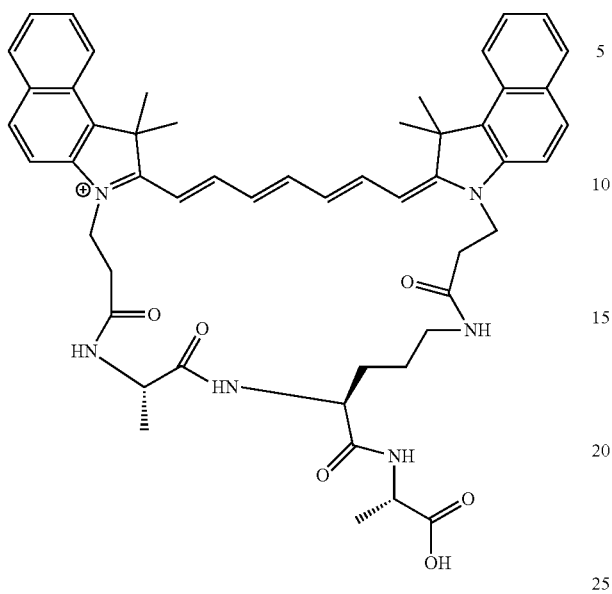
Comparative compound (6)
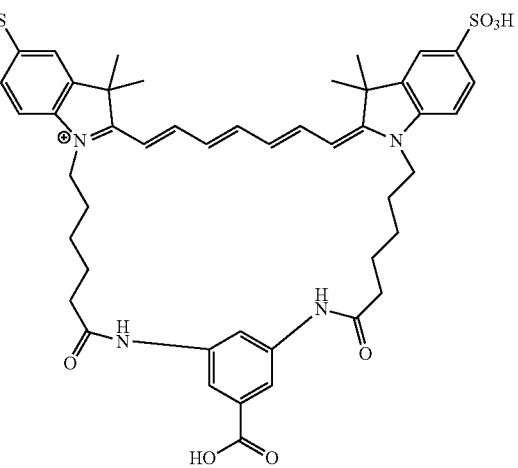
Comparative compound (5)
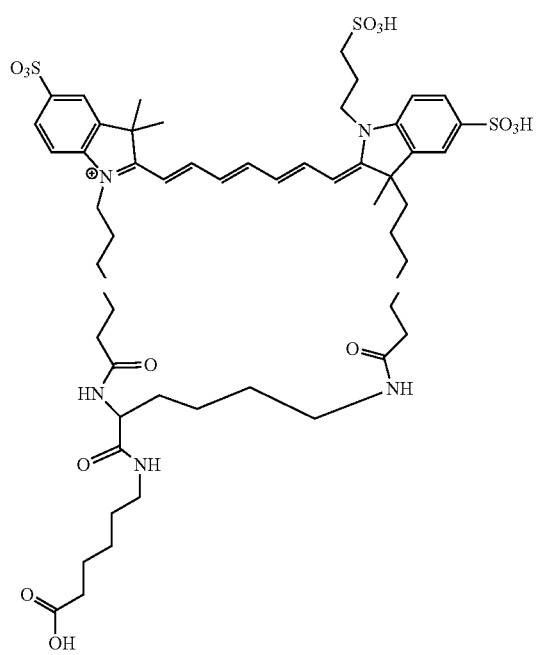
Compound (6)
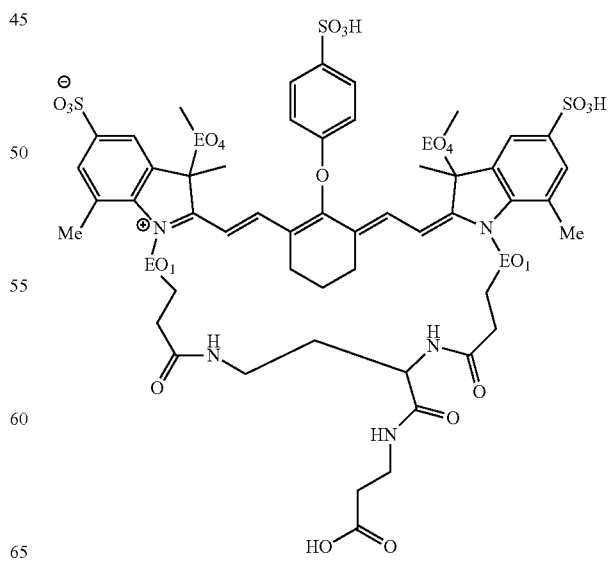

-continued

Compound (7)

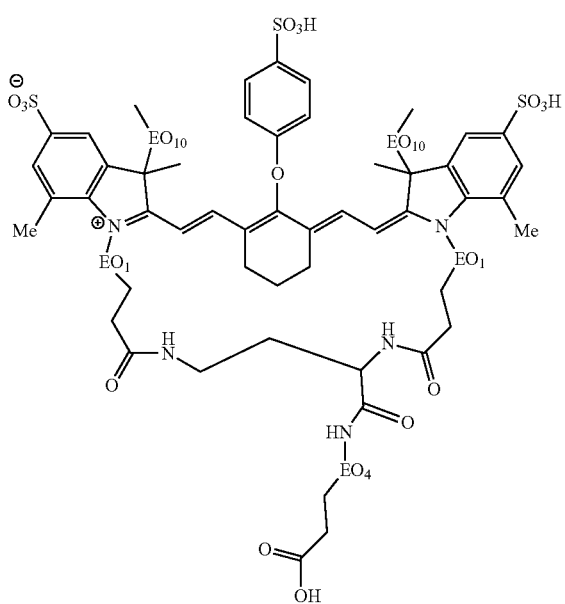

The method of synthesizing each compound and a labeled antibody will be described in detail below; however, the starting materials, the dye intermediates, and the synthetic routes are not limited thereto.

In the following synthetic route, room temperature means 25° C.

Unless otherwise specified, SNAP Ultra C18 (product name, manufactured by Biotage, LLC) or Sfar C18 (product name, manufactured by Biotage, LLC) was used as the carrier in the reverse phase column chromatography, and Hi-Flash Column (product name, manufactured by Yamazen Corporation) was used as a carrier in the normal phase column chromatography.

The mixing ratio in the eluent used in the reverse phase column chromatography or the normal phase column chromatography is in terms of the volume ratio. For example, "acetonitrile:water=from 0:100 to 20:80" means that the eluent of "acetonitrile:water=0:100" was changed to an eluent of "acetonitrile:water=20:80".

For the preparative high performance liquid chromatography (HPLC), 2767 (product name, manufactured by Waters Corporation) was used.

The MS spectrum was measured by ACQUITY SQD LC/MS System [product name, manufactured by Waters Corporation, ionization method: electrospray Ionization (ESI)] or LCMS-2010EV [product name, manufactured by Shimadzu Corporation, ionization method: an ionization method simultaneously carrying out ESI and atmospheric pressure chemical ionization (APCI)].

<Synthesis of Compound (1-NHS)>

A compound (1-NHS) was synthesized based on the following scheme.

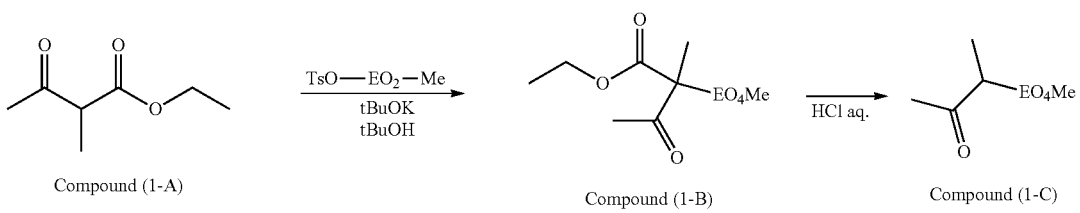

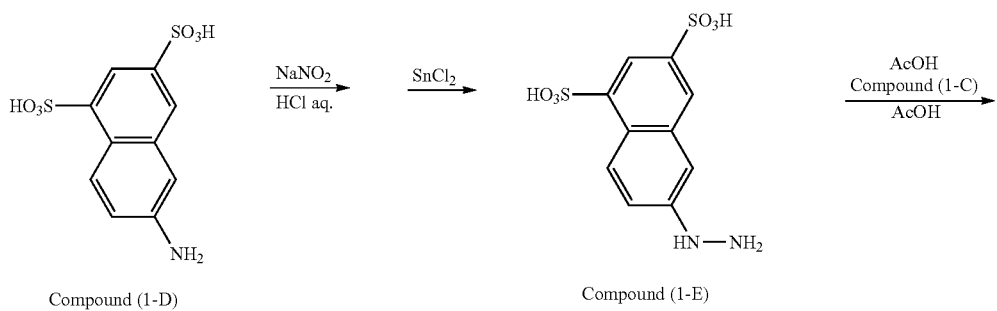

-continued
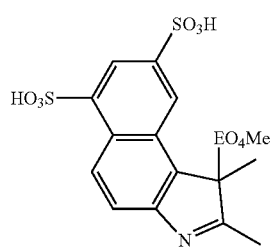
Compound (1-F)
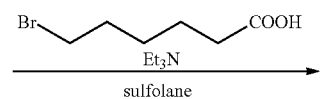
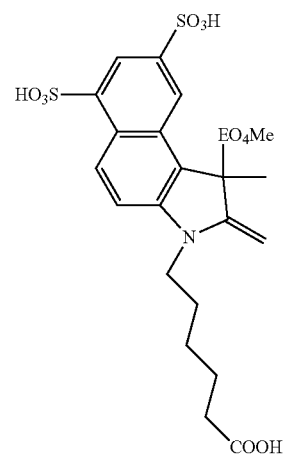
Compound (1-G)
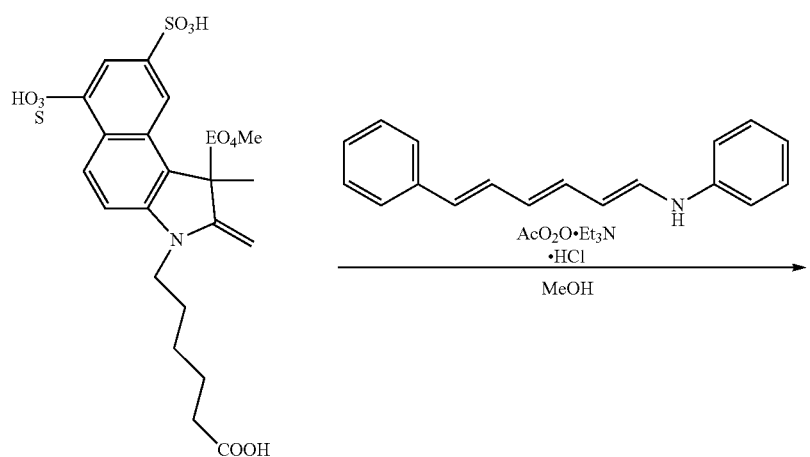
Compound (1-G)
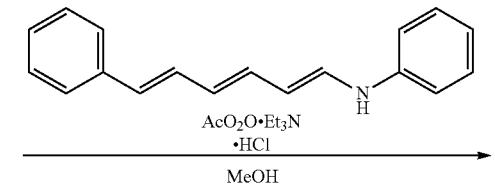
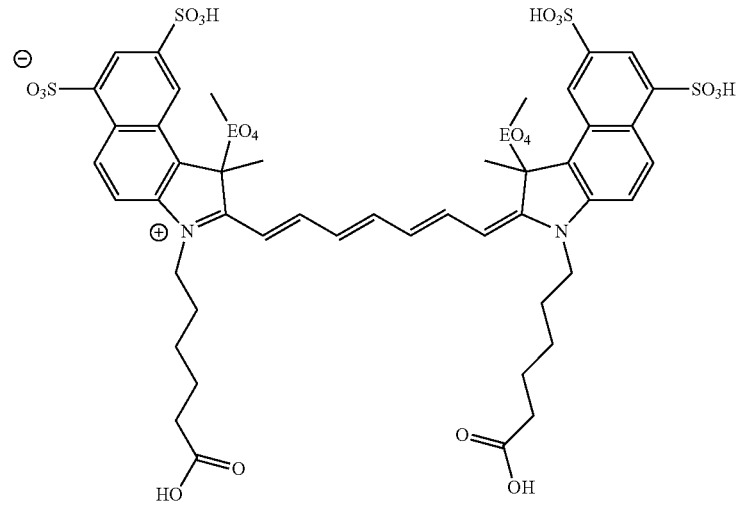
Compound (1-H)
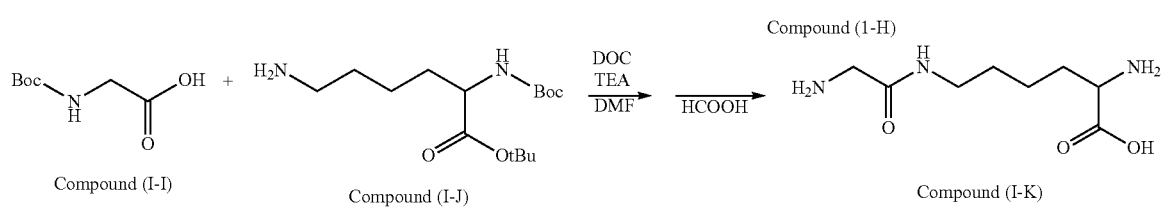
Compound (I-I)   Compound (I-J)   Compound (I-K)

51
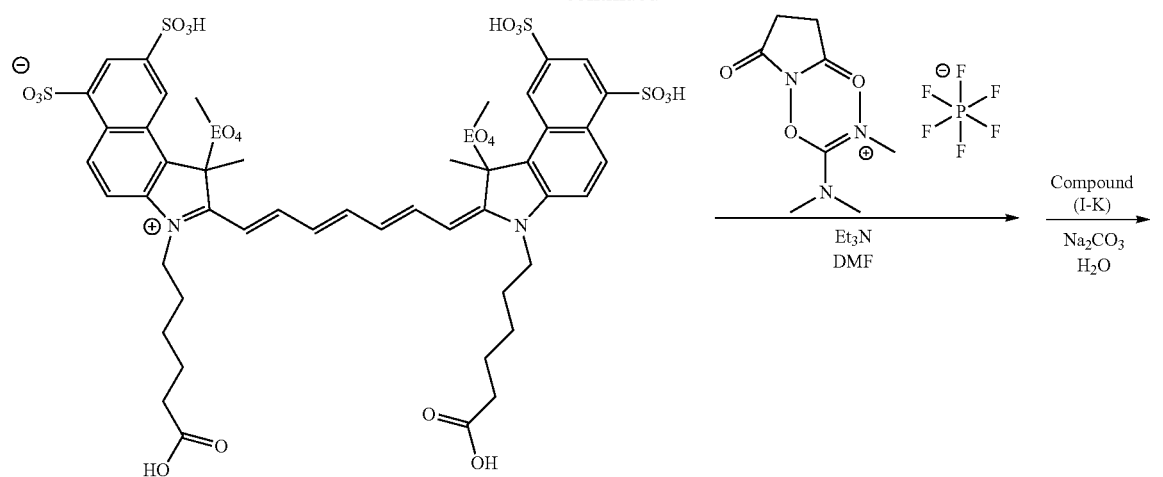
Compound (1-H)
-continued
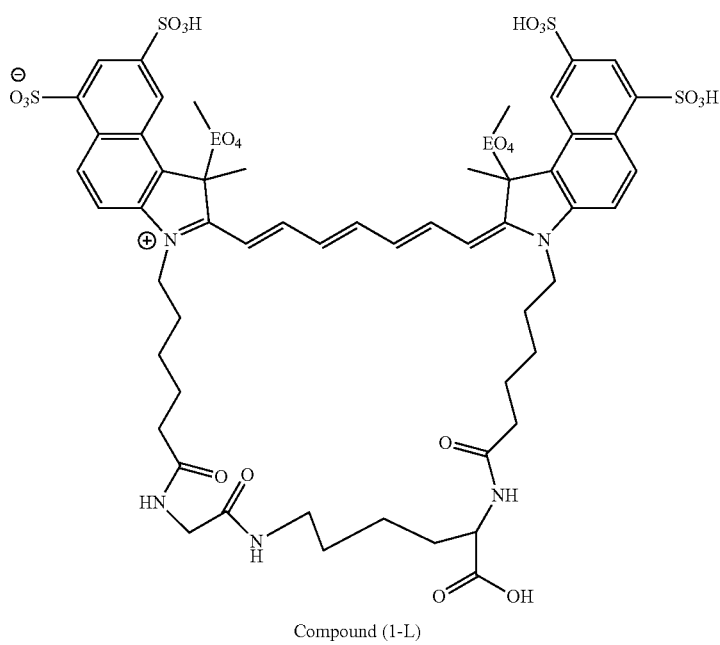
Compound (1-L)
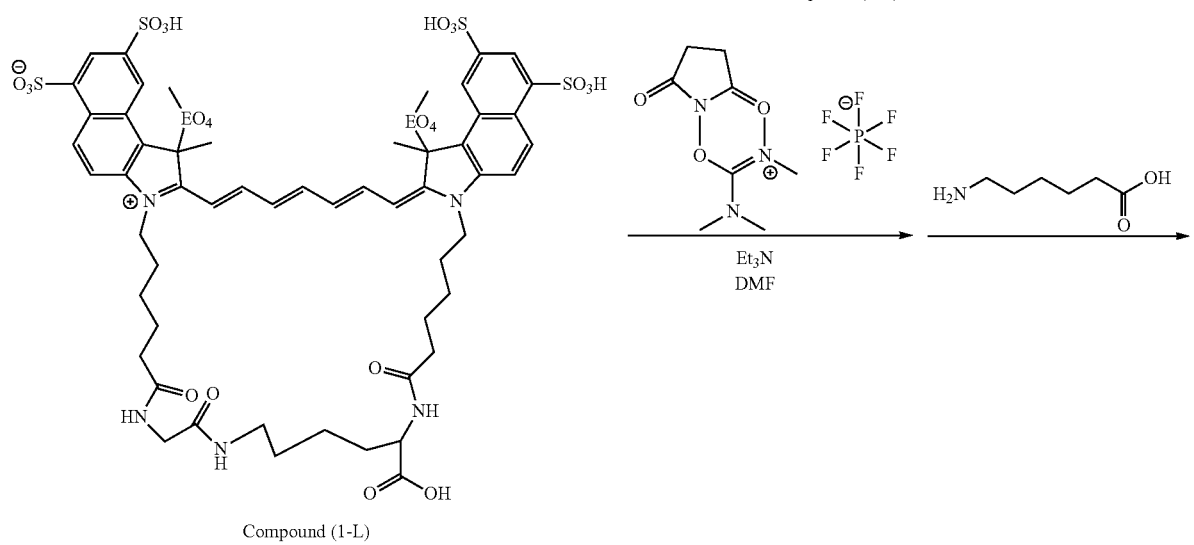
Compound (1-L)

-continued
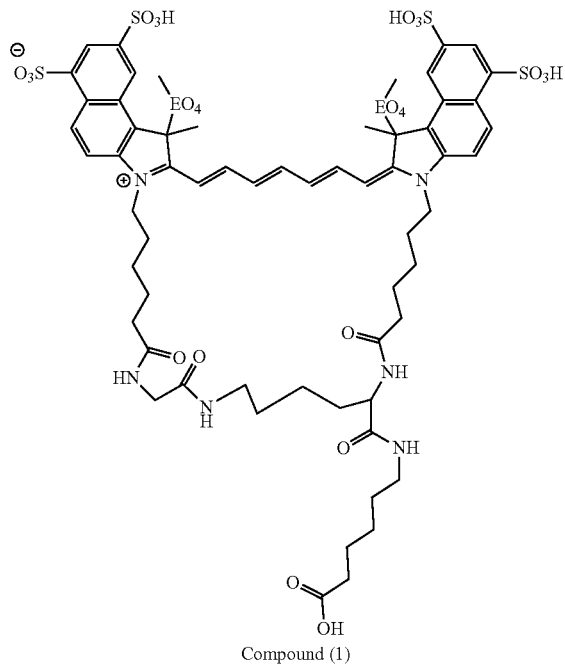
Compound (1)
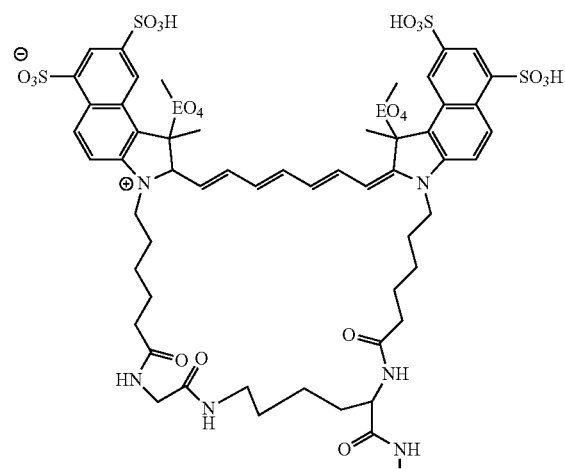
Compound (1)
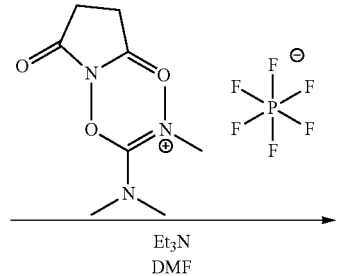
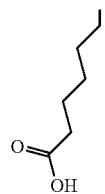
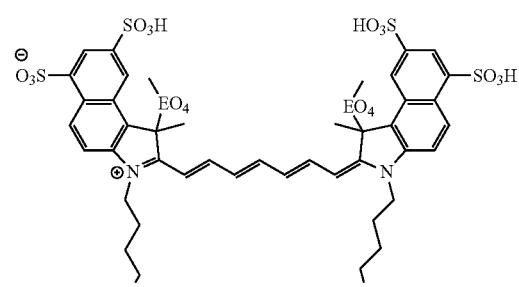

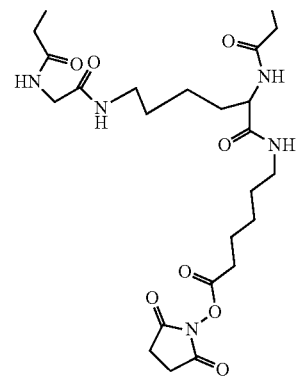

Compound (1-NHS)

1) Synthesis of Compound (1-C)

200 mL of tert-butanol (tBuOH) and 12 g of potassium tert-butoxide (tBuOK) were added in a nitrogen-substituted three-necked flask having a capacity of 50 mL, and while stirring the resultant mixture, 14.4 g of the compound (1-A) was added dropwise thereto, and stirring was carried out for a while. Next, 36.3 g of polyethylene glycol methyl ether tosylate (average repetition number of ethylene glycol units=4.0, TsO-EO$_4$-Me) was added dropwise thereto, and stirring was carried out at 80° C. for 1 hour. Then, the solvent was distilled off under reduced pressure, a liquid separation operation was carried out with ethyl acetate and distilled water, and a crude product was extracted with distilled water. 30 mL of a 30% hydrochloric acid aqueous solution was added to the obtained crude product, and stirring was carried out at 100° C. for 3 hours. Then, the solvent was distilled off under reduced pressure, and purification was carried out by normal phase column chromatography (eluent: hexane/ethyl acetate=from 50/50 to 30/70) to obtain 10.7 g of a compound (1-C).

2) Synthesis of Compound (1-E)

20 g of the compound (1-D) and 120 mL of distilled water were added in a three-necked flask having a capacity of 1 L, and while stirring the resultant mixture, 40 mL of a 30% hydrochloric acid aqueous solution was added dropwise thereto. The mixture was cooled in a salt-ice bath, and a solution obtained by dissolving 4.22 g of sodium nitrite in 80 mL of distilled water was slowly added dropwise while maintaining the temperature at 3° C. or lower, and then the mixture was stirred at 0° C. to 3° C. for 45 minutes. Subsequently, a solution obtained by dissolving 21 g of tin (II) chloride in 60 mL of distilled water and 20 mL of 30% HCl was slowly added dropwise, and then the mixture was stirred for 40 minutes at 7° C. or lower. The solvent was concentrated, and the residue was washed with isopropanol to obtain 15 g of a compound (1-E).

3) Synthesis of Compound (1-F)

2.0 g of the compound (1-E), 30 mL of acetic acid (AcOH), 2.5 g of the compound (1-C), and 1.24 g of potassium acetate (AcOK) were added in an eggplant flask having a capacity of 200 mL and stirred at 140° C. for 1 hour in a nitrogen atmosphere. The solvent was distilled off under reduced pressure, the purification was carried out by reverse phase column chromatography (eluent: acetonitrile/water=from 0/100 to 35/65) to obtain 1.0 g of a compound (1-F).

4) Synthesis of Compound (1-G)

500 mg of the compound (1-F), 2 mL of sulfolane, 365 mg of 6-bromohexanoic acid, and 0.169 mL of triethylamine (Et$_3$N) were added in an eggplant flask having a capacity of 50 mL and heated and stirred at 120° C. for 6 hours. Ethyl acetate was added to the reaction solution to cause precipitation. The precipitate was purified by reverse phase column chromatography (eluent: acetonitrile/water=from 0/100 to 20/100) to obtain 105 mg of a compound (1-G).

5) Synthesis of Compound (1-H)

50 mg of the compound (1-G) and 1 mL of methanol (MeOH) were added in a 25 mL eggplant flask. While stirring, 9 mg of glutaconaldehydedianil hydrochloride, 8 µl of acetic anhydride (Ac$_2$O), and 4 µl of triethylamine (Et$_3$N) were added thereto, and the resultant mixture was stirred for a while in a nitrogen atmosphere. After the reaction was settled, distilled water was added, and purification was carried out by reverse phase column chromatography (eluent: acetonitrile/water=from 0/100 to 30/70) to obtain 28 mg of a compound (1-H).

6) Synthesis of Compound (1-K)

700 mg of the compound (1-I), 20 mL of N,N-dimethylformamide (DMF), 1.2 g of N,N'-dicyclohexylcarbodiimide (DCC), and 1 mL of triethylamine (TEA) were added in a 50 mL eggplant flask, and stirring was carried out at room temperature for 1 hour in a nitrogen atmosphere. 1.2 g of the compound (1-J) was added thereto, and stirring was further carried out at room temperature for 1 hour. Then, the solvent was concentrated, extraction was carried out with 100 mL of ethyl acetate, and insoluble matter was removed by filtration through celite. After the concentration of the solvent, 20 mL of formic acid was added, and heating and stirring were carried at 80° C. for 3 hours. The solvent was distilled off under reduced pressure, the purification was carried out by reverse phase column chromatography (eluent: acetonitrile/water=from 0/100 to 20/80) to obtain 527 mg of a compound (1-K).

7) Synthesis of compound (1-L)

20 mg of the compound (1-H), 2 mL of DMF, 80 mg of N,N,N',N'-tetramethyl-O—(N-succinimidyl) uronium hexafluorophosphate (HSTU), and 77 µL of triethylamine (Et$_3$N) were added in an eggplant flask having a capacity of 10 mL, and stirring was carried out for 3 hours. Then, the reaction solution was added dropwise to a solution obtained by dissolving 10 mg of the compound (1-K) and 3 mg of sodium carbonate in 40 mL of water, and then, stirring was carried out for 3 hours. The reaction solution was concentrated and subsequently purified by preparative HPLC, and freeze drying was followed to obtain 15.1 mg of a compound (1-L).

8) Synthesis of Compound (1)

10.0 mg of the compound (1-L), 2 mL of DMF, 2 mg of N,N,N',N'-tetramethyl-O—(N-succinimidyl) uronium hexafluorophosphate (HSTU), and 5 μL of triethylamine (Et$_3$N) were added in an eggplant flask having a capacity of 10 mL, and the resultant mixture was reacted for 3 hours. Then, 1 mg of aminohexanoic acid was added to the reaction solution, and then, stirring was carried out for 3 hours. The reaction solution was concentrated and subsequently purified by preparative HPLC, and freeze drying was followed to obtain 6.1 mg of a compound (1). The results of the MS measurement of the compound (1) were as follows.

MS (ESI m/z): (M+H$^+$)$^+$=1,662, (M−H$^+$)$^−$=1,660

9) Synthesis of Compound (1-NHS)

0.28 mL of N,N-dimethylformamide (DMF), an N,N-dimethylformamide solution obtained by dissolving 1 mg of N,N,N',N'-tetramethyl-O—(N-succinimidyl) uronium hexafluorophosphate, and 1.3 μL of triethylamine (Et$_3$N) were added to 2.6 mg of the compound (1), and stirring was carried out for 1 hour. Then, the solvent was distilled off under reduced pressure, ethyl acetate was added, the supernatant was removed, and vacuum drying was carried out to obtain a compound (1-NHS).

<Synthesis of Compound (2-NHS)>

A compound (2-NHS) was synthesized in the same manner as in the synthesis of the compound (1-NHS) based on the following scheme. The results of the MS measurement of the compound (2) were as follows.

MS (ESI m/z): (M+H$^+$)$^+$=1,614, (M−H$^+$)$^−$=1,612

It is noted that the compound (2-F) and the compound (2-G) were synthesized as follows.

282 mg of the compound (2-D), 45.7 mg of the compound (2-E), 54.7 mg of potassium acetate (AcOK), and 2.0 mL of anhydrous acetic acid (Ac$_2$O) were added in a 25 mL eggplant flask, and stirring was carried out at 60° C. for 2 hours in a nitrogen atmosphere. After the reaction was settled, distilled water was added, and purification was carried out by reverse phase column chromatography (eluent: acetonitrile/water=from 0/100 to 25/75) to obtain 174.2 mg of a compound (2-F).

10 mg of the compound (2-F) and 500 μL of distilled water were added to a test tube, and stirring was carried out at 95° C. A solution obtained by mixing 20 mg of sodium 4-hydroxybenzenesulfonate and 6 mg of sodium hydroxide in 500 μL of distilled water was added dropwise to this solution, and stirring was carried out at 95° C. for 30 minutes. The reaction solution was cooled to room temperature and purified by preparative HPLC, and freeze drying was followed to obtain 5.5 mg of a compound (2-G).

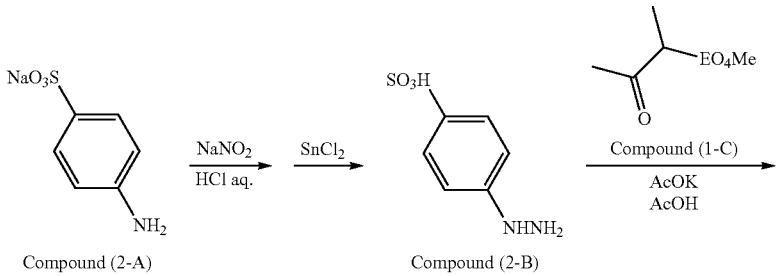

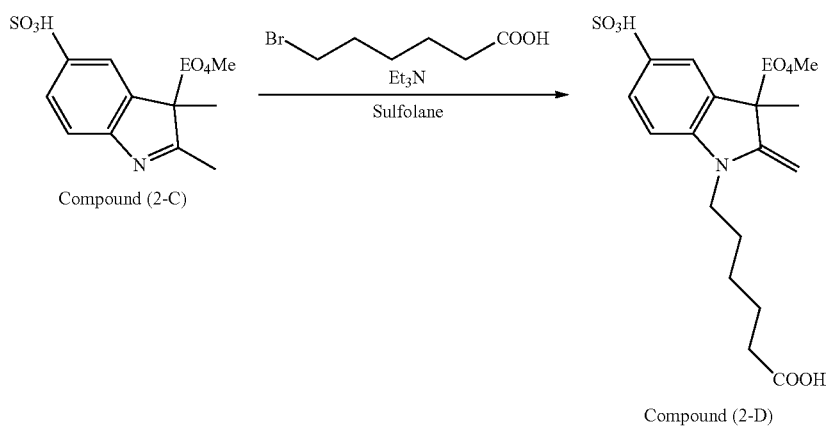

-continued
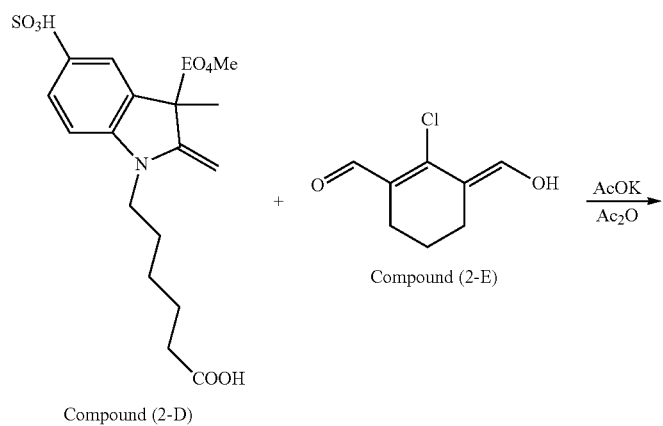
Compound (2-D)    Compound (2-E)
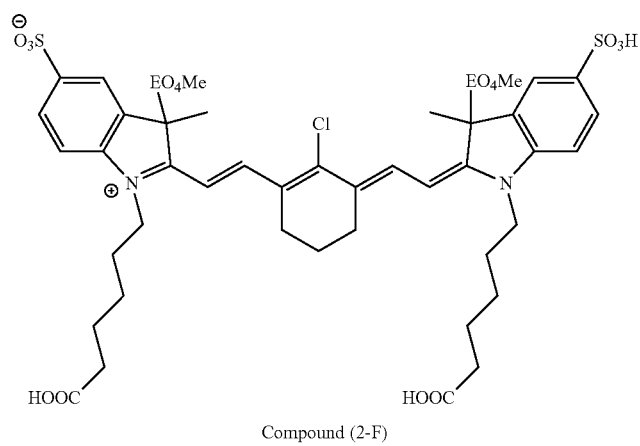
Compound (2-F)
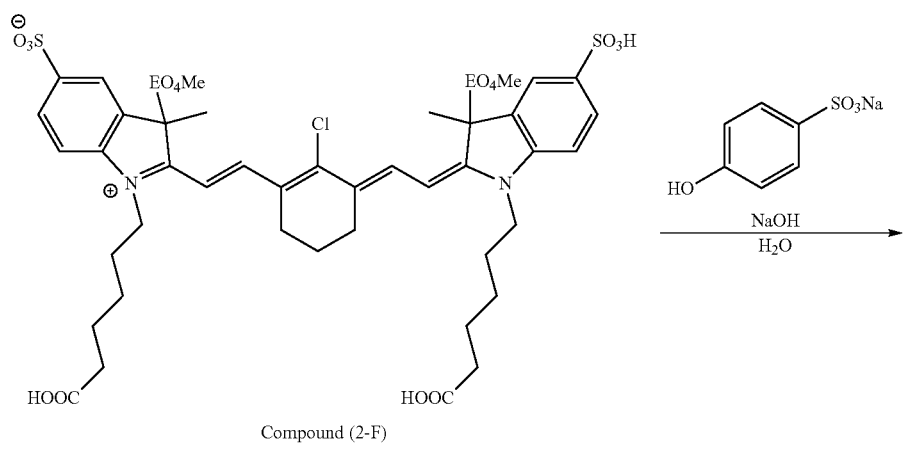
Compound (2-F)

-continued
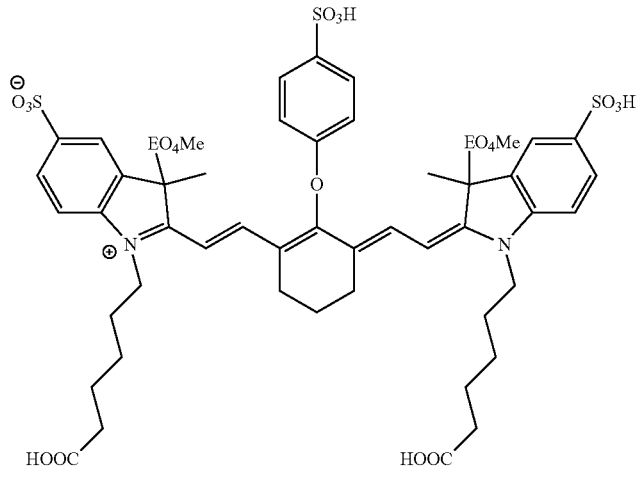
Compound (2-G)
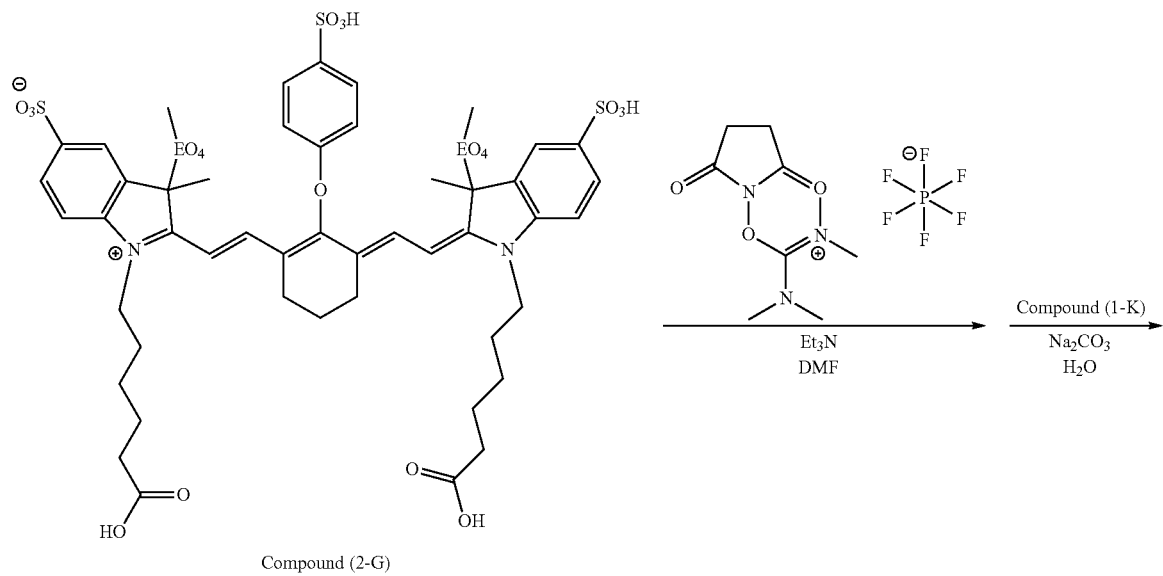
Compound (2-G)
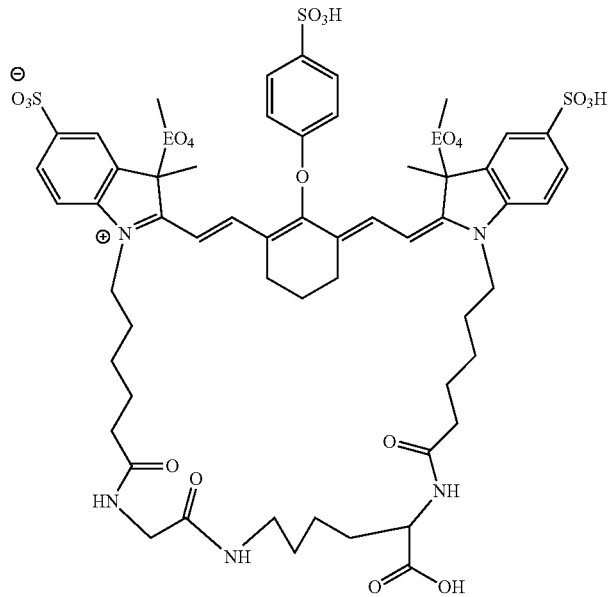
Compound (2-H)

-continued
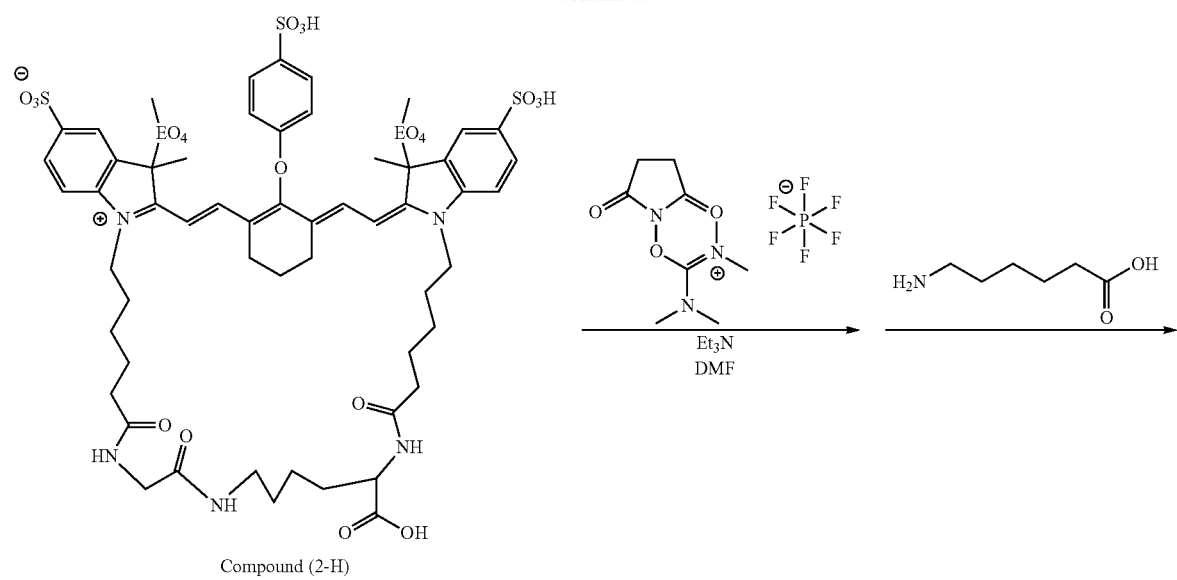
Compound (2-H)
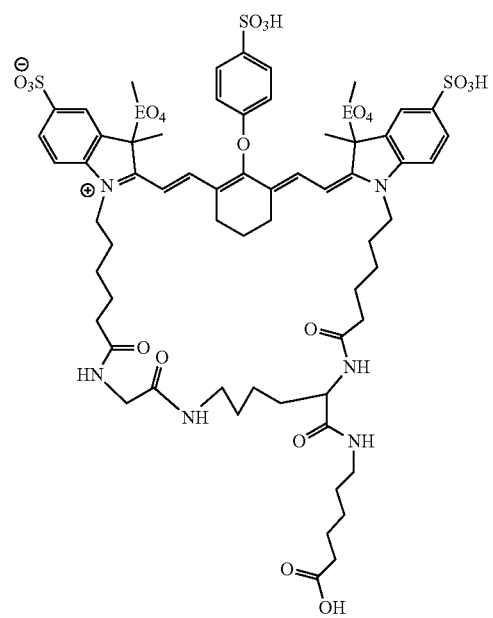
Compound (2)

-continued
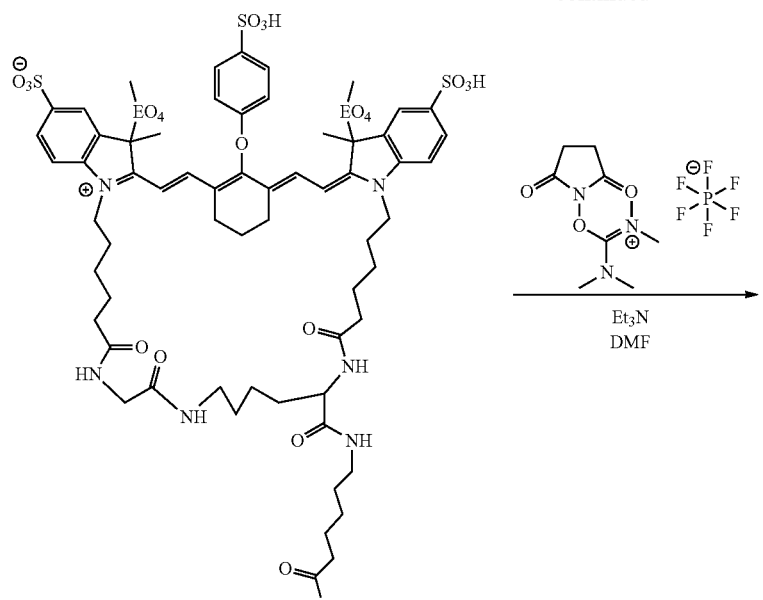
Compound (2)
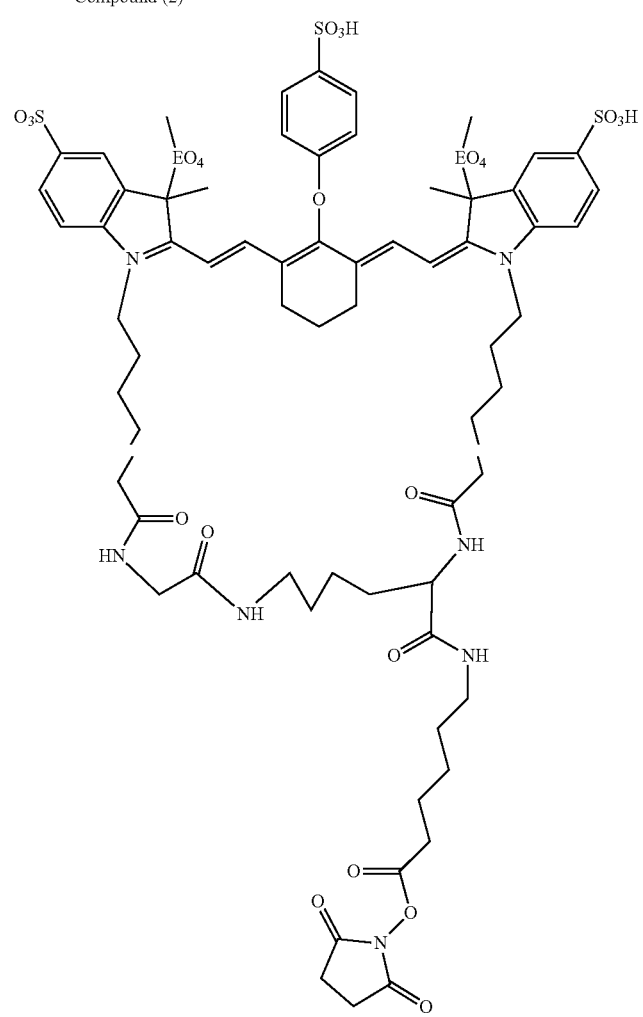
Compound (2-NHS)

<Synthesis of Compound (3-NHS)>
A compound (3-NHS) was synthesized in the same manner as in the synthesis of the compound (2-NHS) based on the following scheme. The results of the MS measurement of the compound (3) were as follows.
MS (ESI m/z): $(M+H^+)^+ = 1,855$, $(M-H^+)^- = 1,853$
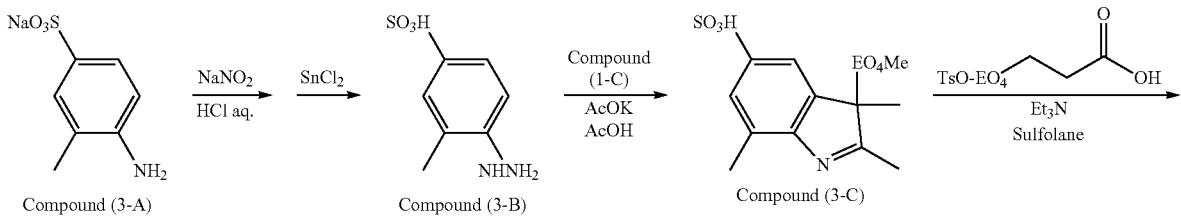
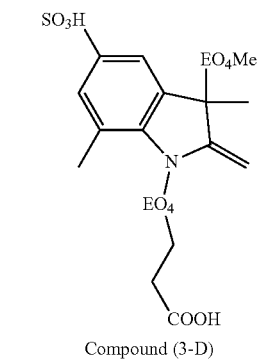
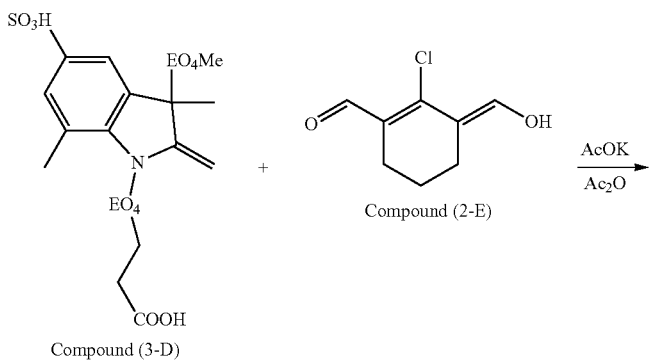
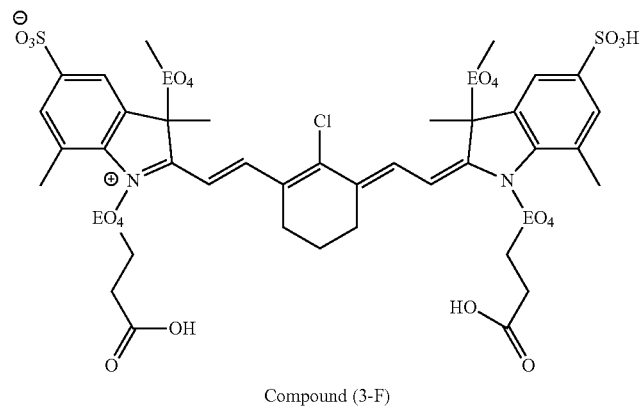

-continued
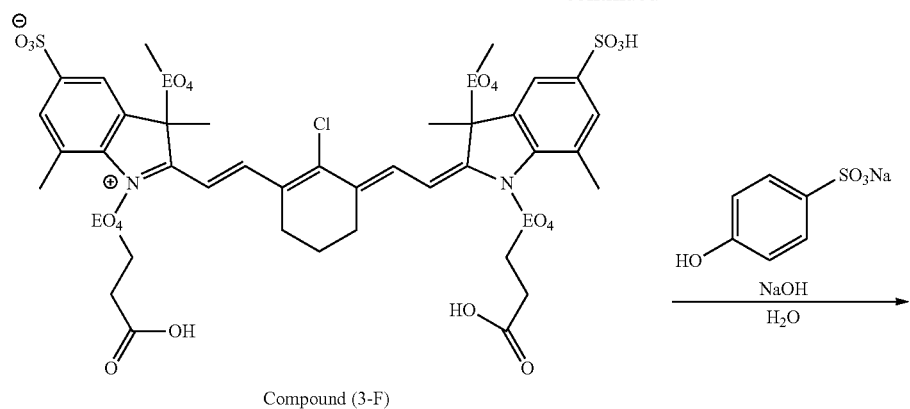
Compound (3-F)
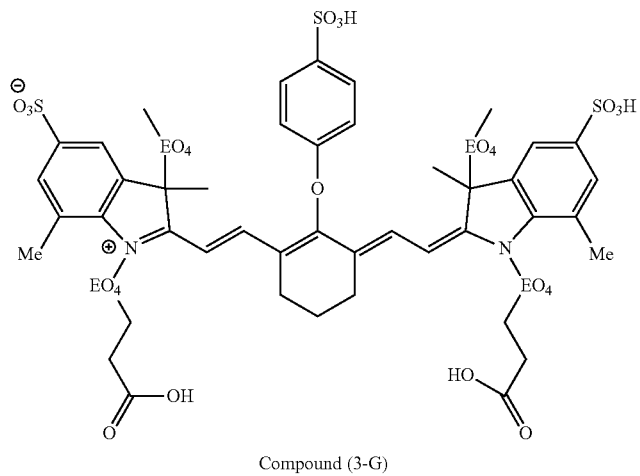
Compound (3-G)
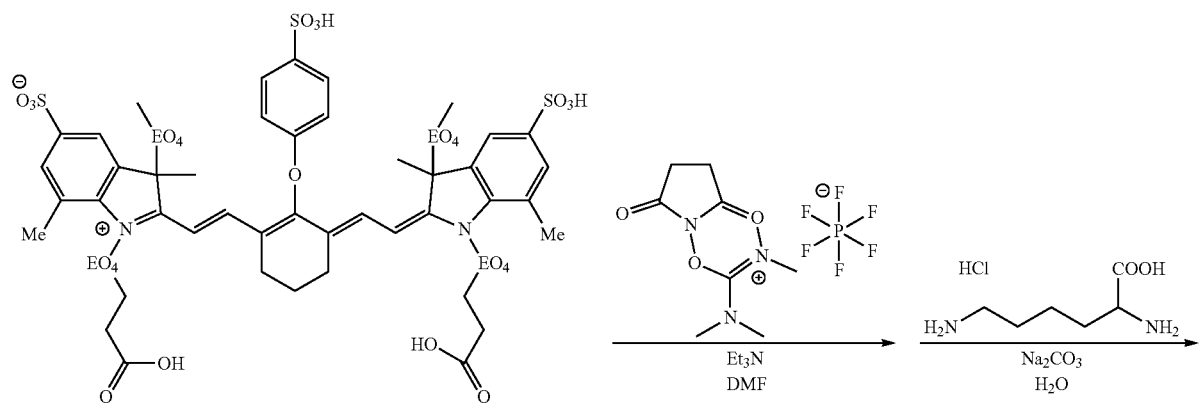
Compound (3-G)

-continued
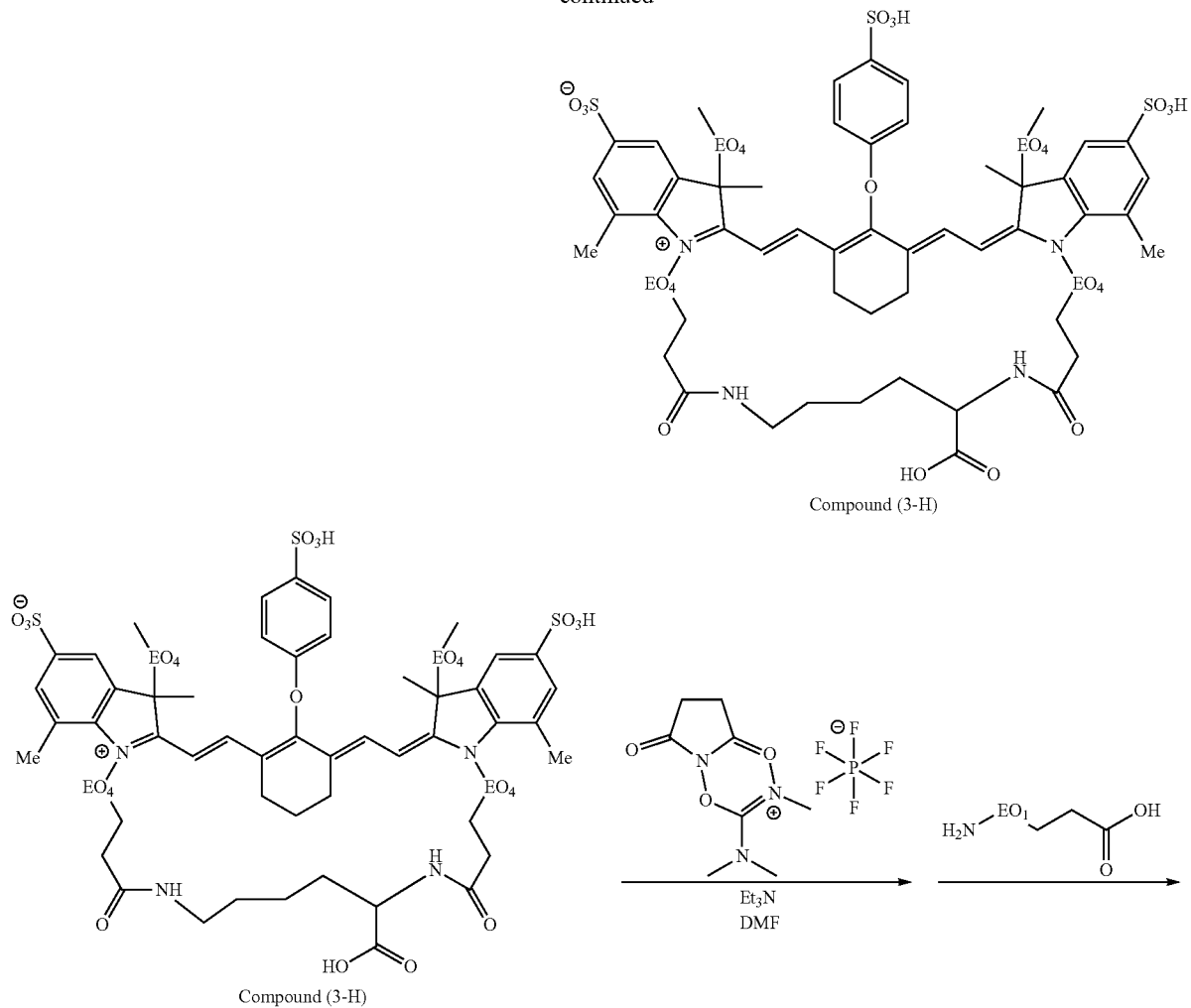
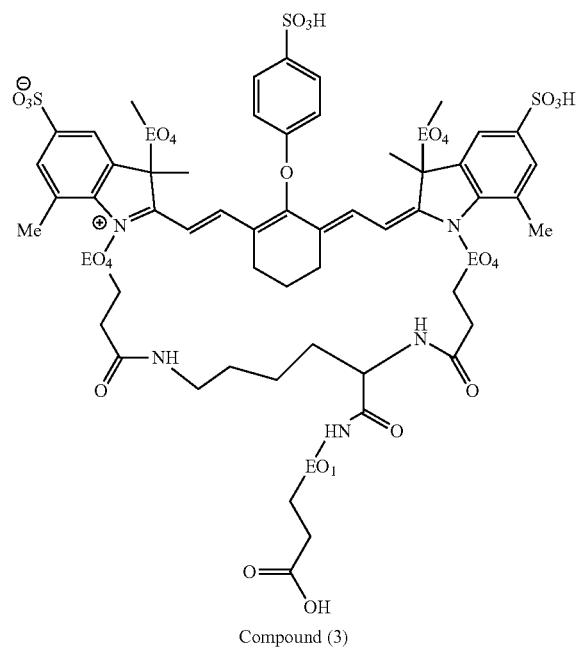

-continued
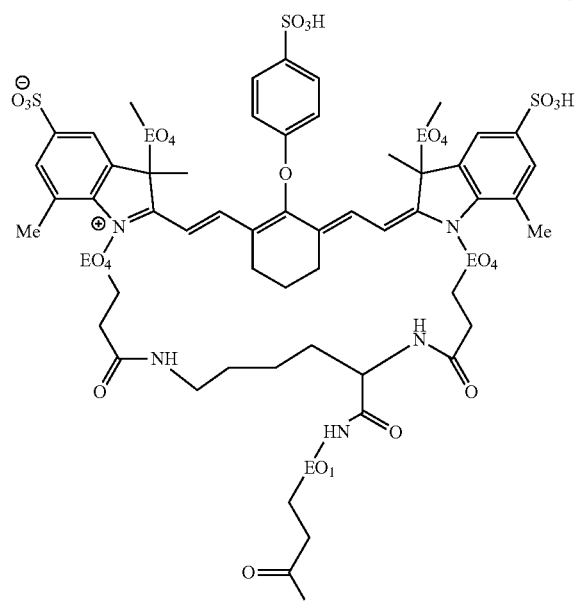
Compound (3)
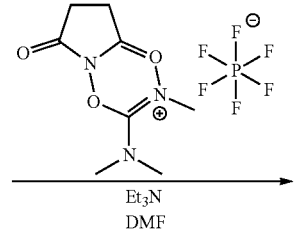
Et₃N
DMF
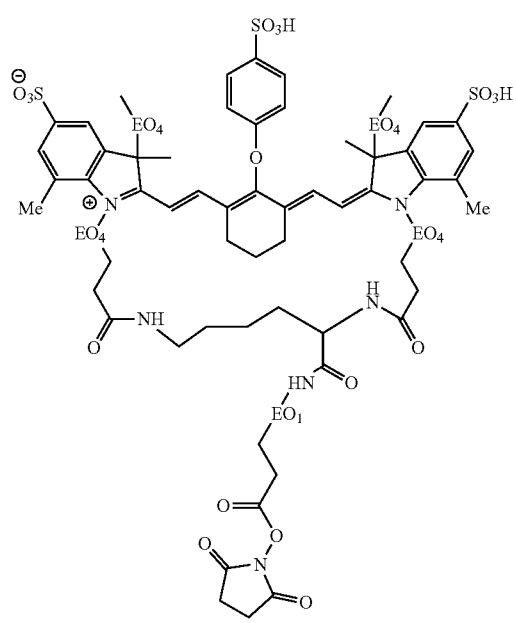
Compound (3-NHS)

<Synthesis of Compound (4-NHS)>
A compound (4-NHS) was synthesized in the same manner as in the synthesis of the compound (2-NHS) based on the following scheme. The results of the MS measurement of the compound (4) were as follows.
MS (ESI m/z): $(M+H^+)^+ =1,695$, $(M-H^-)^- =1,693$
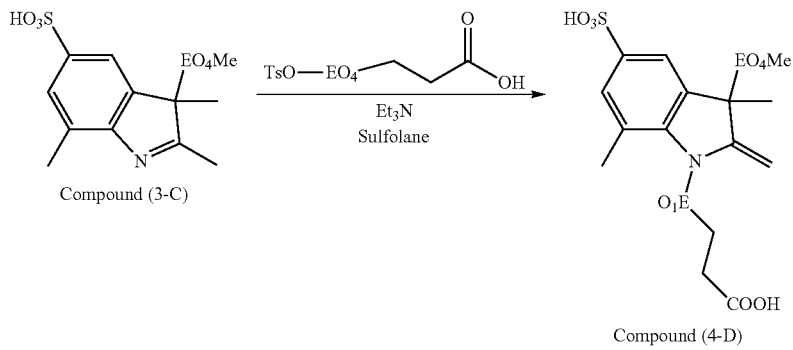
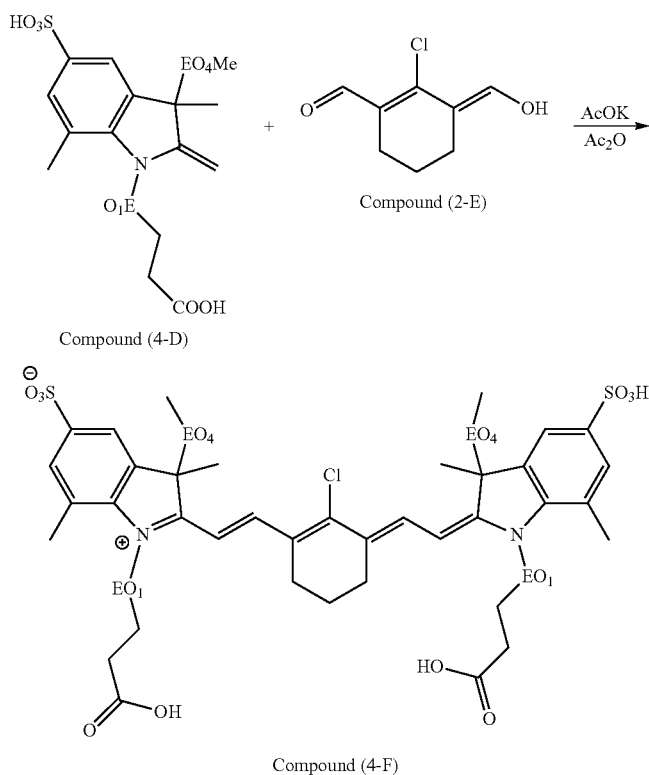
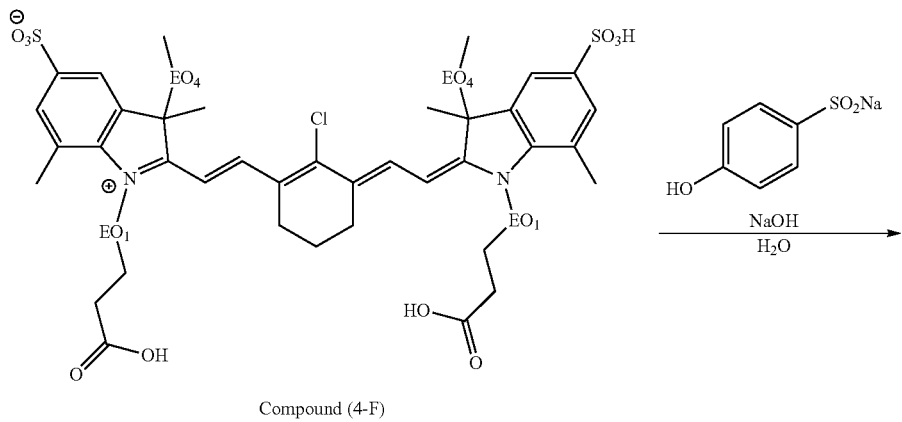

-continued
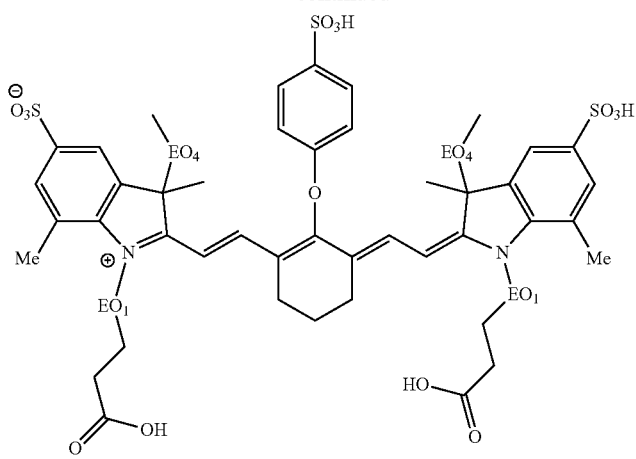
Compound (4-G)
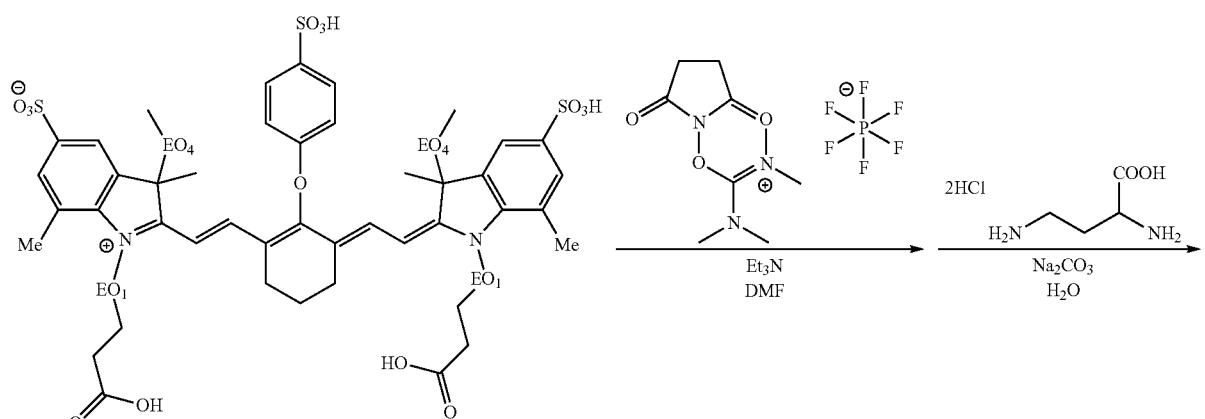
Compound (4-G)
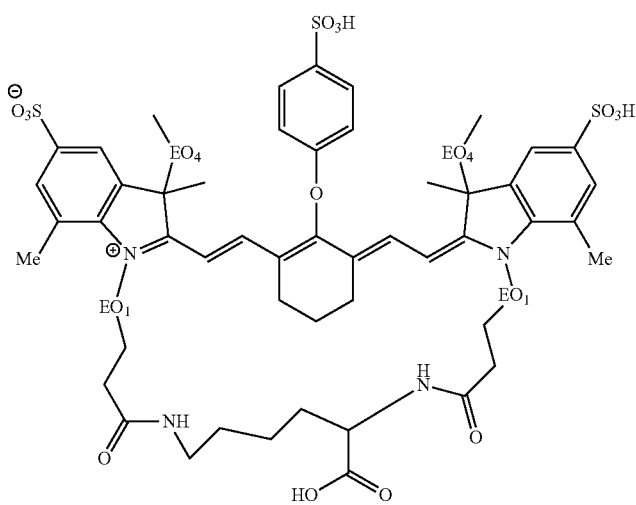
Compound (4-H)

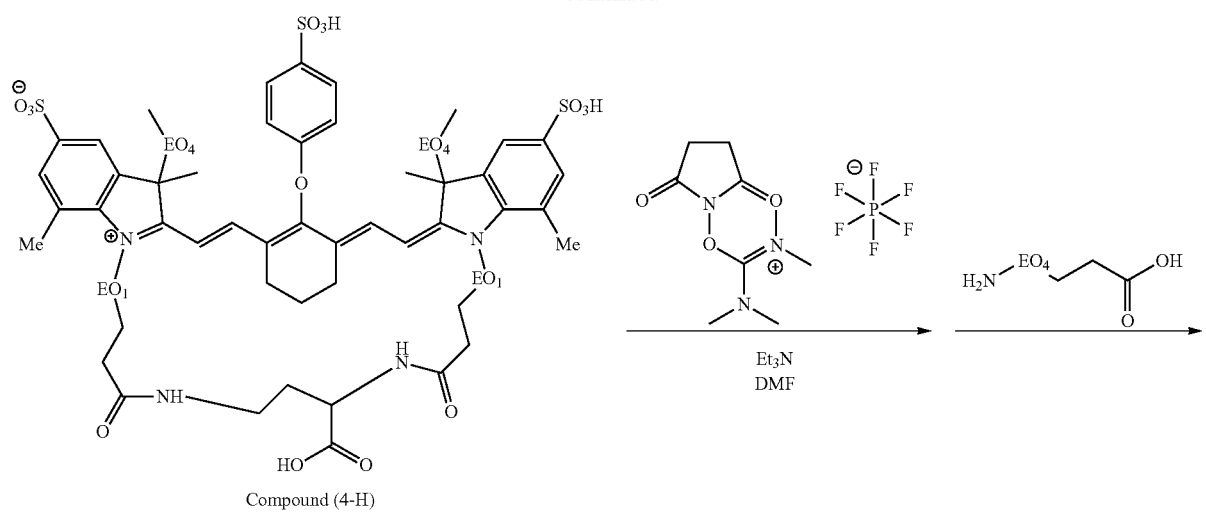
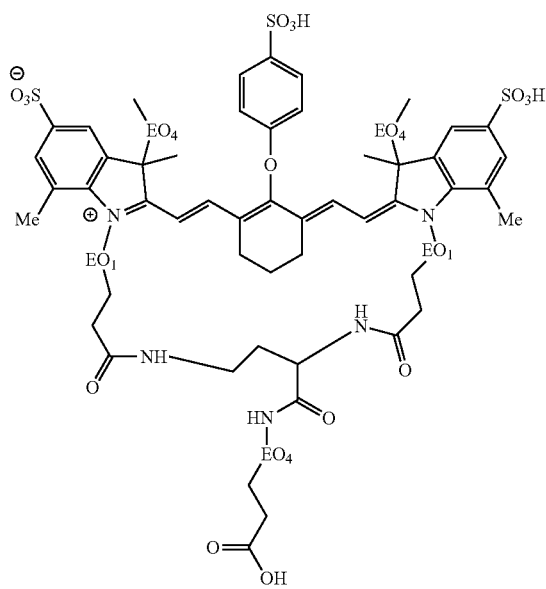

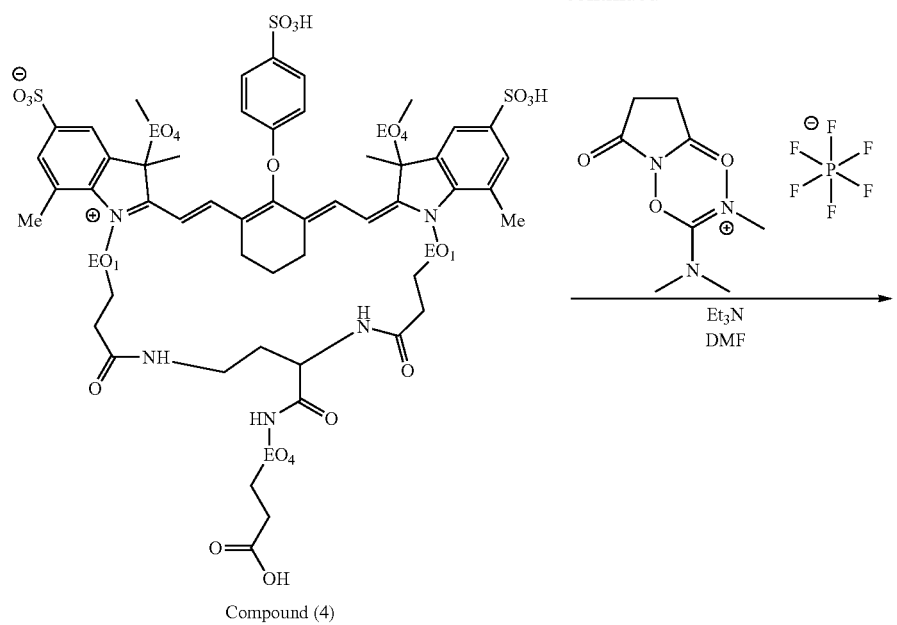
Compound (4)
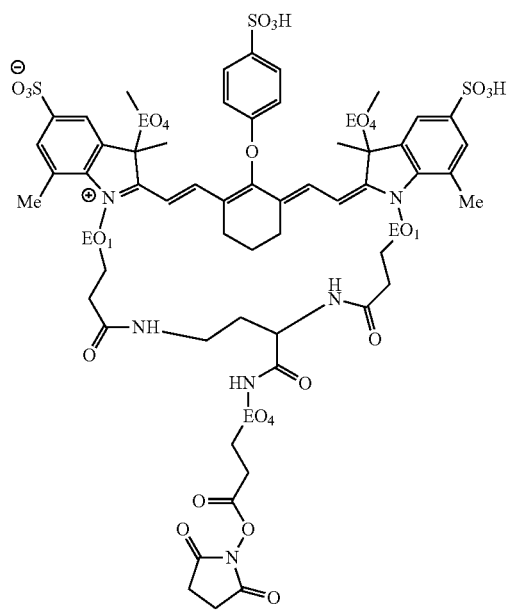
Compound (4-NHS)

<Synthesis of Compound (5-NHS)>
A compound (5-NHS) was synthesized in the same manner as in the synthesis of the compound (2-NHS) based on the following scheme. The results of the MS measurement of the compound (5) were as follows.
MS (ESI m/z): $(M+H^+)^+=1{,}723$, $(M-H^+)^-=1{,}721$
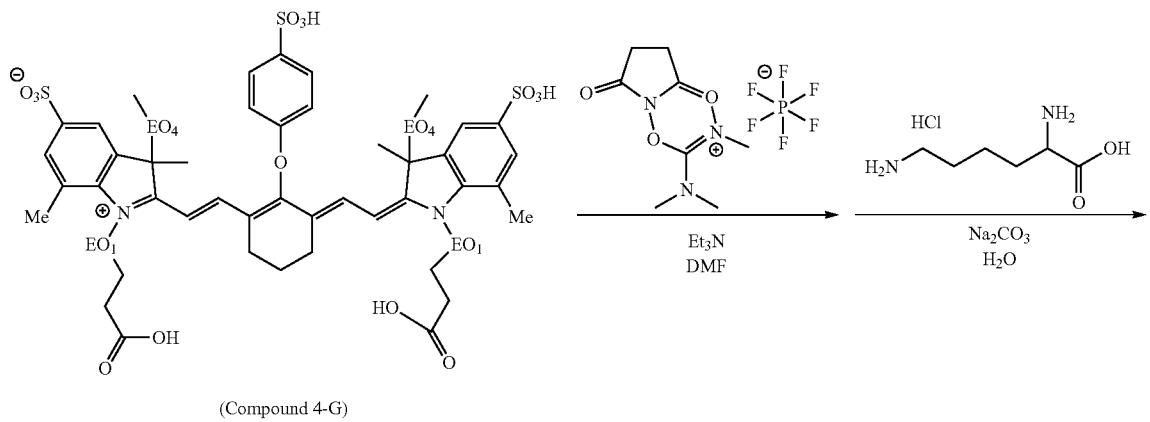
(Compound 4-G)
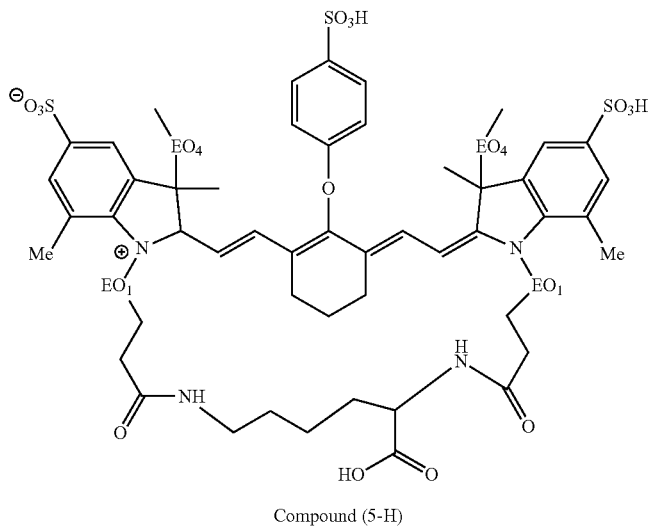
Compound (5-H)
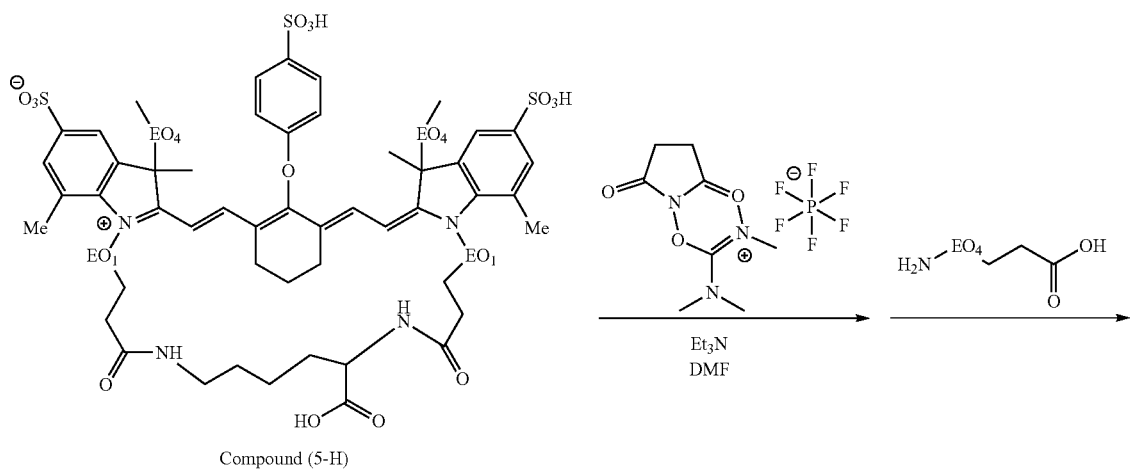
Compound (5-H)

-continued
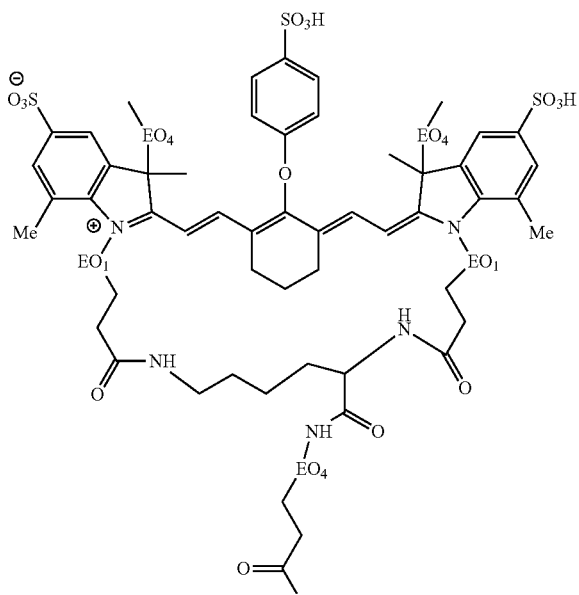
Compound 5
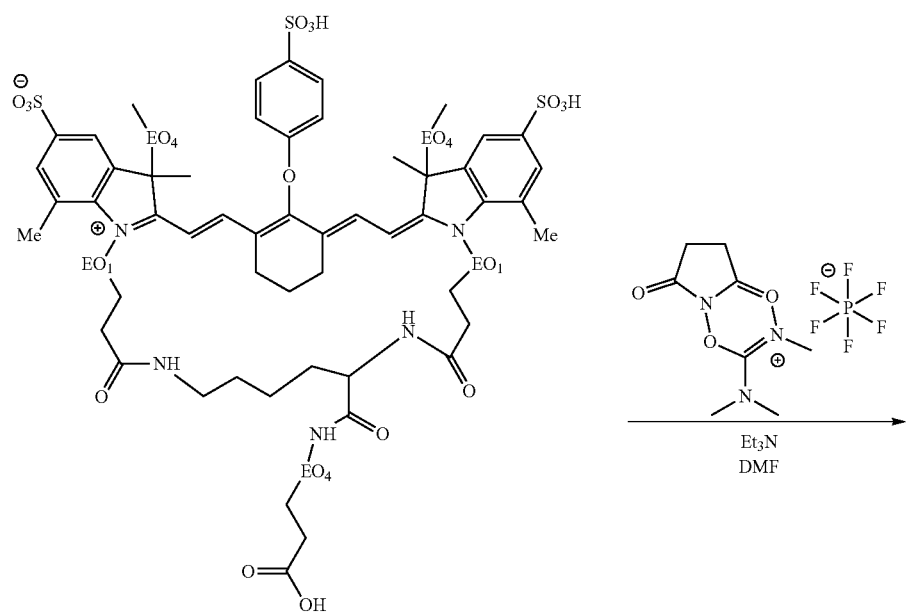

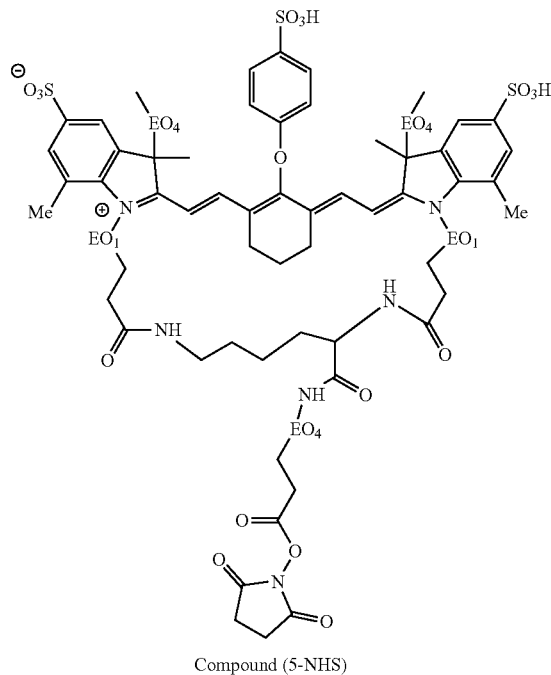
Compound (5-NHS)
<Synthesis of Compound (6-NHS)>
A compound (6-NHS) was synthesized in the same manner as in the synthesis of the compound (2-NHS) based on the following scheme. The results of the MS measurement of the compound (6) were as follows.
MS (ESI m/z): $(M+H^+)^+=1,547$, $(M-H^+)^-=1,545$
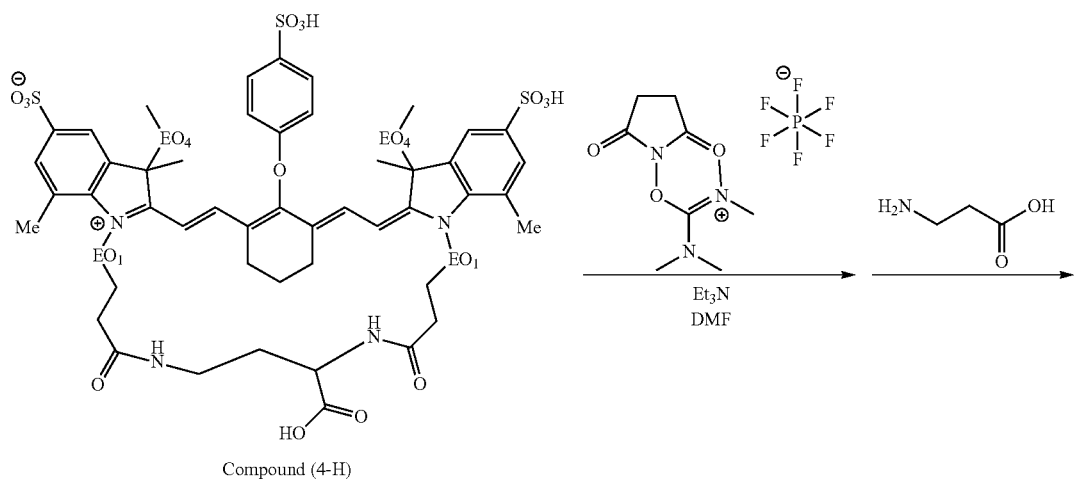
Compound (4-H)

-continued
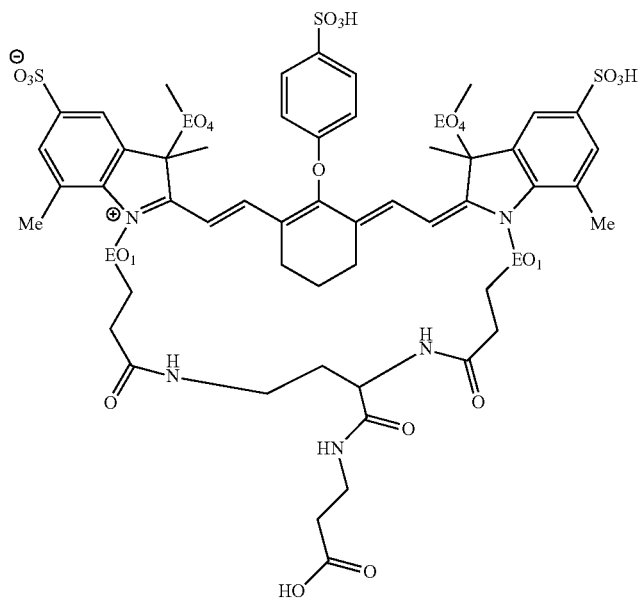
Compound (6)
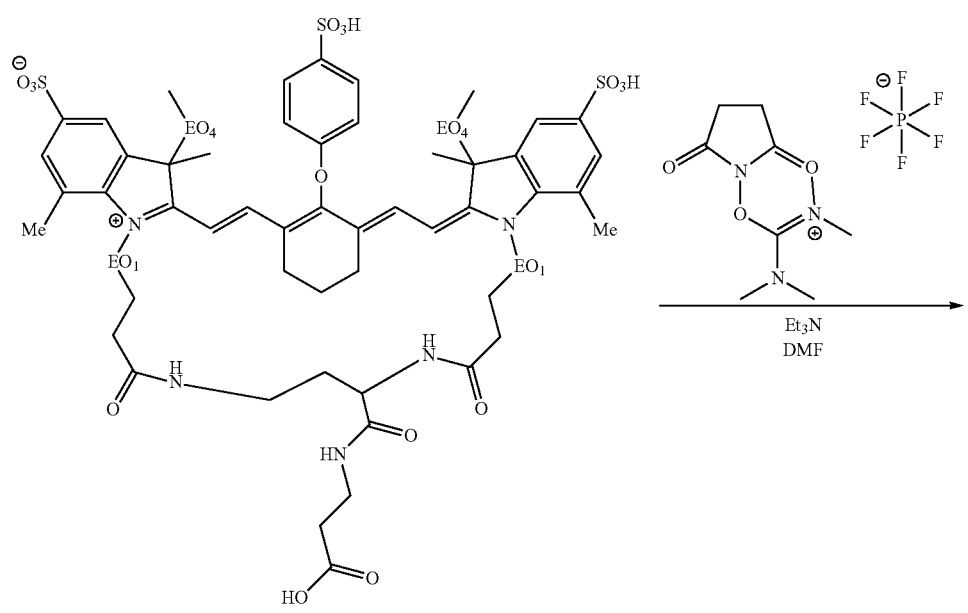
Compound (6)

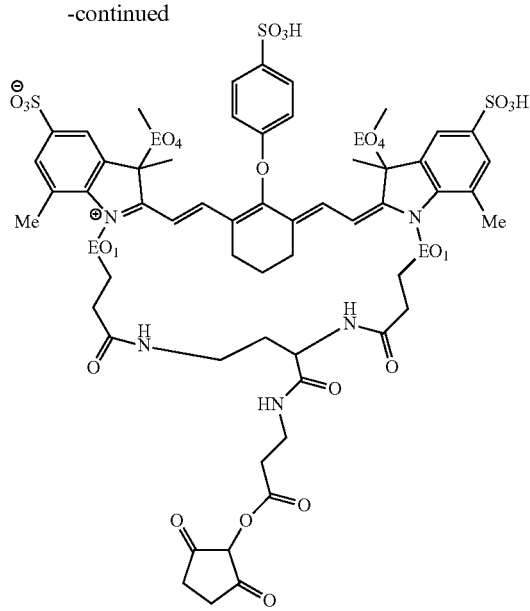

Compound (6-NHS)

<Synthesis of Compound (7-NHS)>

A compound (7-NHS) was synthesized in the same manner as in the synthesis of the compound (4-NHS) except that in the synthesis of the compound (4-NHS), the compound (7-B) synthesized based on the following scheme was used instead of the compound (3-C). The results of the MS measurement of the compound (7) were as follows.

MS (ESI m/z): $(M+H^+)^+ = 2{,}253$, $(M-H^+)^- = 2{,}251$

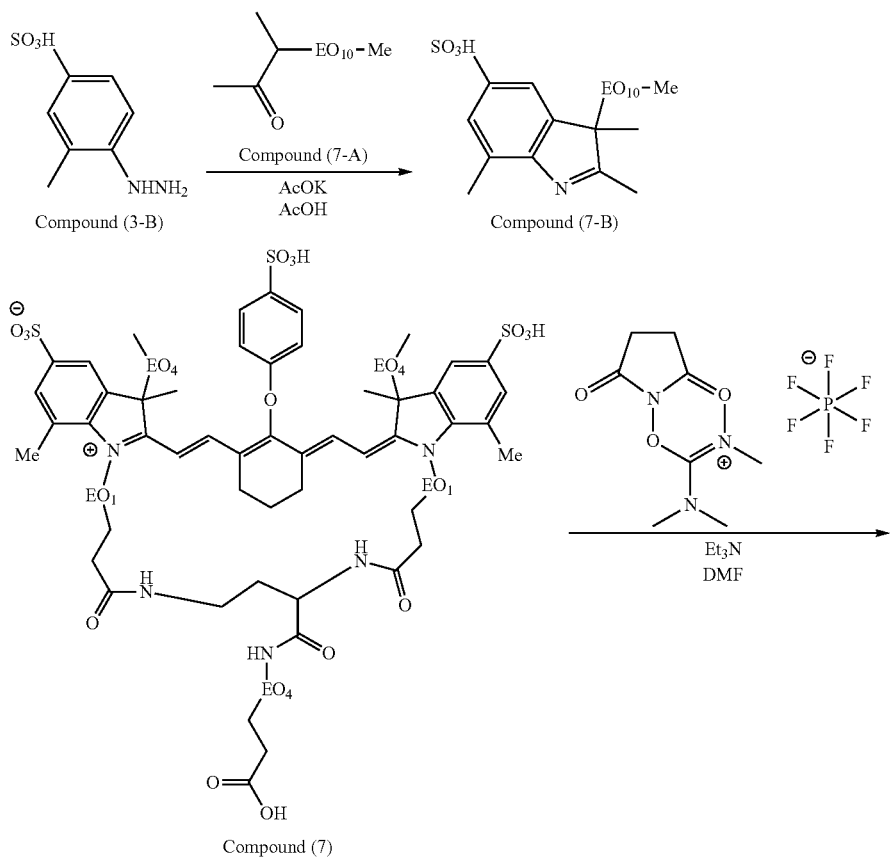

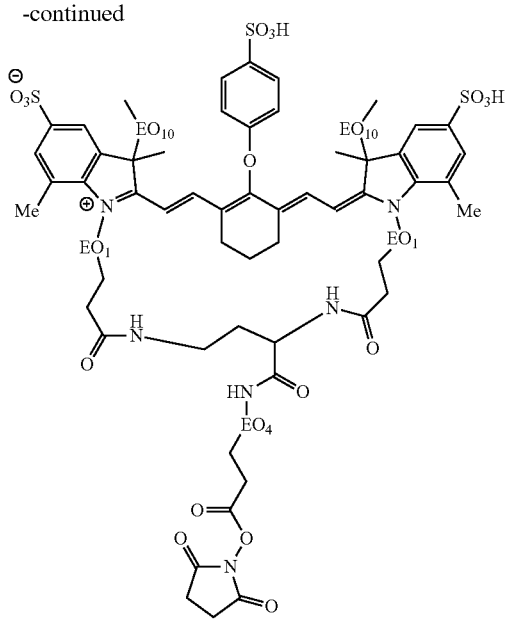
Compound (7-NHS)
<Synthesis of Comparative Compound (1-NHS)>
A comparative compound (1-NHS) was synthesized in the same manner as the compound (2-NHS) based on the following scheme. The results of the MS measurement of the comparative compound (1) were as follows.
MS (ESI m/z): $(M+H^+)^+ = 1,279$, $(M-H^+)^- = 1,277$
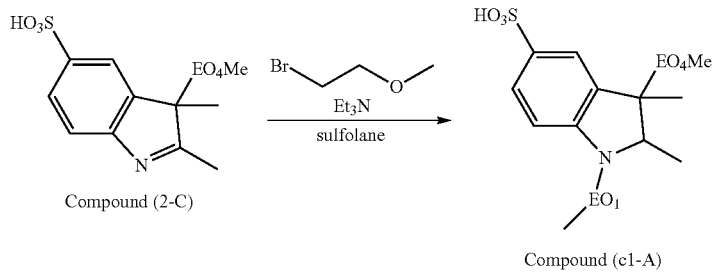
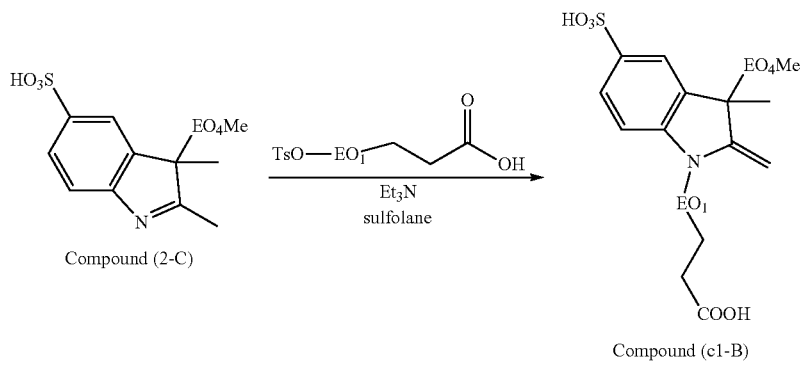

-continued
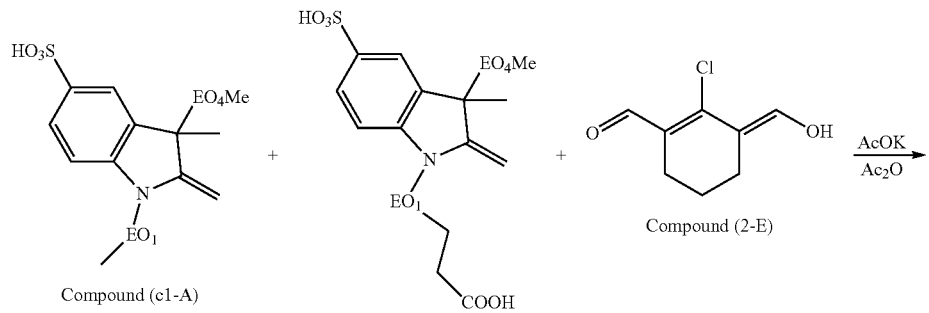
Compound (c1-A) + Compound (c1-B) + Compound (2-E) →(AcOK, Ac₂O)
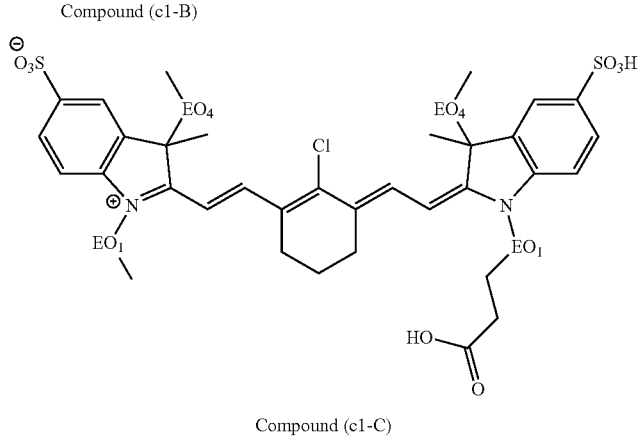
Compound (c1-C)
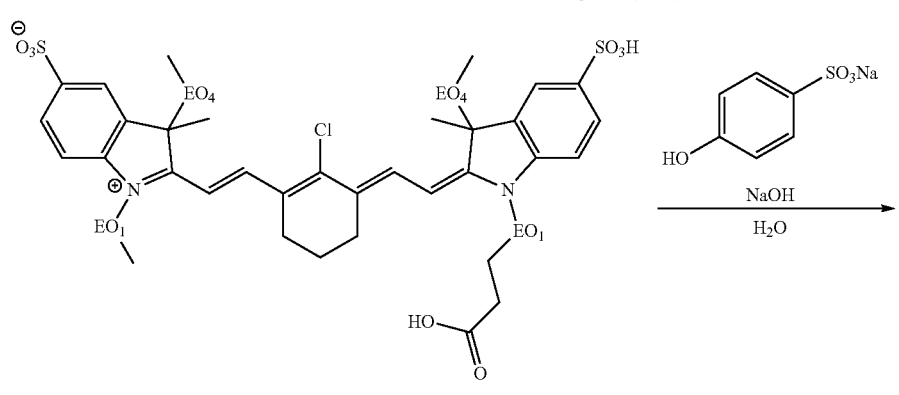
Compound (c1-C) →(NaOH, H₂O)
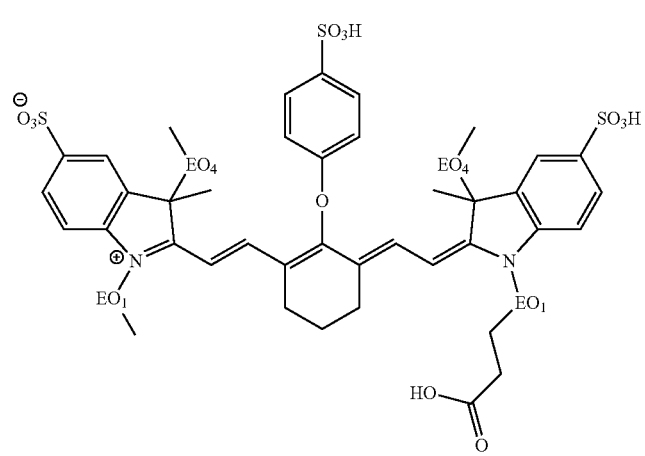
Comparative compound (1)

-continued
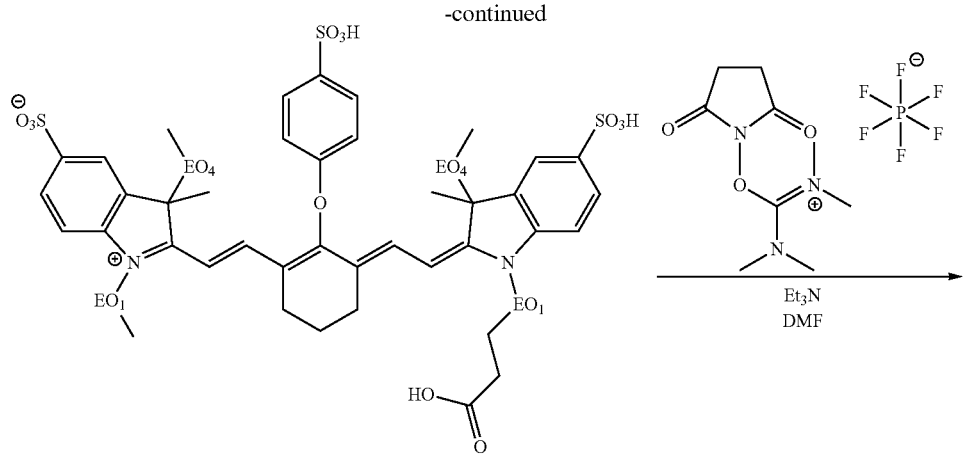
Comparative compound (1)
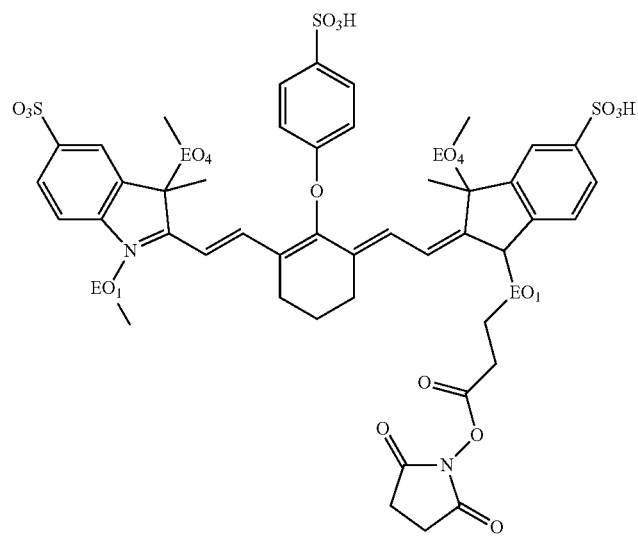
Comparative compound (1-NHS)
<Synthesis of Comparative Compound (2-NHS)>
A comparative compound (2-NHS) was synthesized in the same manner as the compound (2-NHS) based on the following scheme. The results of the MS measurement of the comparative compound (2) were as follows.
MS (ESI m/z): $(M+H^+)^+=1{,}204$, $(M-H^+)^-=1{,}202$
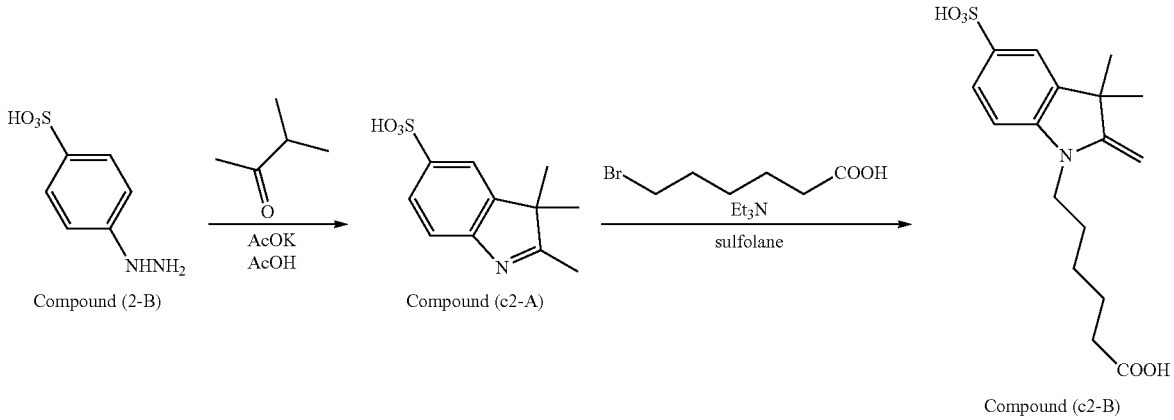

-continued
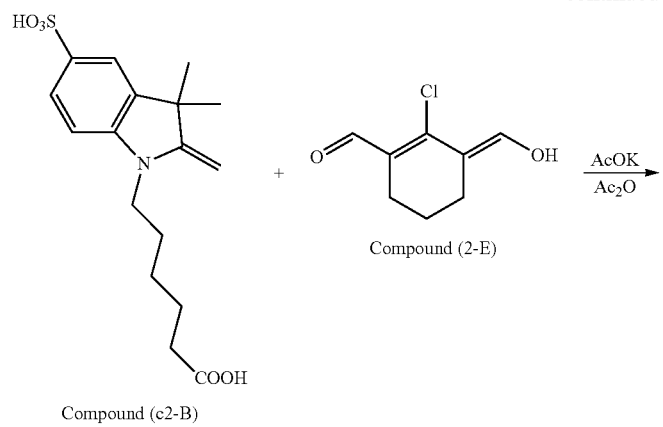
Compound (c2-B) + Compound (2-E) →(AcOK, Ac₂O)
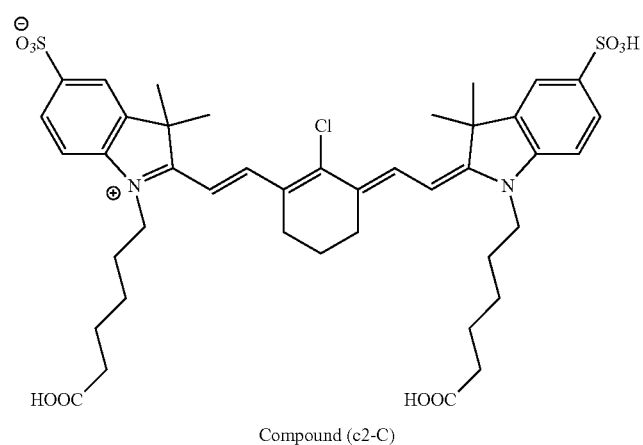
Compound (c2-C)
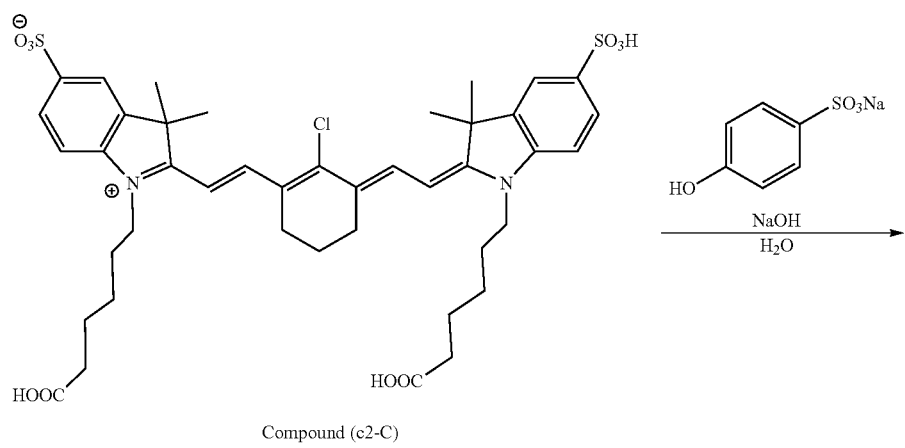
Compound (c2-C) + (HO-C₆H₄-SO₃Na) →(NaOH, H₂O)

-continued
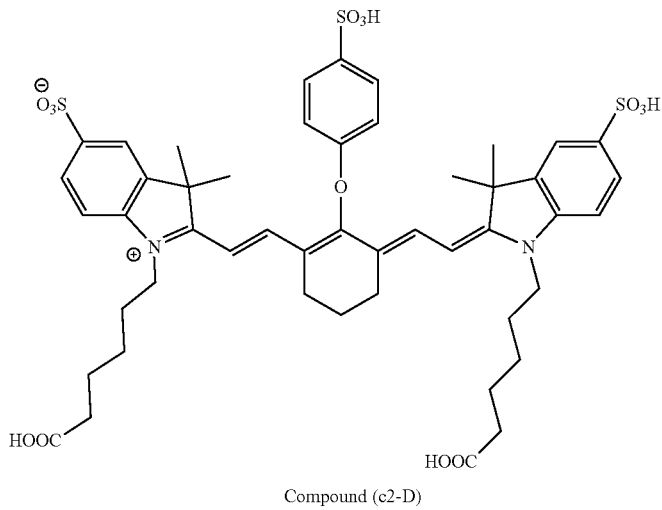
Compound (c2-D)
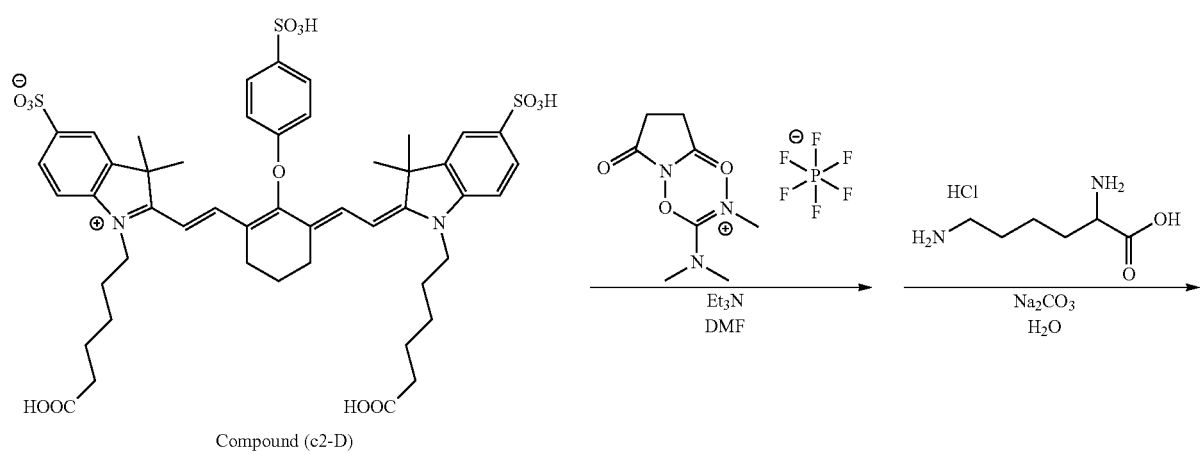
Compound (c2-D)
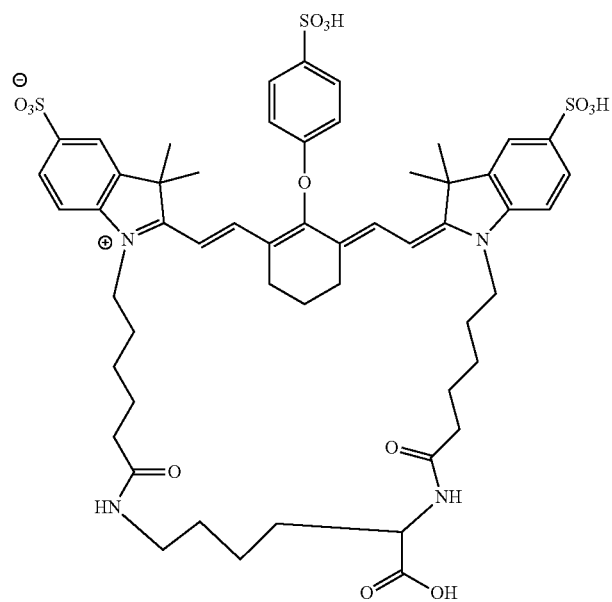
Compound (c2-E)

-continued
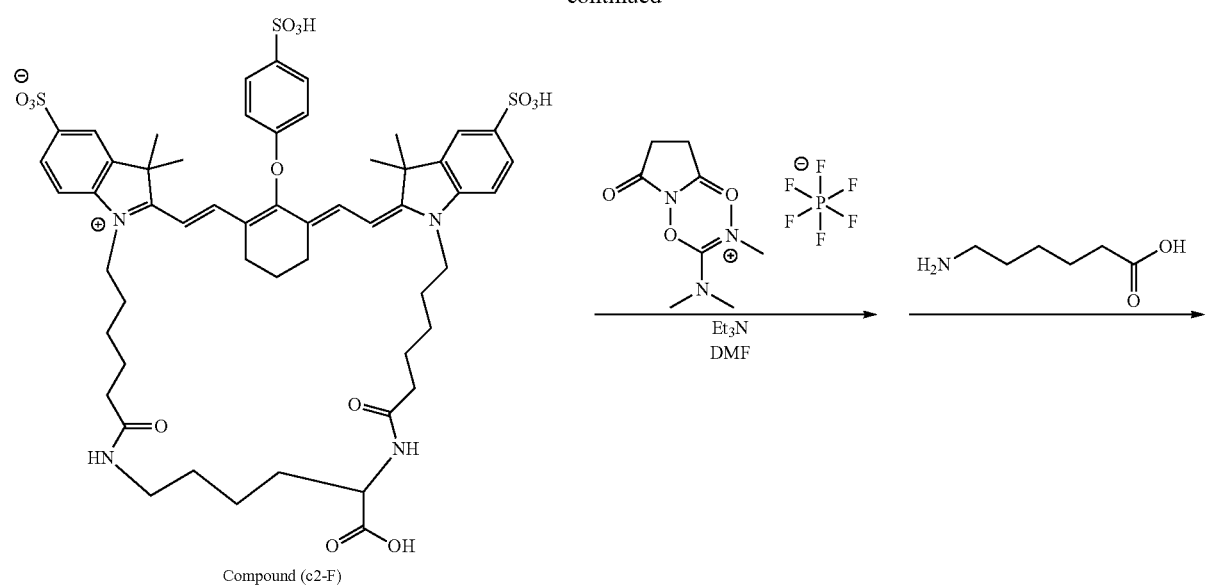
Compound (c2-F)
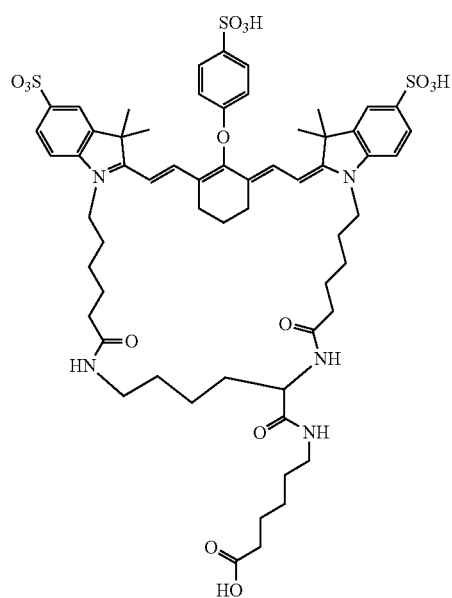
Comparative compound (2)

-continued
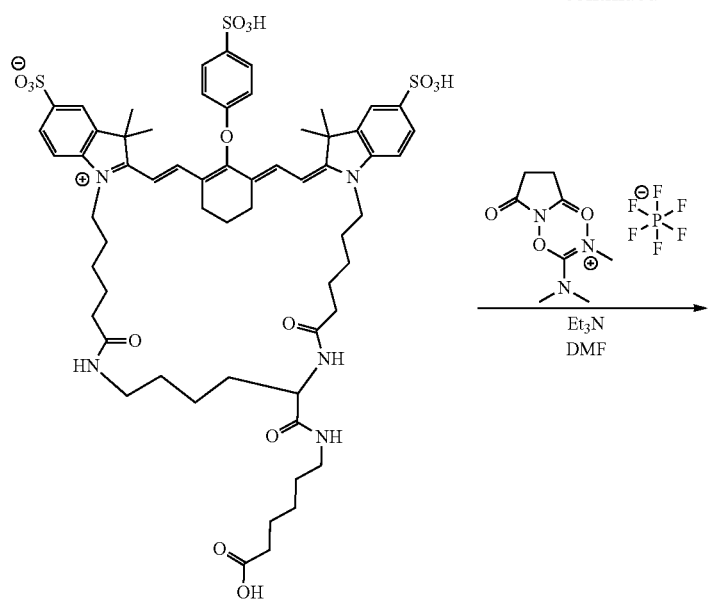
Comparative compound (2)
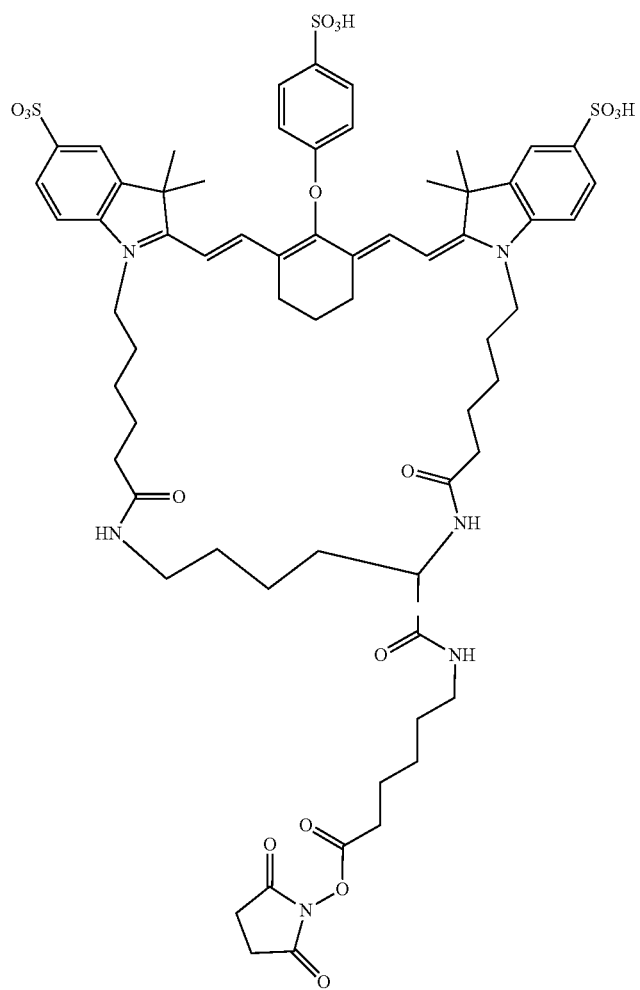
Comparative compound (2-NHS)

<Synthesis of Comparative Compound (3-NHS)>
A comparative compound (3-NHS) was synthesized in the same manner as the compound (2-NHS) based on the following scheme. The results of the MS measurement of the comparative compound (3) were as follows.
MS (ESI m/z): $(M+H^+)^+=1,708$, $(M-H^+)^-=1,706$
It is noted that in the following compounds, Boc is an abbreviation for tert-butoxycarbonyl.
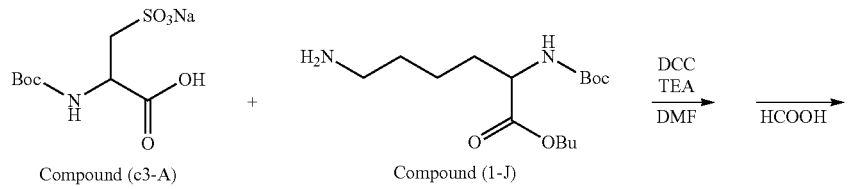
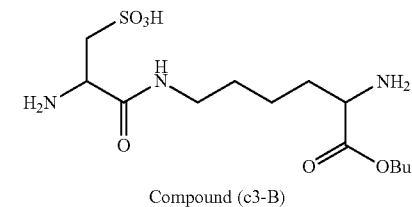
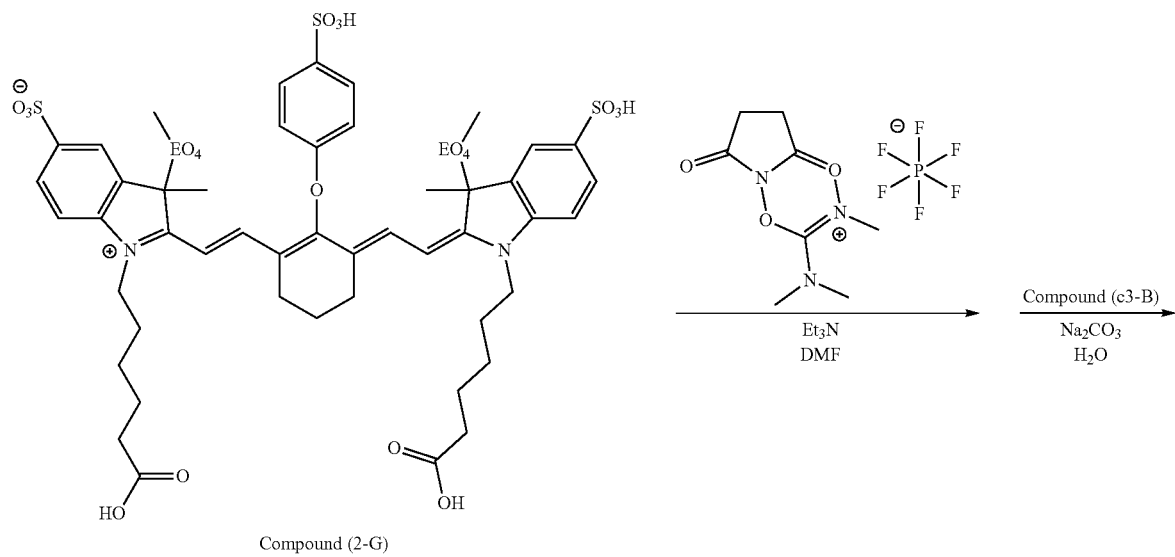

-continued
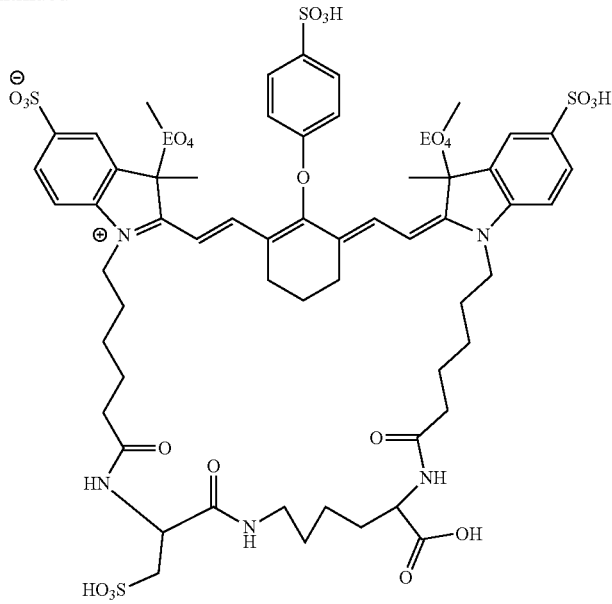
Compound (c3-C)
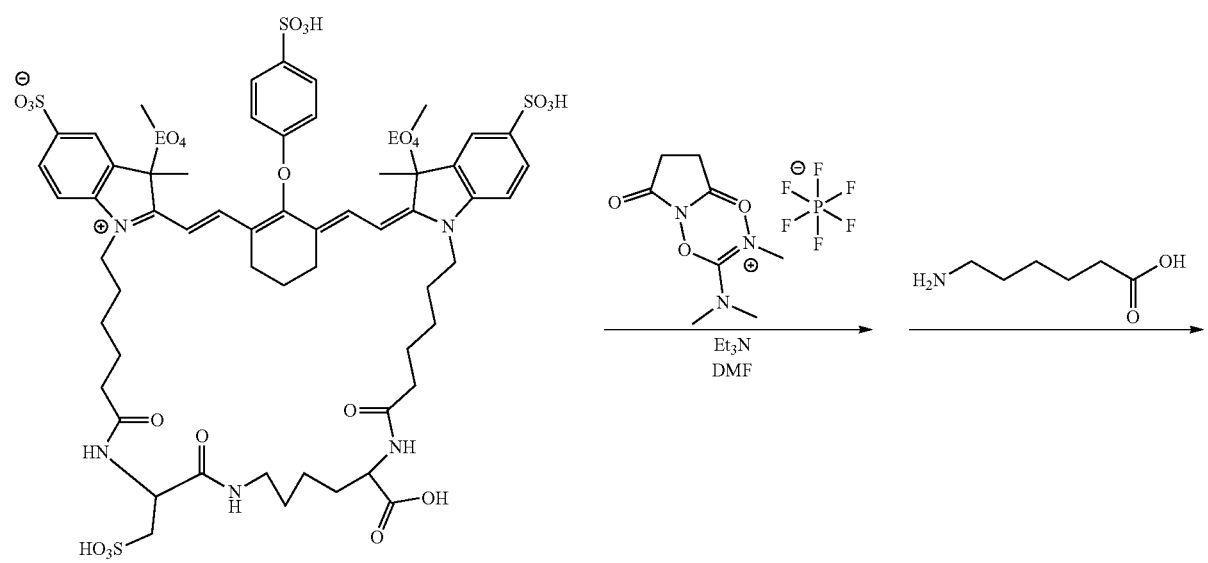
Compound (c3-C)

-continued

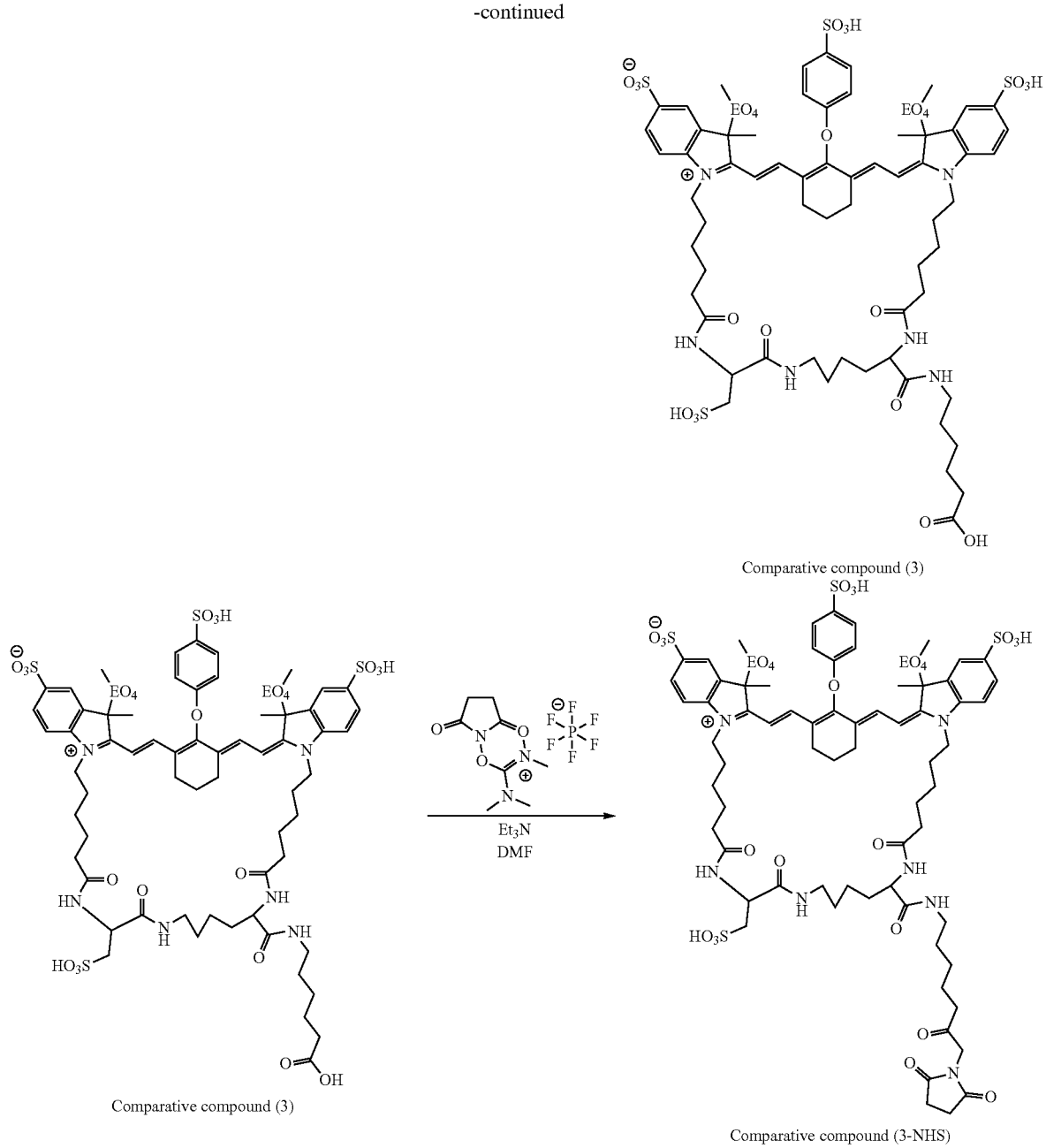

Comparative compound (3)

Comparative compound (3)

Et₃N
DMF

Comparative compound (3-NHS)

The comparative compound (4) was the compound 11 described in WO2005/000218A, and it was synthesized according to the method described in the document. The results of the MS measurement of the comparative compound (4) were as follows.

MS (ESI m/z): $(M+H^+)^+=864$, $(M-H^+)^-=862$

The comparative compound (5) was the compound 22 described in WO2006/047452A and was synthesized according to the method described in the document. The results of the MS measurement of the comparative compound (5) were as follows.

MS (ESI m/z): $(M+H^+)^+=1,100$, $(M-H^+)^-=1,098$

The comparative compound (6) was the compound 17 described in WO2001/002374A, and it was synthesized according to the method described in the document. The results of the MS measurement of the comparative compound (6) were as follows.

MS (ESI m/z): $(M+H^+)^+=885$, $(M-H^+)^-=883$

Each of the NHS ester (N-hydroxysuccinimide ester) compounds of the comparative compounds (4), (5), and (6) were synthesized in the same manner as in the method of synthesizing the compound (1-NHS) from the compound (1).

Example 1

For each of the above-described compounds, the fluorescence labeling rate, the solution fluorescence intensity, and the fluorescence intensity on the membrane were evaluated.

[0] Preparation of Fluorescently Labeled Antibody

217 μL of an anti-rabbit IgG antibody (2.3 mg/mL) and 21.7 μL of a carbonate buffer were added to a microtube, the resultant mixture was shaken and stirred. Then, a dimethyl sulfoxide solution of the compound (1-NHS) was added thereto so that the equivalent thereof was 10 equivalents with respect to 1 equivalent of the antibody, and the resultant mixture further was shaken and stirred. After being allowed to stand at room temperature for 1 hour, the reaction solution was purified using a gel filtration chromatography column PD10 (manufactured by GE Healthcare Life Sciences) and Phosphate Buffered Saline (PBS) to obtain a labeled antibody (1).

Similarly, labeled antibodies of the respective compounds and comparative compounds were obtained.

[1] Evaluation of Solution Fluorescence Intensity

A solution of the labeled antibody prepared as described above was prepared to a protein concentration of 0.1 mg/mL, and the integrated value of the fluorescence intensity in the fluorescence wavelength range of 810 to 840 nm was calculated by using an spectroscopic fluorescence intensity meter (product name: RF-5300, manufactured by Shimadzu Corporation) with excitation light of 785 nm and unified the exposure conditions. Using the integrated value of the fluorescence intensity of the comparative compound (1)-IgG in the fluorescence wavelength range of 810 nm to 840 nm as the reference value, the ratio to this reference value (the integrated value of the fluorescence intensity of the labeled antibody in the fluorescence wavelength range of 810 nm to 840 nm/the reference value) was calculated, and then, the evaluation was made based on the following evaluation standards. The results are summarized in Table 1.

In the present test, it is determined that a compound has passed the evaluation of the fluorescence intensity in a case where the compound has a rank "D" or a higher rank.

—Evaluation Standards for Fluorescence Intensity—

A: The ratio of fluorescence intensity to the reference value is 1.5 times or more.

B: The ratio of fluorescence intensity to the reference value is 1.4 times or more and less than 1.5 times.

C: The ratio of fluorescence intensity to the reference value is 1.3 times or more and less than 1.4 times.

D: The ratio of fluorescence intensity to the reference value is 1.2 times or more and less than 1.3 times.

E: The ratio of fluorescence intensity to the reference value is 1.1 times or more and less than 1.2 times.

F: The ratio of fluorescence intensity to the reference value is 0.9 times or more and less than 1.1 times.

G: The ratio of fluorescence intensity to the reference value is less than 0.9 times.

TABLE 1

| No. | Labeled antibody | Fluorescence intensity (solution) |
|---|---|---|
| 101 | Compound (1)-IgG | C |
| 102 | Compound (2)-IgG | C |
| 103 | Compound (3)-IgG | B |
| 104 | Compound (4)-IgG | A |
| 105 | Compound (5)-IgG | A |
| 106 | Compound (6)-IgG | A |
| 107 | Compound (7)-IgG | B |
| c11 | Comparative compound (1)-IgG | 1.0 (reference value) |
| c12 | Comparative compound (2)-IgG | F |
| c13 | Comparative compound (3)-IgG | E |
| c14 | Comparative compound (4)-IgG | — |

TABLE 1-continued

| No. | Labeled antibody | Fluorescence intensity (solution) |
|---|---|---|
| c15 | Comparative compound (5)-IgG | F |
| c16 | Comparative compound (6)-IgG | F |

(Note
in table)

In the column of the labeled antibody, the notation of the compound (Z)-IgG or the notation of comparative compound (Z)-IgG means an IgG antibody labeled with the compound (Z-NHS) or an IgG antibody labeled with the comparative compound (Z-NHS). Here, Z means the number of each compound. They have the same meaning in the following tables.

The IgG-labeled antibody of the comparative compound (4-NHS) could not be labeled by the above-described method, and thus, it is indicated by "-" in the above table. This is presumed to be because the water solubility is low, and thus precipitation occurs in the reaction system with the antibody. Hereinafter, the same applies to the evaluation "-" of the fluorescence intensity of the comparative compound (4)-IgG in Tables 2 and 3.

[2] Evaluation of Fluorescence Intensity on Membrane

A solution of the labeled antibody (an anti-rabbit IgG solution) prepared as described above was prepared at a protein concentration of 5.0 ng/ml, and 2 μL thereof was carefully spotted on a nitrocellulose membrane. The membrane was dried and then blocked in TBS-T with a Fish Gelatin blocking buffer solution. The membrane was incubated at room temperature for 1 hour with stirring. The blocking solution was removed, and a PBS solution of the labeled antibody was diluted 20,000 times with Tris Buffered Saline (TBS). The membrane was immersed in the diluted solution and incubated for 1 hour with stirring. The membrane was washed three times with Tris Buffered Saline with Tween 20 (TBS-T) for 10 minutes and finally washed with TBS for 10 minutes. The obtained membrane was dried on a hot plate at 40° C. for 1 hour and imaged using an Amersham Typhoon scanner (manufactured by GEHC) with excitation light of 785 nm under the uniform exposure conditions, thereby calculating the fluorescence intensity in a fluorescence wavelength range of 810 to 840 nm. Using the integrated value of the fluorescence intensity of the comparative compound (1)-IgG in the fluorescence wavelength range of 810 nm to 840 nm as the reference value, the ratio to this reference value (the integrated value of the fluorescence intensity of the labeled antibody in the fluorescence wavelength range of 810 nm to 840 nm/the reference value) was calculated, and then, the evaluation was made based on the following evaluation standards. The results are summarized in Table 2.

In the present test, it is determined that a compound has passed the evaluation of the fluorescence intensity in a case where the compound has a rank "D" or a higher rank.

—Evaluation Standards for Fluorescence Intensity—

A: The ratio of fluorescence intensity to the reference value is 2.0 times or more.

B: The ratio of fluorescence intensity to the reference value is 1.8 times or more and less than 2.0 times.

C: The ratio of fluorescence intensity to the reference value is 1.6 times or more and less than 1.8 times.

D: The ratio of fluorescence intensity to the reference value is 1.4 times or more and less than 1.6 times.

E: The ratio of fluorescence intensity to the reference value is 1.2 times or more and less than 1.4 times.

F: The ratio of fluorescence intensity to the reference value is 0.9 times or more and less than 1.2 times.

G: The ratio of fluorescence intensity to the reference value is less than 0.9 times.

TABLE 2

| No. | Labeled antibody | Fluorescence intensity (membrane) |
|---|---|---|
| 201 | Compound (1)-IgG | D |
| 202 | Compound (2)-IgG | C |
| 203 | Compound (3)-IgG | B |
| 204 | Compound (4)-IgG | A |
| 205 | Compound (5)-IgG | A |
| 206 | Compound (6)-IgG | A |
| 207 | Compound (7)-IgG | B |
| c21 | Comparative compound (1)-IgG | 1.0 (reference value) |
| c22 | Comparative compound (2)-IgG | G |
| c23 | Comparative compound (3)-IgG | E |
| c24 | Comparative compound (4)-IgG | — |
| c25 | Comparative compound (5)-IgG | G |
| c26 | Comparative compound (6)-IgG | G |

[3] Dot Blot Evaluation

Transferrin (20 mg/mL) was prepared at 50 ng/mL with TBS-T, and 2 µL thereof was carefully spotted on a nitrocellulose membrane. The membrane was dried and then blocked in TBS-T with a Fish Gelatin blocking buffer solution. Subsequently, 6 µL of a polyclonal rabbit anti-human transferrin antibody was added to 30 mL of Phosphate Buffered Saline with Tween 20 (PBS-T), the membrane was immersed therein, and shaking was carried out for 1 hour. Then, the membrane was taken out and washed with TBS-T four times. Then, 15 µL of the 0.1 mg/mL labeled antibody (anti-rabbit IgG) prepared above was added to 30 mL of TBS-T, the membrane was immersed therein, and incubation was carried out at room temperature for 1 hour with stirring. The membrane was washed three times with TBS-T for 10 minutes/washing and finally washed with TBS for 10 minutes. The obtained membrane was dried on a hot plate at 40° C. for 1 hour and imaged using an Amersham Typhoon scanner (manufactured by GEHC) with excitation light of 785 nm under the uniform exposure conditions, thereby calculating the fluorescence intensity in a fluorescence wavelength range of 810 to 840 nm. Using the integrated value of the fluorescence intensity of the comparative compound (1)-IgG in the fluorescence wavelength range of 810 nm to 840 nm as the reference value, the ratio to this reference value (the integrated value of the fluorescence intensity of the labeled antibody in the fluorescence wavelength range of 810 nm to 840 nm/the reference value) was calculated, and then, the evaluation was made based on the following evaluation standards. The results are summarized in Table 3.

[3] Dot Blot Evaluation

In the present test, it is determined that a compound has passed the evaluation of the fluorescence intensity in a case where the compound has a rank "D" or a higher rank.

—Evaluation Standards for Fluorescence Intensity—

A: The ratio of fluorescence intensity to the reference value is 2.0 times or more.

B: The ratio of fluorescence intensity to the reference value is 1.8 times or more and less than 2.0 times.

C: The ratio of fluorescence intensity to the reference value is 1.6 times or more and less than 1.8 times.

D: The ratio of fluorescence intensity to the reference value is 1.4 times or more and less than 1.6 times.

E: The ratio of fluorescence intensity to the reference value is 1.2 times or more and less than 1.4 times.

F: The ratio of fluorescence intensity to the reference value is 0.9 times or more and less than 1.2 times.

G: The ratio of fluorescence intensity to the reference value is less than 0.9 times.

TABLE 3

| No. | Labeled antibody | Fluorescence intensity (dot blot) |
|---|---|---|
| 301 | Compound (1)-IgG | D |
| 302 | Compound (2)-IgG | C |
| 303 | Compound (3)-IgG | B |
| 304 | Compound (4)-IgG | A |
| 305 | Compound (5)-IgG | A |
| 306 | Compound (6)-IgG | A |
| 307 | Compound (7)-IgG | C |
| c31 | Comparative compound (1)-IgG | 1.0 (reference value) |
| c32 | Comparative compound (2)-IgG | G |
| c33 | Comparative compound (3)-IgG | G |
| c33 | Comparative compound (4)-IgG | — |
| c34 | Comparative compound (5)-IgG | G |
| c35 | Comparative compound (6)-IgG | G |

From the results in Tables 1 to 3 above, the following facts can be seen. 1

The comparative compound (1) is not the compound defined by the present invention in that one selected from $R^1$, $R^2$, $R^5$, and $R^{22}$ to $R^{25}$ and one selected from $R^3$, $R^4$, $R^6$, and $R^{26}$ to $R^{29}$ in General Formula (1) are not bonded to form a large-membered ring. The comparative compound (2) is not the compound defined by the present invention in that at least one of $R^1, \ldots, R^6, R^{22}, \ldots$, or $R^{29}$ in General Formula (1) does not have an ethyleneoxy group having a repetition number of 1 to 50. The comparative compound (3) is not the compound defined by the present invention in that the linking group LL that forms the large-membered ring in General Formula (1) has a sulfo group. The labeled antibodies respectively using these comparative compounds (1) to (3) have a low fluorescence intensity in the solution, have a fluorescence intensity on the membrane, and have a fluorescence intensity in the dot blot (Nos. c11 to c13, c21 to c23, and c31 to c33). The comparative compound (4) is the compound described in WO2005/000218A, and in a case where the comparative compound (4) is used, an antibody cannot be labeled in the first place. The comparative compound (5) is the compound described in WO2006/047452A, the comparative compound (6) is the compound described in WO2001/002374A, and the labeled antibody using this comparative compound (5) or (6) has a low fluorescence intensity in the solution, have a fluorescence intensity on the membrane, and have a fluorescence intensity in the dot blot (Nos. c14 to c16, c24 to c26, and c34 to c36).

On the other hand, all of the labeled antibodies of the compounds (1) to (7) defined by the present invention have an excellent fluorescence intensity, which is 1.3 times or more in the state of the solution and 1.4 times or more in any state of the membrane or the dot blot, with respect to the fluorescence intensity of the comparatively labeled antibody (1) (Nos. 101 to 107 with respect to No. c11, Nos. 201 to 207 with respect to No. c21, and Nos. 301 to 307 with respect to No. c31).

Among them, the labeled antibody using the compounds (2) to (7) in which at least one of $R^{11}, \ldots$, or $R^{13}$ of General Formula (1) is an aryloxy group exhibited more excellent fluorescence intensity in the state of the membrane and the dot blot (Nos. 202 to 207 for No. 201 and No. 302 to 307 for No. 301). In addition, the labeled antibodies respectively using the compounds (3) to (7) in which both the two heterocyclic rings in Formula (1-1) satisfy Condition I described above, and at least one of $R^1$ or $R^2$, at least one of $R^3$ or $R^4$, $R^5$, and $R^6$ contains an ethyleneoxy group having a repetition number of 1 to 50 exhibit a more excellent fluorescence intensity in the states of the solution and the membrane (Nos. 103 to 107 and 203 to 207). Further, the labeled antibodies respectively using the compounds (3) to (6) in which the repetition number of ethyleneoxy groups contained in $R^1$ to $R^4$ is 1 to 4 exhibit a more excellent fluorescence intensity even in the state of the dot blot with respect to the labeled antibody using the compound (7) in which the repetition number ethyleneoxy groups contained in $R^1$ to $R^4$ is 10 (Nos. 303 to 306).

As described above, due to being a large-membered ring compound in which one selected from $R^1$, $R^2$, $R^5$, and $R^{22}$ to $R^{25}$ and one selected from $R^3$, $R^4$, $R^6$, and $R^{26}$ to $R^{29}$ are bonded through a linking group LL, where the group LL does not have any group selected from an aromatic hydrocarbon ring, a sulfo group, and a phosphono group, and at least one of $R^1$, ..., $R^6$, $R^{22}$, ..., or $R^{29}$ contains an ethyleneoxy group having a repetition number of 1 to 50, the compound according to the embodiment of the present invention represented by General Formula (1) can impart an excellent fluorescence intensity to the obtained labeled biological substance in any state of the solution, the membrane, or the dot blot.

The present invention has been described together with the embodiments of the present invention. However, the inventors of the present invention do not intend to limit the present invention in any part of the details of the description unless otherwise specified, and it is conceived that the present invention should be broadly construed without departing from the spirit and scope of the invention shown in the attached "WHAT IS CLAIMED IS".

What is claimed is:
1. A compound represented by General Formula (1),

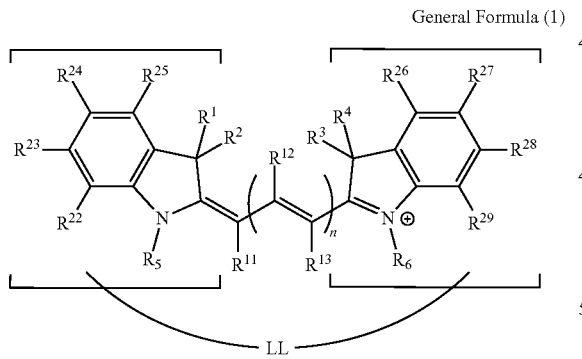

General Formula (1)

in the formula, $R^1$ to $R^6$ represent an alkyl group which may have a substituent or $-(CH_2-CH_2-O)_m-R^{21}$, where m is 1 to 50, and $R^{21}$ represents an alkyl group which may have a substituent,
$R^{11}$ to $R^{13}$ represent a hydrogen atom, an alkyl group, an aryl group, a heteroaryl group, an alkoxy group, an aryloxy group, an alkylthio group, an arylthio group, an amino group, or a halogen atom, where adjacent groups may be bonded to each other to form a 5-membered or 6-membered ring,
$R^{22}$ to $R^{29}$ represent a hydrogen atom, an alkyl group, an alkoxy group, an aryl group, a sulfo group, a sulfonamide group, an alkoxycarbonyl group, an acyloxy group, a carbamoyl group, an acylamino group, a nitro group, or a halogen atom, where adjacent groups may be bonded to each other to form a fused ring,
n is an integer of 1 to 3,
provided that one selected from $R^1$, $R^2$, $R^5$, and $R^{22}$ to $R^{25}$ and one selected from $R^3$, $R^4$, $R^6$, and $R^{26}$ to $R^{29}$ are bonded through a linking group LL, the linking group LL represents a divalent linking group having 1 to 100 carbon atoms, provided that the linking group LL does not have any group selected from an aromatic hydrocarbon ring, a sulfo group, and a phosphono group,
at least one of R1 to R6 and R22 to R29 contains a structure represented by $-(CH_2-CH_2-O)_m-$, where m has the same meaning as m described above, and
the compound represented by General Formula (1) is a neutral compound and contains at least one substituent capable of being bonded to a carboxy group or a biological substance.

2. The compound according to claim 1,
wherein the compound is represented by any one of General Formulae (1-1) to (1-3),

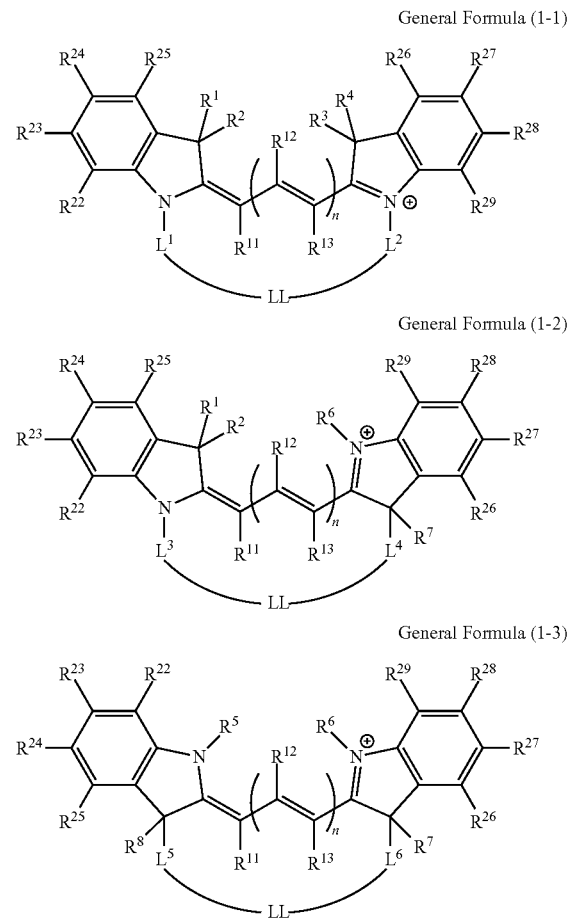

in the formulae, $L^1$ to $L^6$ represent an alkylene group or $-(CH_2-CH_2-O)_m$-alkylene-*,
* represents a bonding position to the linking group LL,
$R^7$ and $R^8$ represent an alkyl group which may have a substituent or $-(CH_2-CH_2-O)_m-R^{21}$, and
$R^1$ to $R^6$, $R^{11}$ to $R^{13}$, $R^{21}$ to $R^{29}$, LL, m, and n respectively have the same meanings as $R^1$ to $R^6$, $R^{11}$ to $R^{13}$, $R^{21}$ to $R^{29}$, LL, m, and n described above.

3. The compound according to claim 2,
wherein $L^1$ to $L^6$ described above each includes a structure represented by $—(CH_2—CH_2—O)_m—$, where m is 1 to 50.

4. The compound according to claim 1,
wherein the linking group LL is a divalent linking group having a substituent capable of being bonded to a carboxy group or a biological substance.

5. The compound according to claim 1, wherein both of two heterocyclic rings in the general formula satisfy the following condition 1, which is that at least one substituent on an $sp^3$ carbon atom, which is a ring-constituting atom of the heterocyclic ring, and a substituent on a ring-constituting nitrogen atom of the heterocyclic ring include a structure represented by —(CH2-CH2-O)m-, where m is 1 to 50.

6. The compound according to claim 1,
wherein in the linking group LL, a linking portion to $R^1$ to $R^6$, $R^{22}$ to $R^{29}$, or $L^1$ to $L^6$ is an —O— group, an —S— group, an —$NR^{50}$— group, a —COO— group, or a —$CONR^{50}$— group, provided that $R^{50}$ is a hydrogen atom or an alkyl group.

7. The compound according to claim 1,
wherein at least one of $R^{11}$, $R^{12}$, or $R^{13}$ is an aryloxy group.

8. A labeled biological substance that is obtained by bonding the compound according to claim 1 to a biological substance.

9. The labeled biological substance according to claim 8,
wherein the biological substance is any one of a protein, an amino acid, a nucleic acid, a sugar chain, or a phospholipid.

\* \* \* \* \*